United States Patent
Nakae et al.

(10) Patent No.: US 7,936,727 B2
(45) Date of Patent: May 3, 2011

(54) TRANSMISSION DEVICE, TRANSMISSION METHOD, SYSTEM LSI, AND PROGRAM

(75) Inventors: Hironori Nakae, Osaka (JP); Yasuo Hamamoto, Osaka (JP); Yosuke Ukita, Osaka (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 12/301,328

(22) PCT Filed: May 16, 2007

(86) PCT No.: PCT/JP2007/060053
§ 371 (c)(1),
(2), (4) Date: Nov. 18, 2008

(87) PCT Pub. No.: WO2007/135919
PCT Pub. Date: Nov. 29, 2007

(65) Prior Publication Data
US 2010/0157819 A1    Jun. 24, 2010

(30) Foreign Application Priority Data
May 19, 2006   (JP) ................................ 2006-139923

(51) Int. Cl.
*H04W 4/00* (2009.01)
*G01R 31/08* (2006.01)
(52) U.S. Cl. ........................................ 370/333; 370/232
(58) Field of Classification Search .......... 370/230–232, 370/236, 252, 333
See application file for complete search history.

(56) References Cited

U.S. PATENT DOCUMENTS

| | | | |
|---|---|---|---|
| 7,164,649 B2 * | 1/2007 | Walton et al. ................. | 370/203 |
| 2004/0215769 A1 | 10/2004 | Yoshida et al. | |
| 2005/0068916 A1 * | 3/2005 | Jacobsen et al. .............. | 370/328 |
| 2005/0163058 A1 | 7/2005 | Nabetani et al. | |
| 2005/0201453 A1 * | 9/2005 | Gu ................. | 375/225 |
| 2006/0187885 A1 * | 8/2006 | Roy et al. ...................... | 370/332 |

FOREIGN PATENT DOCUMENTS

| | | |
|---|---|---|
| JP | 2002-186027 | 6/2002 |
| JP | 2004-328319 | 11/2004 |
| JP | 2005-86409 | 3/2005 |
| JP | 2005-210618 | 8/2005 |
| JP | 2005-244598 | 9/2005 |
| JP | 2006-129277 | 5/2006 |

OTHER PUBLICATIONS

International Search Report issued Aug. 21, 2007 in the International (PCT) Application of which the present application is the U.S. National Stage.

* cited by examiner

*Primary Examiner* — Ricky Ngo
*Assistant Examiner* — Paul Masur
(74) *Attorney, Agent, or Firm* — Wenderoth, Lind & Ponack, L.L.P.

(57) ABSTRACT

One transmission rate of a physical layer (PHY rate) is selected from among a plurality of PHY rates of a protocol stack by calculating one or more effective values of transmission rates of an upper layer of the protocol stack with respect to one or more PHY rates of the plurality of PHY rates respectively, and making a comparison with use of the calculated one or more effective values. Each of the one or more effective values is calculated based on (i) an ideal value of corresponding one of the transmission rates and (ii) a retransmission ratio via the physical layer that corresponds to a reception power value detected in the reception apparatus.

20 Claims, 34 Drawing Sheets

FIG. 8

| PHY RATE [Mbps] | IDEAL RATE [Mbps] | MEASURED RSSI | ESTIMATED PER [%] | RETRANSMISSION RATIO | EFFECTIVE RATE [Mbps] |
|---|---|---|---|---|---|
| 24 | 19.10 | 30 | 0.86 | 1.10 | 17.36 |
| 36 | 26.40 | 30 | 15.61 | 1.51 | 17.48 |
| 48 | 32.70 | 30 | 99.99 | 1661.00 | 0.02 |

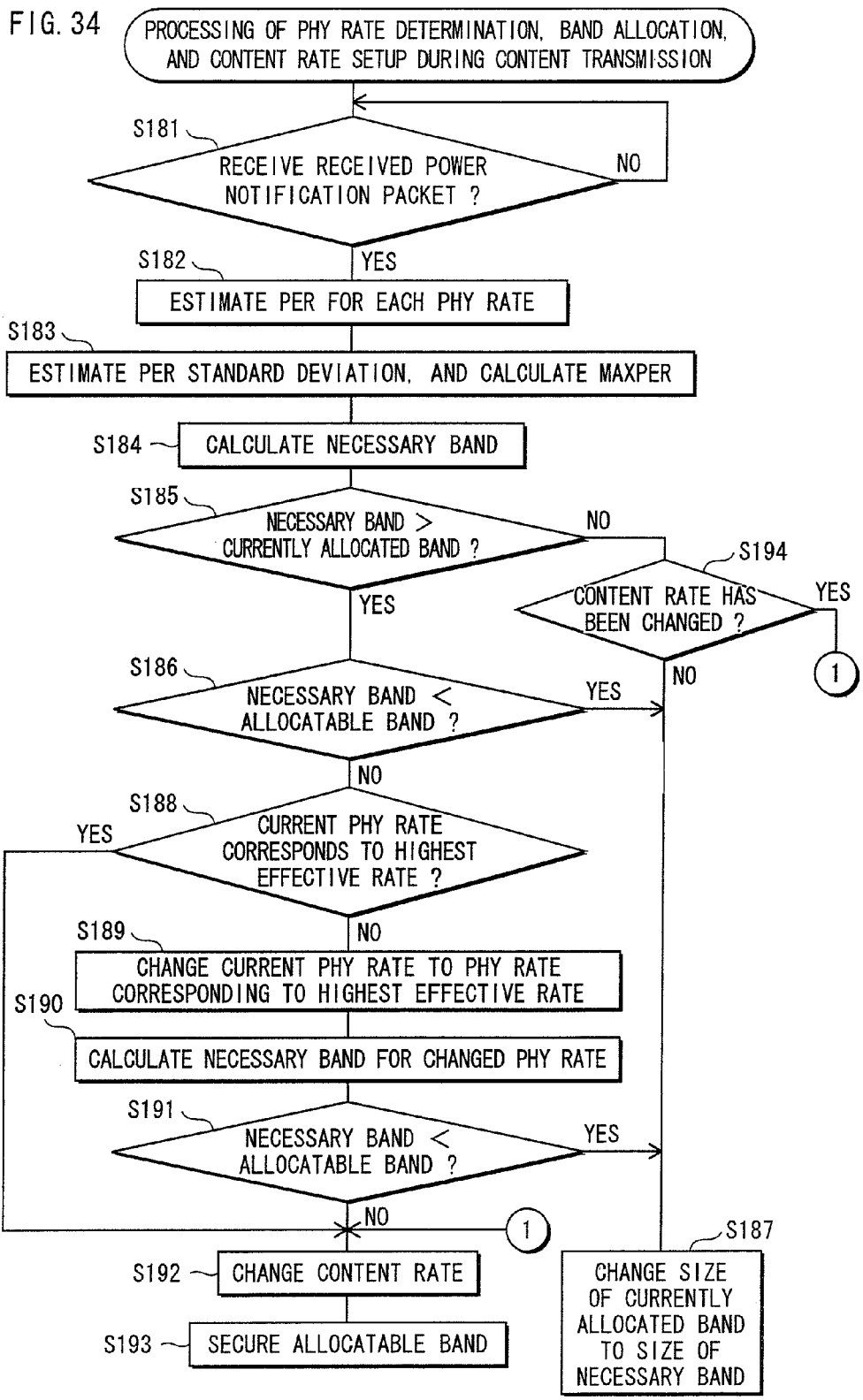

TRANSMISSION DEVICE, TRANSMISSION METHOD, SYSTEM LSI, AND PROGRAM

TECHNICAL FIELD

The present invention relates to an art for determining a PHY rate for transmitting data.

BACKGROUND ART

Conventionally, there has been known a transmission apparatus (for example, a wireless communication apparatus) that determines a PHY rate for transmitting packets using a reception power value of a packet. When receiving a packet from a wireless network via an antenna, the transmission apparatus detects a reception power value of the received packet, and determines a PHY rate corresponding to the detected reception power value based on a correspondence table that has been stored therein in advance and shows correspondence between reception power values and PHY rates. Then, the transmission apparatus performs data transmission/reception at the determined PHY rate (for example, see Patent Document 1). Accordingly, it is possible to optimize a communication rate for transmitting data, and improve the efficiency in data transmission/reception.

[Patent Document 1] Japanese Laid-Open Patent Application Publication No. 2002-186027

DISCLOSURE OF THE INVENTION

Problems the Invention is Going to Solve

By the way, there is a case where although the same reception power value is detected, a packet error rate (PER) varies depending on the installation environment of the transmission apparatus. For example, assume a case where an obstacle is positioned between transmission apparatuses and a distance therebetween is small, and a case where no obstacle is positioned between transmission apparatuses and a distance therebetween is large. Even if reception power values of packets are the same in these two cases, the latter case is less influenced by frequency interference. Accordingly, a direct wave is stronger in the latter case, and a PER is lowered. As a result, an effective rate is heightened. On the other hand, the former case is more influenced by frequency interference. Accordingly, a direct wave is weaker in the former case, and a PER is heightened. As a result, an effective rate is lowered.

Since a PER varies depending on the environment as described above, a PHY rate determined based on the correspondence table does not always improve the efficiency in data transmission/reception. Accordingly, even if, for example, a transmission apparatus transmits a content such as video and audio at a determined PHY rate, it might be impossible to realize an expected effective rate, and as a result it might take a long time to transmit the content. Furthermore, if the effective rate falls below a content rate of the content, the video and the audio are distorted.

The present invention aims to provide a transmission apparatus capable of improving the efficiency in data transmission/reception regardless of the environment.

Means to Solve the Problems

The present invention provides a transmission apparatus that performs transmission to a reception apparatus, the transmission apparatus comprising: a control unit operable to select one transmission rate of a physical layer (PHY rate) from among a plurality of PHY rates of a protocol stack; and a communication unit operable to perform transmission at the PHY rate selected by the control unit, wherein the control unit performs the selection by calculating one or more effective values of transmission rates of an upper layer of the protocol stack with respect to one or more PHY rates of the plurality of PHY rates respectively, and making a comparison with use of the calculated one or more effective values, and each of the one or more effective values is calculated based on (i) an ideal value of corresponding one of the transmission rates and (ii) a retransmission ratio via the physical layer that corresponds to a reception power value detected in the reception apparatus.

Effect of the Invention

According to the present invention having the above structure, a transmission apparatus does not select a PHY rate based only on a reception power value detected in a reception apparatus. The transmission apparatus selects a PHY rate by calculating, with respect to one or more PHY rates of a plurality of PHY rates respectively, one or more effective values of transmission rates each being calculated based on an ideal value of corresponding one of the transmission rates and a retransmission ratio via the physical layer that corresponds to a reception power value detected in a reception apparatus, and making a comparison with use of the calculated one or more PHY rates.

Accordingly, even if a strength of a direct wave varies due to influence of an obstacle or the like and as a result a PER varies, the transmission apparatus selects a PHY rate by making a comparison with use of one or more calculated effective values. Therefore, it is possible to select the most appropriate PHY rate. Transmission at the most appropriate PHY rate improves the efficiency in data transmission/reception. For example, the transmission apparatus can transmit a content such as video and audio with no distortion in a shorter period.

Here, the control unit may calculate effective values of transmission rates of the upper layer with respect to any two of the plurality of PHY rates respectively, compare the calculated two effective values with each other, and select one of the two PHY rates that corresponds to a higher one of the two effective values.

With the above structure, it is possible to select one of any two PHY rates of the plurality of PHY rates that corresponds to a higher one of two calculated effective values.

Here, the control unit may calculate an effective value of a transmission rate of the upper layer with respect to any one of the plurality of PHY rates, and compare the calculated effective value with a predetermined threshold value, if the calculated effective value is greater than the threshold value, the control unit may select the any one PHY rate that corresponds to the calculated effective value, and if the calculated effective value is no more than the threshold value, the control unit may calculate an effective value of a transmission rate of the upper layer with respect to any another one of the plurality of PHY rates other than the any one PHY rate, and compare the calculated effective value with the threshold value.

With the above structure, if an effective value of a transmission rate of the upper layer that is calculated with respect to any one of the plurality of PHY rates is greater than a predetermined threshold value, it is unnecessary to calculate an effective value of a transmission rate with respect to any other one of the plurality of PHY rates other than the any one PHY rate. Accordingly, it is possible to reduce processing to be performed by the control unit.

Here, the control unit may calculate effective values of transmission rates of the upper layer with respect to all of the plurality of PHY rates respectively, sequentially compare the calculated effective values with one another, and select one of the plurality of PHY rates that corresponds to a highest one of the calculated effective values.

With the above structure, effective rates of transmission rates of the upper later are calculated with respect to all of the plurality of PHY rates respectively. Accordingly, it is possible to determine a PHY rate that corresponds to the highest one of the calculated effective rates. This improves the efficiency in data transmission/reception.

By the way, in order to improve the efficiency in data transmission/reception, it may be possible to use a method of determining a PHY rate based on a PER actually measured. However, a history of reception or transmission of packets for a fixed period is necessary for measuring a PER. Therefore, it is impossible to instantly measure a PER, and promptly determine a PHY rate in response to the variation in the propagation state. For example, in order to transmit an SD content (minimum 2 Mbps content rate), at least approximately one second is necessary for transmitting 100 packets (approximately 1500 byte packet length). Accordingly, in a case of transmission of a content that needs to be controlled in the order of ms, such a period for at least approximately one second might cause distortion of audio and video.

In view of this, the transmission apparatus desirably further comprises a storage unit that stores therein first information and second information for each of the plurality of PHY rates, the first information showing a plurality of possible reception power values respectively corresponding to packet error rates (PERs), the second information showing a plurality of possible PERs respectively corresponding to retransmission ratios, wherein the control unit desirably includes a retransmission ratio acquisition subunit operable to acquire a retransmission ratio that corresponds to a reception power value for each of the PHY rates, based on the first information and the second information.

With the above structure, the transmission apparatus acquires a retransmission ratio for each PHY rate based on information stored therein in advance. Accordingly, it is possible to promptly select the most appropriate PHY rate. Also, since reception power values do not depend on the PHY rates and a reception power value of a packet that has been successfully received is stable, approximately several tens of packets are enough for creating a history. Accordingly, a retransmission ratio is acquired based on a reception power value using the first information and the second information. Therefore, it is possible to promptly select a PHY rate appropriate to the propagation state, and efficiently use the wireless band.

Here, the communication unit may perform transmission in units of packets, the control unit may further include: a PER calculation subunit operable to calculate a PER that corresponds to a PHY rate used for the transmission, using a number of retransmissions for each transmitted packet and a number of packets that have been completely transmitted; a comparison subunit operable to compare the PER calculated by the PER calculation subunit with a PER that corresponds to the used PHY rate shown by the first information; and a correction subunit operable to correct the first information if the calculated PER differs from the PER shown by the first information by no less than a predetermined value.

The transmission apparatus may further comprise an accumulation unit operable to acquire a reception power value, and accumulate therein the acquired reception power value, wherein the correction subunit may include: a generation subunit operable to generate corrected first information showing a plurality of possible reception power values respectively corresponding to PERs, based on the PER calculated by the PER calculation subunit, the PER shown by the first information, and a reception power value accumulated in the accumulation unit that corresponds to the calculated PER; and an update subunit operable to update the first information stored in the storage unit with the corrected first information generated by the generation unit.

Also, the communication unit may perform transmission in units of packets, the control unit may further include: a PER calculation subunit operable to calculate a predetermined number of PERs using a number of retransmissions for each transmitted packet and a number of packets that have been completely transmitted; a comparison subunit operable to compare a standard deviation of the predetermined number of PERs calculated by the PER calculation subunit with a standard deviation calculated using the predetermined number of PERs and the third information; and a correction subunit operable to correct the third information if the standard deviations differ from each other by no less than a predetermined value as a result of the comparison by the comparison subunit.

The transmission apparatus may further comprise: an accumulation unit operable to acquire a reception power value, and accumulate therein the acquired reception power value, wherein the correction subunit may include: a generation subunit operable to generate corrected third information showing a plurality of possible PERs respectively corresponding to standard deviations thereof, based on the plurality of possible PERs, the standard deviation of the predetermined number of PERs, and the standard deviation calculated using the predetermined number of PERs and the third information; and an update subunit operable to update the third information stored in the storage unit with the corrected third information generated by the generation unit.

With the above structures, if a value shown by the above information stored in advance differs from an actually measured value, the information stored in advance is corrected using the actually measured value. Accordingly, it is possible to select a PHY rate appropriate to the actual environment.

Here, the storage unit may further store therein third information showing a plurality of possible PERs respectively corresponding to standard deviations thereof, the control unit may further include: a standard deviation acquisition subunit operable to, based on the first information and the third information, acquire a standard deviation corresponding to a PER that correspond to reception power values, and add a value calculated as a result of multiplying the acquired standard deviation by N times (where N is a positive value) to the PER; and a band calculation subunit operable to calculate a band necessary for performing transmission using the PER to which the calculated value has been added and a packet rate of packets to be transmitted, and the communication unit may perform the transmission over the calculated band.

With the above structure, the transmission apparatus calculates the maximum PER by adding a value calculated as a result of multiplying the standard deviation by N times (where N is a positive value) to the PER, and calculates a necessary band using the calculated maximum PER. Accordingly, it is possible to realize stable transmission.

Here, the band calculation unit may include: a packet rate change subunit operable to compare the calculated band with an allocatable band, and change the packet rate if the calculated band is larger than the allocatable band; and a securement band calculation subunit operable to calculate a band to be secured based on the changed packet rate.

With the above structure, even if the calculated band is larger than the allocatable band, the transmission apparatus changes the packet rate to a rate at which transmission can be performed over the allocatable band. Accordingly, it is possible to realize stable content transmission.

Here, the standard deviation acquisition unit may include: a percentage calculation subunit operable to calculate a percentage of PERs falling within a range from the mean of the acquired PERs minus the standard deviation to the mean plus the standard deviation among the PERs used for acquiring the standard deviation; and a determination subunit operable to determine the value N by which the standard deviation is to be multiplied, based on whether the calculated percentage is greater than a predetermined threshold value.

With the above structure, the transmission apparatus calculates a percentage of PERs falling within the range from the mean of PERs minus the standard deviation to the mean of the PERs plus the standard deviation among a plurality of used PERs, and determines the value N based on the calculated percentage. Accordingly, it is possible to minimize a band to be allocated to a content.

Here, the communication unit may perform transmission in units of packets, and the control unit may further include: a reception power value acquisition subunit operable to acquire reception power values; a PER calculation subunit operable to calculate a predetermined number of PERs using a number of retransmissions for each transmitted packet and a number of packets that have been completely transmitted; a dispersion judgment subunit operable to judge whether an interval between each adjacent two of the calculated predetermined number of PERs is no less than a predetermined value; and a generation subunit operable to generate first information for each of the plurality of PHY rates showing a plurality of possible reception power values respectively corresponding to PERs, based on the predetermined number of PERs and the reception power values acquired by the reception power value acquisition subunit.

With the above structure, it is unnecessary for the transmission apparatus to store therein in advance the above information.

The control unit may further include: a standard deviation calculation subunit operable to calculate a standard deviation of the predetermined number of PERs; and a generation subunit operable to generate third information showing a plurality of possible PERs respectively corresponding to standard deviations thereof, based on the predetermined number of PERs and the standard deviation calculated by the standard deviation calculation subunit.

Here, the transmission apparatus may further comprise a measurement unit operable to measure a reception power value.

With the above structure, it is unnecessary for the reception apparatus to measure a reception power value and notify the transmission apparatus of the measured reception power value.

Here, the storage unit may be a nonvolatile memory.

With the above structure, even after the power supply is turned off, the above information remains stored. Accordingly, when the power supply is turned on next, it is possible to use the stored information, and to determine a PHY rate appropriate to the propagation environment.

BRIEF DESCRIPTION OF THE DRAWINGS

FIG. 8 shows a specific example of effective rates of PHY rates calculated by a PHY rate determination unit 16;

FIG. 34 is a flow chart showing processing of PHY rate determination, band allocation, and content rate determination during content transmission.

DESCRIPTION OF CHARACTERS

Figure 1:
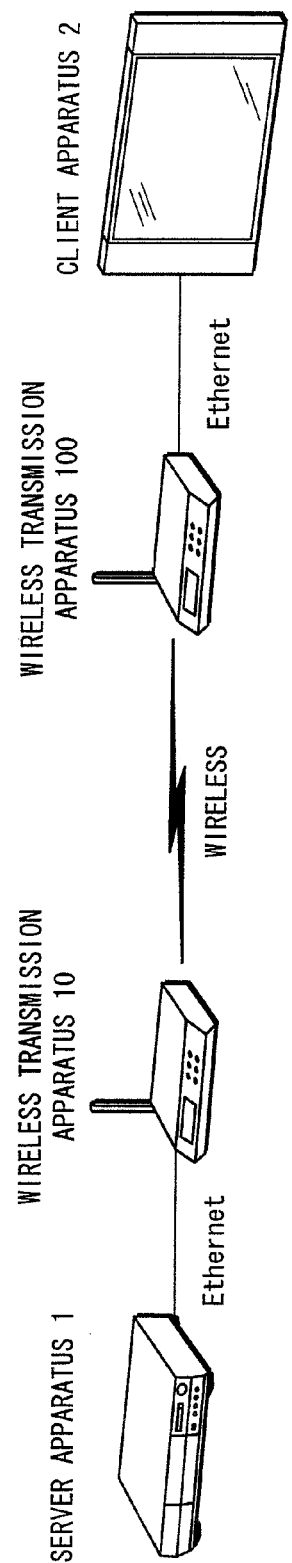
FIG. 1 shows a system.

1: server apparatus
2: client apparatus
10: transmitter (wireless transmission apparatus)
100: receiver (wireless transmission apparatus)
11 and 110: wireless transmission/reception unit
12 and 120: packet identification unit
13: reception power notification packet analysis unit
14 and 240: reception power management unit
15, 51, and 150: PER estimation unit
15A: PER request unit
15B: relational expression management unit
15C: reading processing unit
15D: relational expression change judgment unit
15E and 51E: relational expression generation unit
15F: writing processing unit
16 and 160: PHY rate determination unit
17 and 260: PER measurement unit
18, 25, 41, and 250: correction information creation unit
18A: PER calculation unit
18B: relational expression generation information creation unit
25C: PER management unit
25D: standard deviation calculation unit
25E and 41E: relational expression generation information creation unit,
21, 42, 52, and 210: standard deviation estimation unit
21A: standard deviation request unit
21B: relational expression management unit
21C: reading processing unit
21D: relational expression change judgment unit
21E and 52E: relational expression generation unit
21F: writing processing unit
42G: MAXPER change unit
22, 32, and 220: necessary band determination unit
32A: necessary band calculation unit
32B: securement band determination unit
32C: allocatable band information acquisition unit
32D: content rate calculation unit
32E: content rate change instruction unit
32F: content rate storage unit
23: application unit
24 and 56: test packet creation unit
31: content rate change unit
53: PHY rate change unit
54: transmission power change unit
55: parameter determination unit
61 and 130: reception power measurement unit
140: reception power notification packet creation unit
270: content rate measurement unit

BEST MODE FOR CARRYING OUT THE INVENTION

First Embodiment

<Outline>

Firstly, the outline of wireless transmission apparatuses 10 and 100 according to the present invention is described.

The wireless transmission apparatuses according to the present invention are used in a system such as shown in FIG. 1. The system shown in FIG. 1 includes a server apparatus 1 and a client apparatus 2 that are connected with each other via wireless (for example, IEEE802.11a). The standard IEEE802.11a defines 54 Mb/s (Megabit/second) as the maximum PHY rate, and also defines 48 Mb/s, 36 Mb/s, 24 Mb/s, 18 Mb/s, 12 Mb/s, 9 Mb/s, and 6 Mb/s that are lower than the maximum PHY rate.

Also, the server apparatus 1 and the client apparatus 2 are respectively connected with the wireless transmission apparatuses 10 and 100 via the Ethernet (registered trademark).

The wireless transmission apparatus 10 transmits, to the wireless transmission apparatus 100, a packet for causing the wireless transmission apparatus 100 to measure a reception power value of the packet. Upon receiving the measured reception power value transmitted by the wireless transmission apparatus 100, the wireless transmission apparatus 10 calculates an effective rate for each PHY rate based on the reception power value, and determines a PHY rate corresponding to the highest one of the calculated effective rates. Then, the wireless transmission apparatus 10 transmits a content supplied by the server apparatus 1 in units of packets to the wireless transmission apparatus 100 at the determined PHY rate.

Upon receiving a packet for measuring a reception power value from the wireless transmission apparatus 10, the wireless transmission apparatus 100 measures the reception power value of the packet, and transmits the measured reception power value to the wireless transmission apparatus 10. Upon receiving a content transmitted by the wireless transmission apparatus 10, the wireless transmission apparatus 100 supplies the received content to the client apparatus 2.

As described above, the wireless transmission apparatus 10 calculates effective rates based on a reception power value, and determines a PHY rate corresponding to the highest one of the calculated effective rates. The wireless transmission apparatus 10 transmits a content at the determined PHY rate. Accordingly, it is possible to improve the efficiency in content transmission regardless of the environment.

The following describes in further detail the wireless transmission apparatuses 10 and 100 according to the present invention, with reference to the drawings.

<Structure of Transmitter 10>

Figure 2:
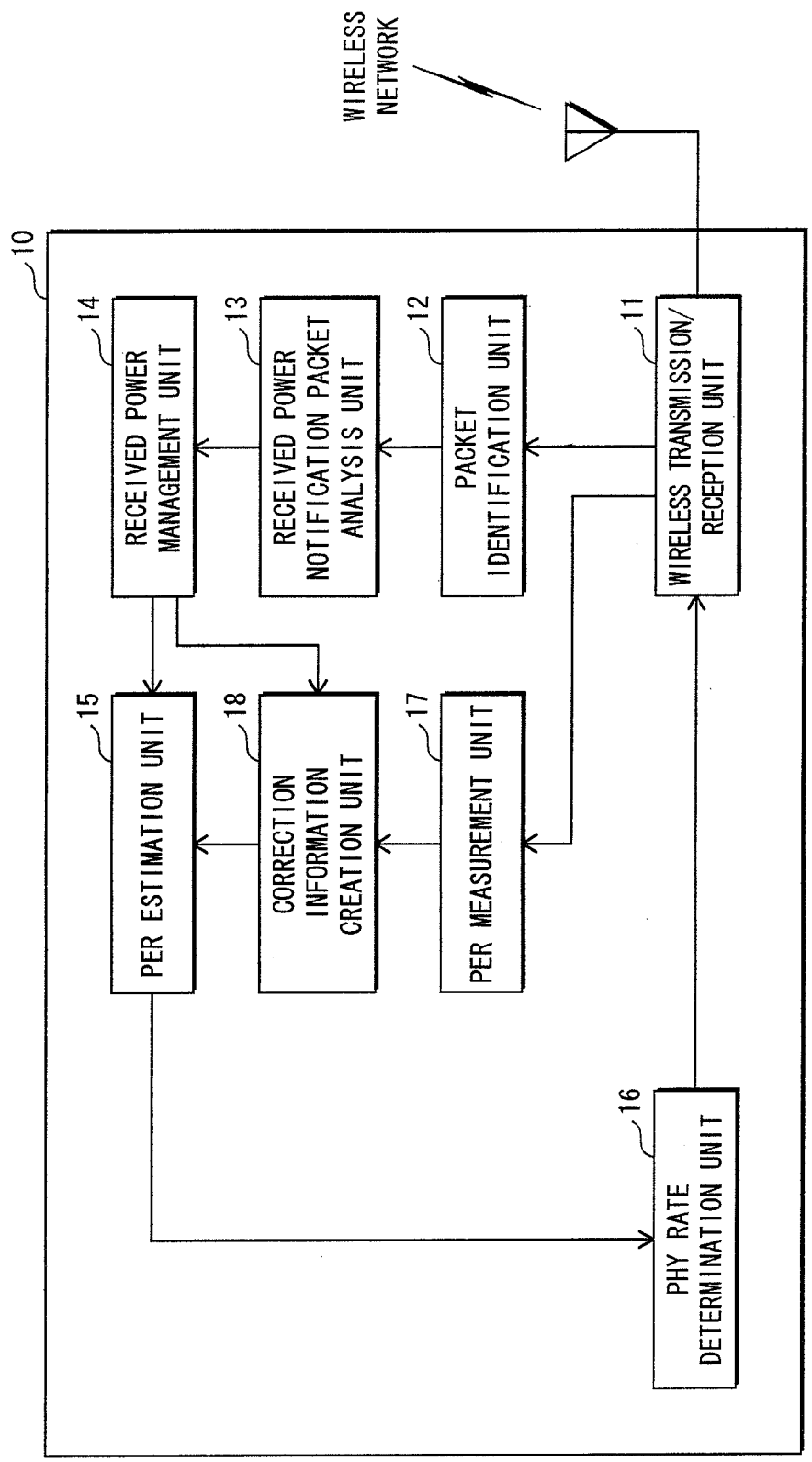
FIG. 2 is a functional block diagram showing a transmitter 10 according to a first embodiment of the present invention.

FIG. 2 is a functional block diagram showing the wireless transmission apparatus 10 on the transmission side (hereinafter "transmitter 10") according to the first embodiment of the present invention.

The transmitter 10 is specifically a computer system composed of an antenna, a microprocessor, a ROM, a RAM, and the like. A computer program is stored on the ROM. Functions of the transmitter 10 are achieved by the microprocessor operating in accordance with the computer program.

The transmitter 10 includes a wireless transmission/reception unit 11, a packet identification unit 12, a reception power notification packet analysis unit 13, a reception power management unit 14, a PER estimation unit 15, a PHY rate determination unit 16, a PER measurement unit 17, and a correction information creation unit 18.

The wireless transmission/reception unit 11 specifically includes a transmission/reception circuit including a modulation circuit, a demodulation circuit, and the like. Via an antenna for transmitting/receiving wireless signals, the wireless transmission/reception unit 11 receives packets transmitted by the wireless network, demodulates the received packets, and transmits the demodulated packets to the packet identification unit 12.

Also, the wireless transmission/reception unit 11 modulates a packet to be output to the wireless network, and transmits the modulated packet via the antenna and the like. Upon receiving an instruction to set a PHY rate from the PHY rate determination unit 16, the wireless transmission/reception unit 11 sets a PHY rate determined by the PHY rate determination unit 16, and transmits packet at the set PHY rate.

The packet identification unit 12 identifies a packet received from the wireless transmission/reception unit 11. As a result of the identification, if the received packet is a reception power notification packet, the packet identification unit 12 transmits the reception power notification packet to the reception power notification packet analysis unit 13.

The reception power notification packet analysis unit 13 analyzes the reception power notification packet received from the packet identification unit 12. Specifically, the reception power notification packet analysis unit 13 extracts a reception power value from the reception power notification packet, and transmits the extracted reception power value to the reception power management unit 14.

The reception power management unit 14 includes a memory such as a RAM. The reception power management unit 14 accumulates therein the reception power value received from the reception power notification packet analysis unit 13, and transmits the reception power value to the PER estimation unit 15 and the correction information creation unit 18.

The PER estimation unit 15 estimates a PER for each PHY rate in a wireless section based on the reception power value received from the reception power management unit 14. A method of PER estimation is described later in the <Structure of PER Estimation Unit 15>. The PER estimation unit 15 transmits the estimated PERs to the PHY rate determination unit 16.

The PHY rate determination unit 16 includes a memory such as a Flash ROM. The PHY rate determination unit 16 determines a PHY rate corresponding to the highest effective rate based on the PERs received from the PER estimation unit 15, and instructs the wireless transmission/reception unit 11 to transmit data at the determined PHY rate.

Note that a method how to determine a PHY rate corresponding to the highest effective rate based on received PERs is described later in the <Processing by PHY Rate Determination Unit 16>.

The PER measurement unit 17 includes a memory such as a RAM. The PER measurement unit 17 measures the number of retransmissions of each packet and the number of packets that have been completely transmitted, and stores these numbers in the memory. When transmission of a predetermined number of packets completes, the PER measurement unit 17 transmits, to the correction information creation unit 18, the total of the number of retransmissions, the number of the completely transmitted packets, and a PHY rate used for the transmission.

The correction information creation unit 18 creates information to be used for correcting a relational expression stored in the PER estimation unit 15, based on the total of the number of retransmissions and the number of the completely transmitted packets received from the PER measurement unit 17 and the reception power value received from the reception power management unit 14.

<Structure of Receiver 100>

Figure 3:
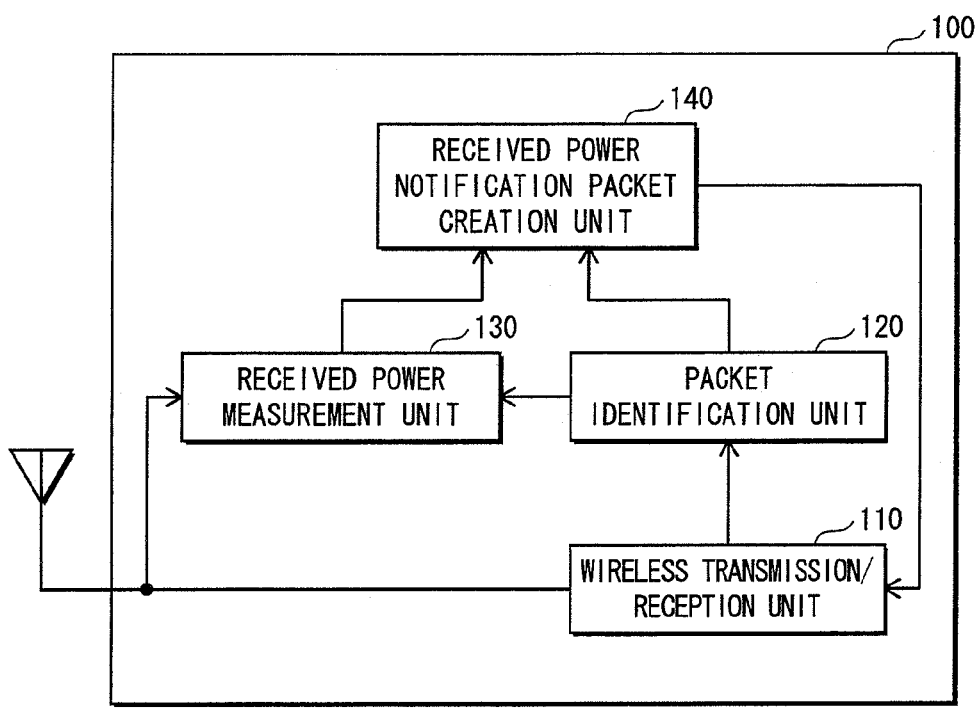
FIG. 3 is a functional block diagram showing a receiver 100 according to the first embodiment of the present invention.

FIG. 3 is a functional block diagram showing the wireless transmission apparatus 100 on the reception side (hereinafter "receiver 100") according to the first embodiment of the present invention.

The receiver 100 is specifically a computer system composed of an antenna, a microprocessor, a ROM, a RAM, and the like. A computer program is stored on the ROM. Functions of the receiver 100 are achieved by the microprocessor operating in accordance with the computer program.

The receiver 100 includes a wireless transmission/reception unit 110, a packet identification unit 120, a reception power measurement unit 130, and a reception power notification packet creation unit 140.

The wireless transmission/reception unit 110 specifically includes a transmission/reception circuit including a modulation circuit and a demodulation circuit. Via an antenna for transmitting/receiving wireless signals, the wireless transmission/reception unit 110 receives packets transmitted by the transmitter 10, demodulates the received packets, and transmits the demodulated packets to the packet identification unit 120.

Also, the wireless transmission/reception unit 110 modulates a reception power notification packet received from the reception power notification packet creation unit 140, and transmits the modulated reception power notification packet to the transmitter 10 via the antenna and the like.

The packet identification unit 120 identifies a packet received from the wireless transmission/reception unit 110.

The reception power measurement unit 130 includes an RSSI (Received Signal Strength Indicator) measurement circuit. The reception power measurement unit 130 measures a reception power value of a packet transmitted by the transmitter 10, and transmits the measured reception power value to the reception power notification packet creation unit 140.

The reception power notification packet creation unit 140 creates a reception power notification packet that includes the reception power value of the packet received from the reception power measurement unit 130, and transmits the created reception power notification packet to the wireless transmission/reception unit 110.

<Functions of PER Estimation Unit 15>

Figure 4:
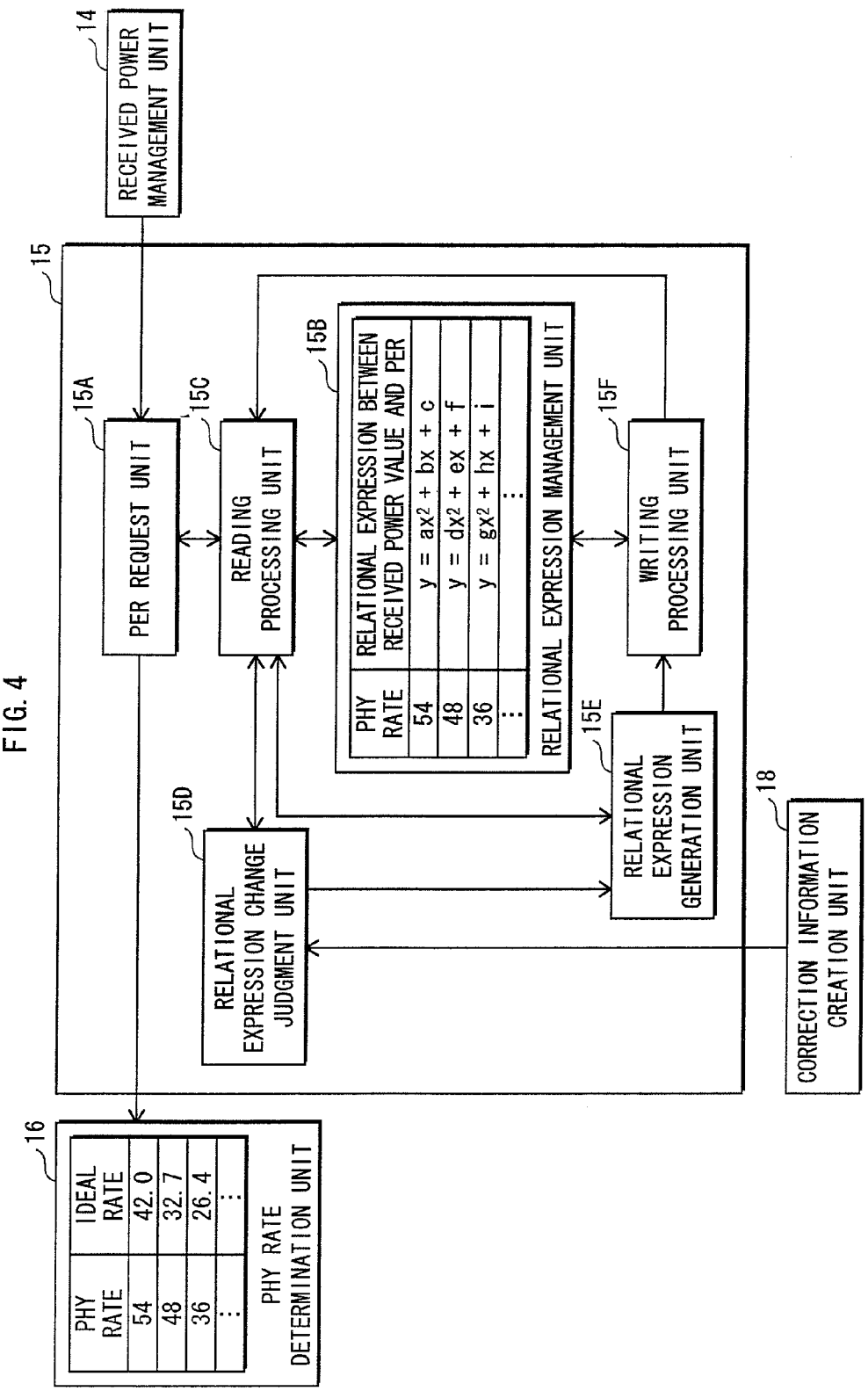
FIG. 4 is a functional block diagram showing a PER estimation unit 15.

Next, the functions of the PER estimation unit 15 included in the transmitter 10 are described in further detail with reference to FIG. 4. FIG. 4 is a functional block diagram showing the PER estimation unit 15. As shown in FIG. 4, the PER estimation unit 15 includes a PER request unit 15A, a relational expression management unit 15B, a reading processing unit 15C, a relational expression change judgment unit 15D, a relational expression generation unit 15E, and a writing processing unit 15F.

Figure 5:
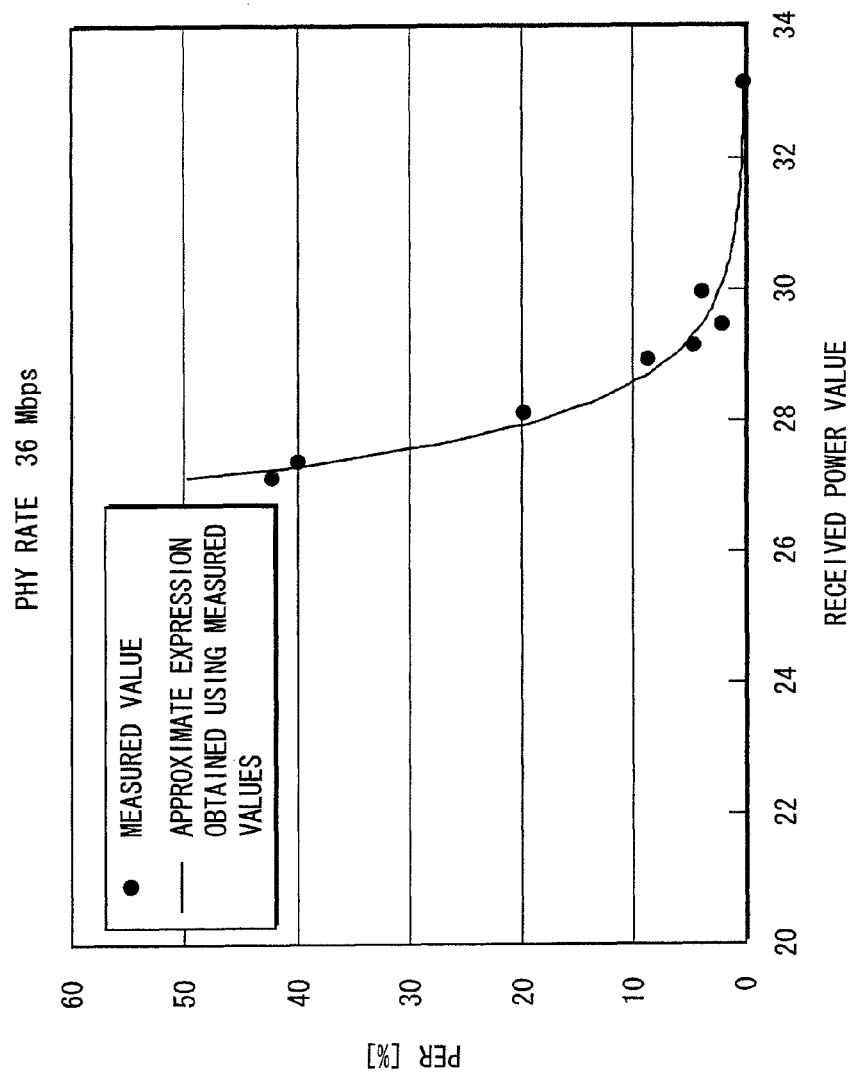
FIG. 5 shows a relational expression between reception power value and PER.

The relational expression management unit 15B includes a memory such as a Flash ROM, and manages a relational expression between reception power value and PER for each PHY rate. FIG. 5 shows a solid line obtained from relational expressions. The relational expression management unit 15B manages in advance, for each PHY rate, relational expressions from which a solid line such as shown in FIG. 5 can be obtained.

FIG. 5 is described in further detail. FIG. 5 shows a result of content transmission (approximately three hundred thousand packets) for five minutes at 36 Mbps PHY rate in IEEE802.11a and an approximate expression obtained based on this result of content transmission. In the figure, an abscissa axis represents average of reception power values of packets that have been successively received for five minutes, and an ordinate axis represents PER calculated based on the number of retransmissions of packets transmitted for five minutes. In the figure, the approximate expression is obtained based on the result of eight-time content transmission each using a different transmission power (filled circles in the figure). The PER request unit 15A uses this approximate expression as a relational expression to calculate a PER based on a reception power value.

Note that the average of reception power values is expressed in units of mw, where a value expressed in units of mw is equal to a value expressed in units of dBm to which 100 has been added (reception power 1 mw=0 dBm).

Upon receiving a reception power value transmitted by the reception power management unit 14, the PER request unit 15A sequentially reads, for each PHY rate, a relational expression managed in advance by the relational expression management unit 15B via the reading processing unit 15C. The PER request unit 15A calculates a PER for each PHY rate using the read relational expression and the reception power value, and transmits the calculated PERs to the PHY rate determination unit 16, as PERs estimated by the PER estimation unit 15.

The reading processing unit 15C reads the relational expressions managed by the relational expression management unit 15B.

The relational expression change judgment unit 15D includes a memory such as a RAM, and judges whether it is necessary to change the relational expressions managed by the relational expression management unit 15B.

With respect to a determined PHY rate, the relational expression generation unit 15E generates a relational expression between reception power value and PER using the relational expressions respectively managed by the relational expression management unit 15B and the information received from the relational expression change judgment unit 15D.

The writing processing unit 15F writes the relational expressions generated by the relational expression generation unit 15E into the relational expression management unit 15B.

The details of the relational expression change judgment unit 15D, the relational expression generation unit 15E, and the writing processing unit 15F are described later in the <Operations of Correction Method>.

<Functions of Correction Information Creation Unit 18>

Figure 6:
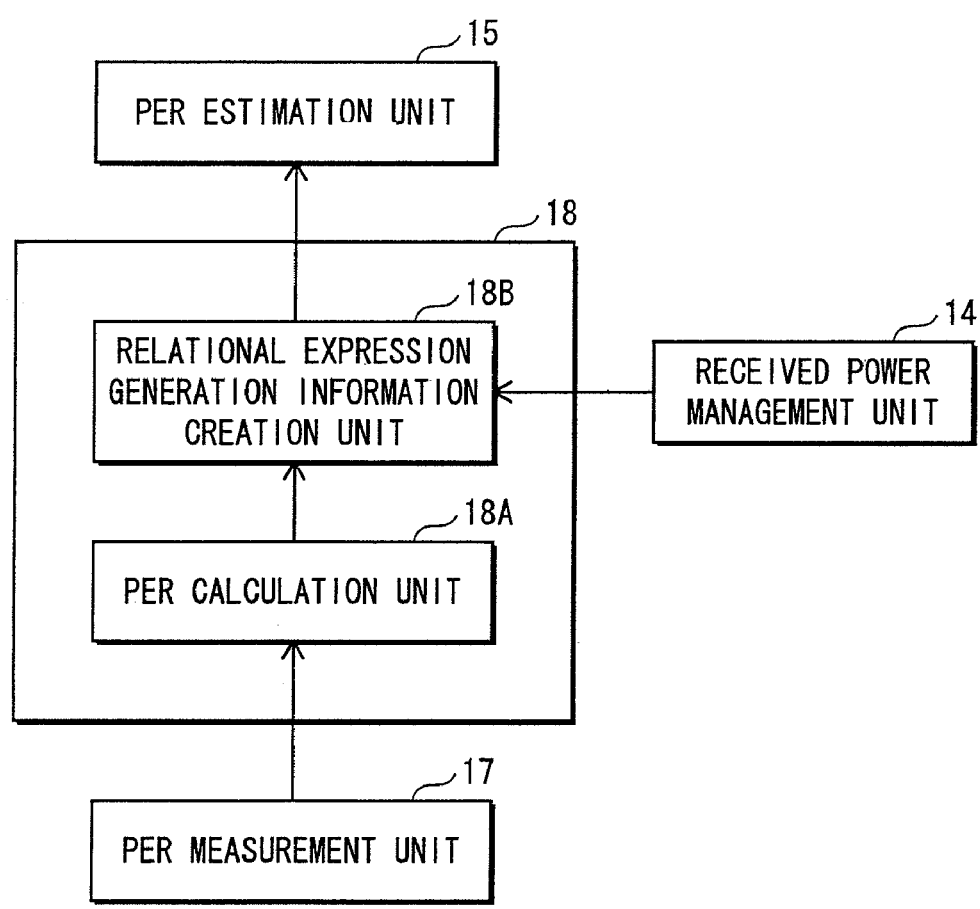
FIG. 6 is a functional block diagram showing a correction information creation unit 18.

Next, the functions of the correction information creation unit 18 included in the transmitter 10 are described in further detail with reference to FIG. 6. FIG. 6 is a functional block diagram showing the correction information creation unit 18. As shown in FIG. 6, the correction information creation unit 18 includes a PER calculation unit 18A and a relational expression generation information creation unit 18B.

The PER calculation unit 18A calculates a PER with respect to a determined PHY rate using information received from the PER measurement unit 17. For more detail, the PER calculation unit 18A calculates a PER using the total of the number of retransmissions and the number of packets that have been completely transmitted, which are received from the PER measurement unit 17, and the calculated PERs and a PHY rate used for content transmission to the relational expression generation information creation unit 18B.

The relational expression generation information creation unit 18B receives the PER and the PHY rate from the PER calculation unit 18A. Also, the relational expression generation information creation unit 18B acquires a plurality of reception power values stored in the reception power management unit 14, and calculates the average of the acquired reception power values. Then, the relational expression generation information creation unit 18B transmits the calculated average of the reception power values, the PERs, and the PHY rate to the PER estimation unit 15.

<Processing by PHY Rate Determination Unit 16>

The following describes how the PHY rate determination unit 16 determines a PHY rate. Upon receiving a PER for each PHY rate, the PHY rate determination unit 16 calculates an effective rate for each PHY rate using a (Formula 1) stored therein in advance, and determines a PHY rate corresponding to the highest one of the calculated effective rates. Here, the effective rate is a transmission rate in consideration of PER.

$$P_{drop} = \sum_{k=S+1}^{S+100} {}_{S+100}C_k p^k (1-p)^{100+S-k} \quad \text{(Formula 1)}$$

The following describes the (Formula 1) and a method how to calculate an effective rate using the (Formula 1).

The (Formula 1) is a relational expression for determining the number of redundant packets "S" in consideration of retransmission in a case where 100 packets are transmitted.

In the (Formula 1), "p" represents a PER, and "$P_{drop}$" represents a rate of the number of packets that have failed to be transmitted among 100+S packets.

Figure 7:
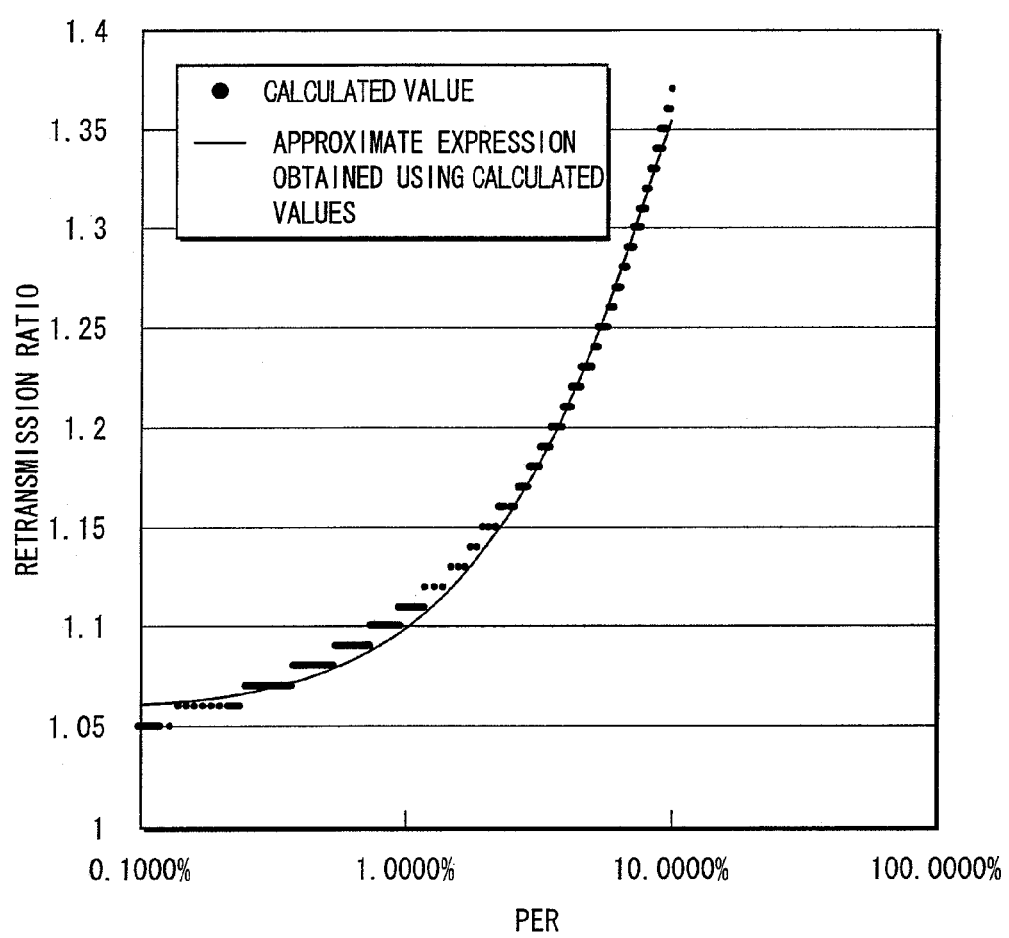
FIG. 7 shows a relational expression between PER and retransmission ratio.

FIG. 7 shows a result of calculation of the number of redundant packets "S" using the (Formula 1) for making each PER to be no more than 1.0E−8. In the figure, an abscissa axis represents PER, and an ordinate axis represents retransmission ratio ((100+S)/100). Black circles represent values calculated using the (Formula 1).

Note that when video data for two hours is transmitted at the maximum 28 Mbps in accordance with the full TS transmission system in BS digital broadcasting (the number of packets to be transmitted is approximately 1.65E+7), the PER is fixed to 1.0E−8 so as not to lose any of the packets.

The PHY rate determination unit 16 assigns the PER received from the PER estimation unit 15 to the "p" included in the (Formula 1), and calculates the number of redundant packets "S" such that the PER "$P_{drop}$" is no more than 1.0E−8. Then, the PHY rate determination unit 16 calculates an effective rate that is appropriate to the propagation state for each PHY rate, using an ideal rate for each PHY rate (transmission rate in a case where PER=0%) that are stored therein in advance and a retransmission ratio for each PHY rate. For example, if a PHY rate is 36 Mbps (a corresponding ideal rate is 26.4 Mbps) and a retransmission ratio is 1.51, an effective rate that is appropriate to the propagation state is calculated as follows: 26.4 Mbps×(100/151)=17.48 Mbps (rounded off to two decimal places). Here, the propagation state is a state in which an effective rate varies in accordance with variation of the reception power value.

The PHY rate determination unit 16 compares the calculated effective rates with each other, and determines a PHY rate corresponding to the highest one of the calculated effective rates, and transmits the determined PHY rate to the wireless transmission/reception unit 11.

FIG. 8 shows an ideal rate, a PER, a retransmission ratio, and an effective rate for each PHY rate (24 Mbps, 36 Mbps, and 48 Mbps here) in a case where a reception power value is 30. In this case, from among calculated effective rates (17.36 Mbps, 17.48 Mbps, and 0.02 Mbps) the PHY rate determination unit 16 determines a PHY rate (36 Mbps) corresponding to the highest effective rate (17.48 Mbps), and transmits the determined PHY rate (36 Mbps) to the wireless transmission/reception unit 11.

<Flow Chart of PHY Rate Determination Processing>

Figure 9:
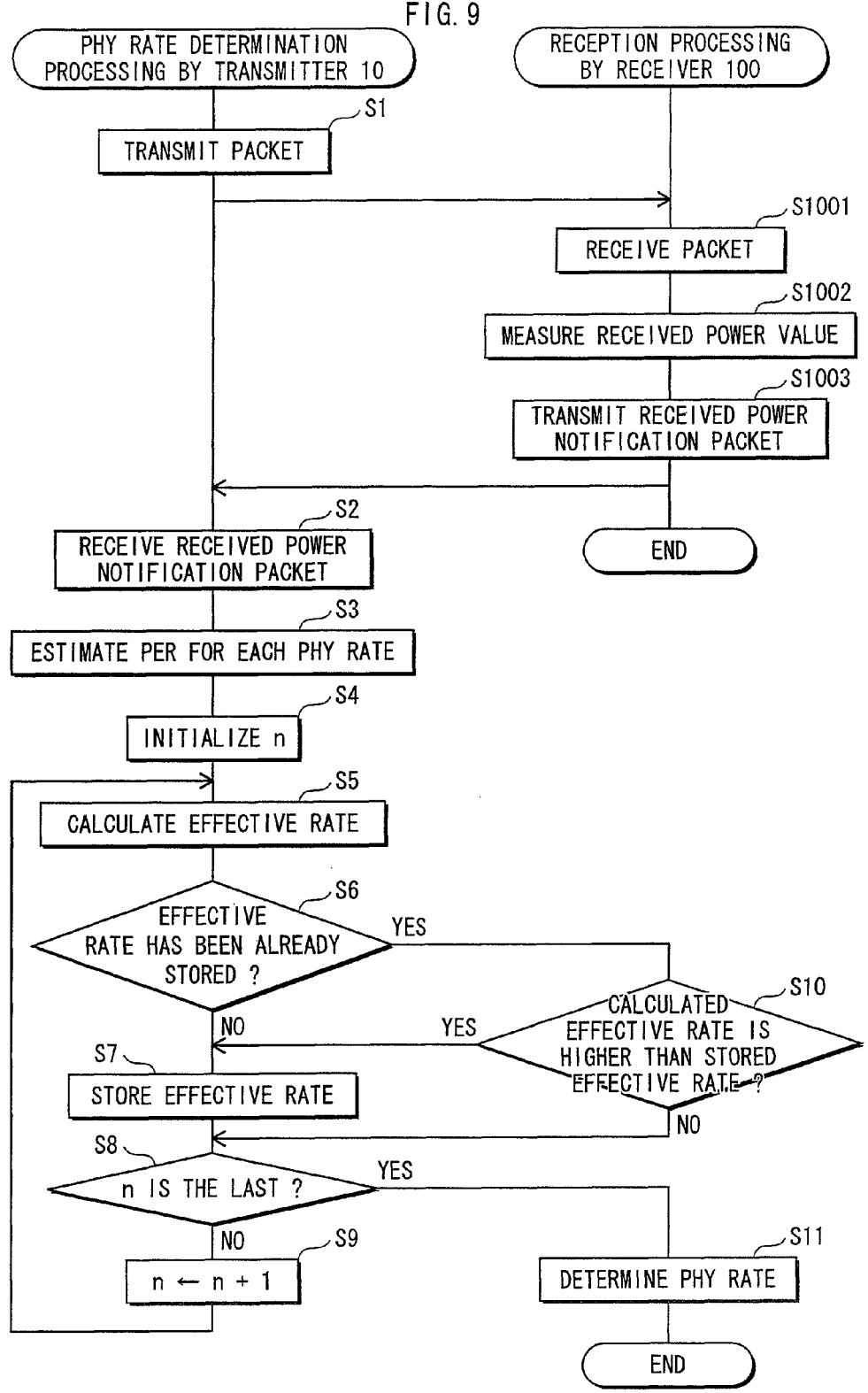
FIG. 9 is a flow chart showing PHY rate determination processing.

Next, PHY rate determination processing is described. FIG. 9 is a flow chart showing PHY rate determination processing according to the first embodiment of the present invention. In this flow chart, "n" is a variable number that represents one PHY rate. Firstly, the wireless transmission/reception unit 11 modulates packets to be transmitted to the receiver 100, and outputs the modulated packets to the wireless network via the antenna (Step S1).

The wireless transmission/reception unit 110 and the reception power measurement unit 130 included in the receiver 100 receive the packets from the wireless network via the antenna (Step S1001). The reception power measurement unit 130 measures a reception power value, and transmits the measured reception power value to the reception power notification packet creation unit 32 (Step S1002). The reception power notification packet creation unit 140 creates a reception power notification packet including the reception power value of the packet. The wireless transmission/reception unit 110 modulates the created reception power notification packet, and outputs the modulated reception power notification packet to the wireless network via the antenna (Step S1003).

The wireless transmission/reception unit 11 included in the transmitter 10 receives the reception power notification packet from the wireless network via the antenna (Step S2). The reception power notification packet analysis unit 13 extracts the reception power value from the reception power notification packet. The PER estimation unit 15 estimates a PER for each PHY rate based on the extracted reception power value (Step S3). Then, the PHY rate determination unit 16 determines a PHY rate corresponding to the highest effective rate. Specifically, the PHY rate determination unit 16 initializes "n" (Step S4), and calculates an effective rate corresponding to "n" (Step S5), and judges whether an effective rate has been already stored therein (Step S6).

If an effective rate has not been already stored therein (Step S6: NO), the PHY rate determination unit 16 stores therein the calculated effective rate (Step S7), and judges whether "n" is the last (Step S8). If the "n" is not the last (Step S8: NO), the PHY rate determination unit 16 increments "n" by 1 (Step S9), then the flow proceeds to Step S5.

If the effective rate has been already stored therein (Step S6: YES), the PHY rate determination unit 16 judges whether the calculated effective rate is higher than the stored effective rate (Step S10). If the calculated effective rate is higher than the stored effective rate (Step S10: YES), the PHY rate determination unit 16 stores therein the calculated effective rate (that is, overwrites the stored effective rate with the calculated effective rate) (Step S7). If the calculated effective rate is equal to or lower than the stored effective rate (Step S10: YES), the PHY rate determination unit 16 judges whether "n" is the last (Step S8). If "n" is the last (Step S8: YES), the PHY rate determination unit 16 selects a PHY rate corresponding to the stored effective rate (Step S11). The wireless transmission/reception unit 11 sets up for performing subsequent content transmission at the selected PHY rate.

<Operations of Correction Method>

Figure 10:
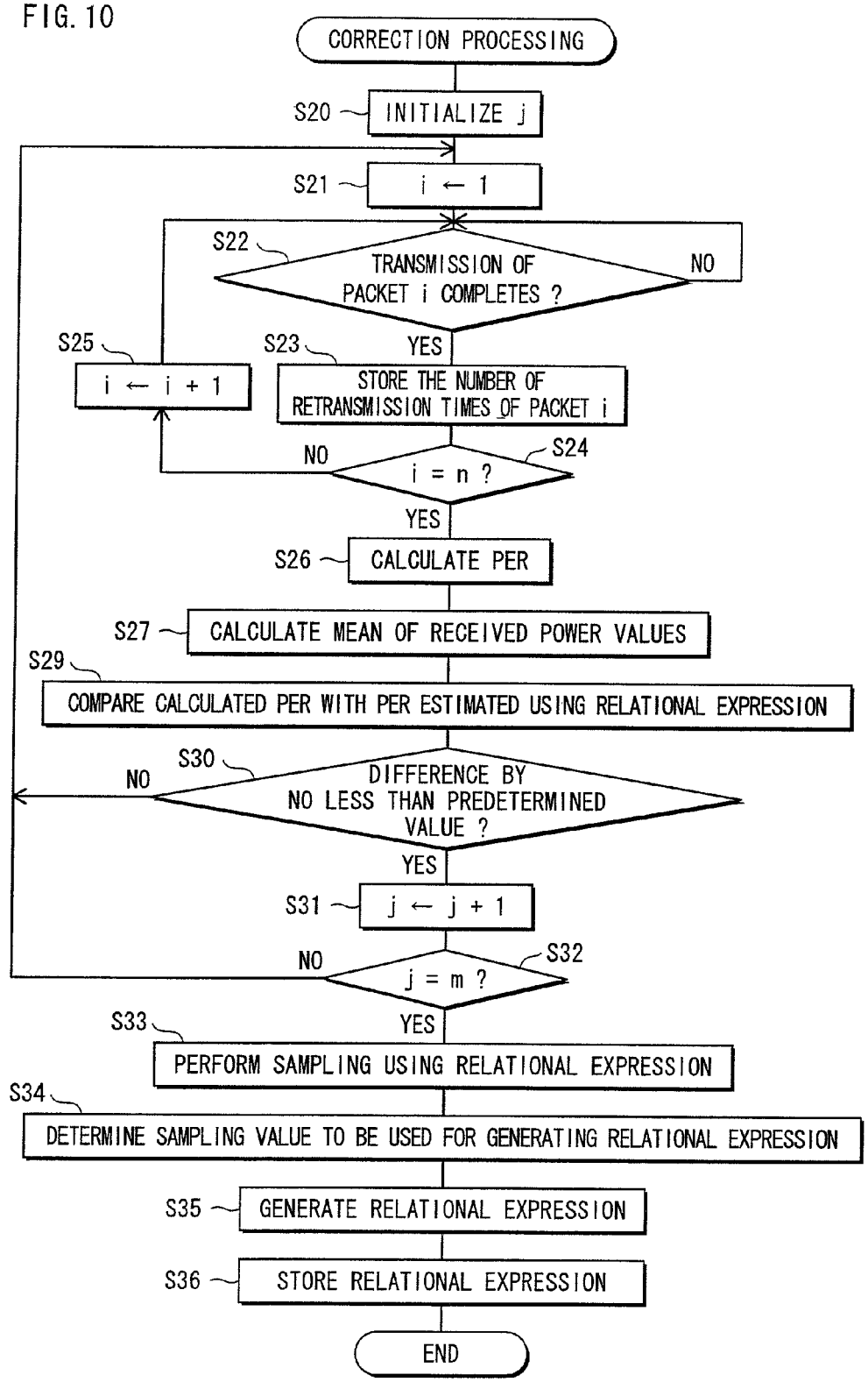
FIG. 10 is a flow chart showing correction processing.

The following describes a method for correcting a relational expression for each PHY rate managed by the PER estimation unit 15 (approximate expression shown in FIG. 5), with reference to a flow chart shown in FIG. 10. In this flow chart, "i" is a variable number that represents one packet to be transmitted, and "n" represents the number of packets to be transmitted, which is determined in advance. Also, "j" is a variable number that represents the number of differences by no less than a predetermined value between a PER calculated using a relational expression and a. PER received from the correction information creation unit 18. "m" represents the permissible number of differences by the predetermined value, which is determined in advance.

Firstly, the relational expression change judgment unit 15D initializes the number of differences "j" (Step S20), and the PER measurement unit 17 initializes the packet "i" (Step S21). The PER measurement unit 17 judges whether the wireless transmission/reception unit 11 has completed transmitting the packet "i" (Step S22). If judging affirmatively, (Step S22: YES), the PER measurement unit 17 stores therein the number of retransmissions of the packet "i" (Step S23). The PER measurement unit 17 judges whether the number of transmitted packets reaches "n" (Step S24). If judging negatively (Step S24: NO), the PER measurement unit 17 increments the packet "i" by 1 (Step S25), and then the flow proceeds to Step S22. If judging affirmatively (Step S24: YES), the PER calculation unit 18A calculates a PER using the total of the number of retransmissions and the number of packets that have been completely transmitted (Step S26).

Then, the relational expression generation information creation unit 18B acquires a plurality of reception power values stored in the reception power management unit 14, and calculates the average of the reception power values (Step S27). The relational expression change judgment unit 15D reads a relational expression corresponding to a current PHY rate used for measuring a PER via the reading processing unit 15C, and calculates a PER based on the read relational expression using the calculated average of the reception power values, and compares the calculated PER with the PER calculated by the PER calculation unit 18A (Step S29).

As a result of the comparison, the relational expression change judgment unit 15D judges whether there is a difference between these two PERs by no less than a predetermined value (Step S30). If the relational expression change judgment unit 15D judges negatively (Step S30: NO), the flow proceeds to Step S21. If judging affirmatively (Step S30: YES), the relational expression change judgment unit 15D increments the number of differences "j" by 1 (Step S31), and then judges whether the number of differences "j" reaches the permissible number "m" (Step S32). If "j" does not reach "m" (Step S32: NO), the flow proceeds to Step S21. If "j" reaches "m" (Step S32: YES), the relational expression change judgment unit 15D judges that the relational expression needs to be corrected.

Figure 11A:
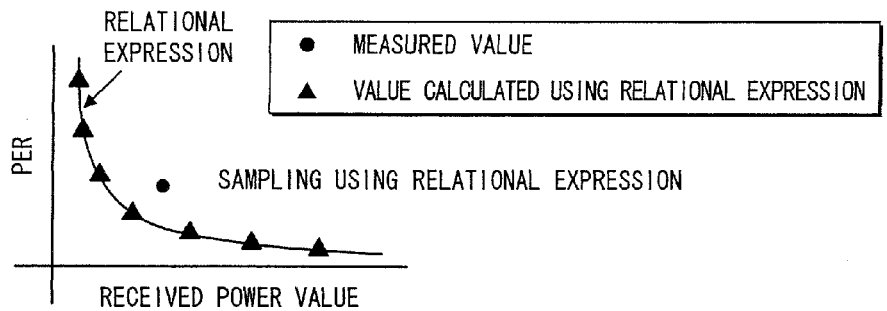
FIGS. 11A-11C show a method of correcting a relational expression.
Figure 11B:
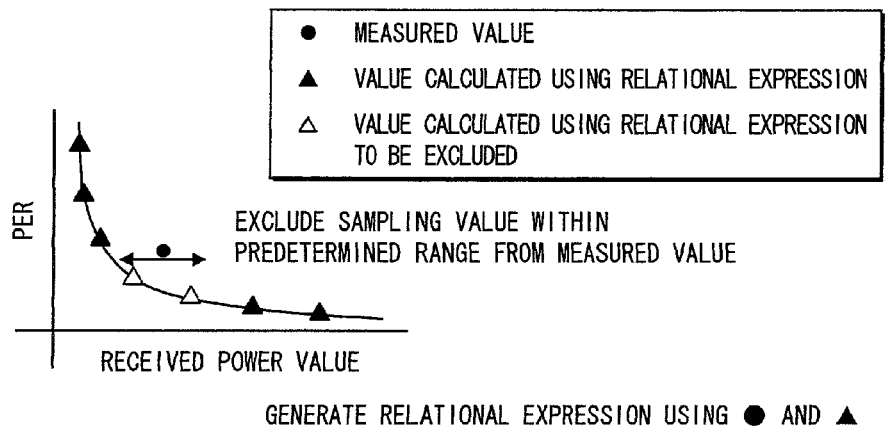

Then, the relational expression generation unit 15E determines a value necessary for correcting the relational expression in accordance with the procedures shown in FIGS. 11A and 11B. Firstly, the relational expression generation unit 15E reads a relational expression corresponding to a PHY rate used for measuring a PER from the relational expression management unit 15B via the reading processing unit 15C, and calculates values using the relational expression at predetermined intervals, and performs sampling (values represented by black triangles in FIG. 11A) (Step S33). Next, the relational expression generation unit 15E excludes, from targets of the sampling, values calculated using the relational expression (values represented by white triangles in FIG. 11B) that are within a predetermined range from the value received from the correction information creation unit 18 (a value represented by a black circle in FIG. 11B), and determines the value represented by the black circle and the values represented by the black triangles in FIG. 11B, as values to be used for generating a relational expression (Step S34). Then, the relational expression generation unit 15E generates a relational expression using the determined values (Step S35). This relational expression is a quadratic approximate expression generated using the least-squares method.

Figure 11C:
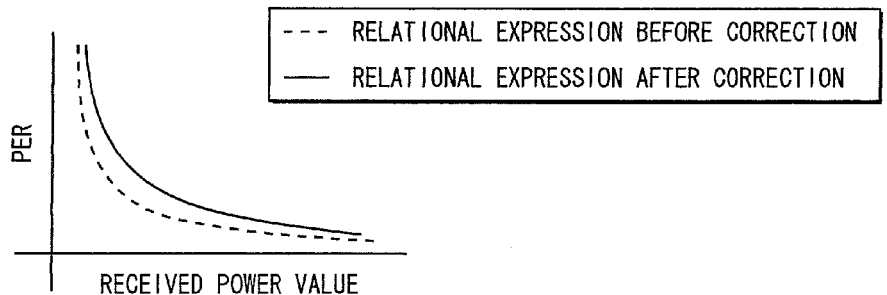

Lastly, the relational expression generation unit 15E changes, via the writing processing unit 15F, the relational expression corresponding to the PHY rate stored in advance in the relational expression management unit 15B into a relational expression shown in FIG. 11C (Step S36).

Note that before performing writing processing into the relational expression management unit 15B, the writing processing unit 15F transmits a suspension instruction to the reading processing unit 15C for suspending the reading into the relational expression management unit 15B. After completing the writing processing, the writing processing unit 15F transmits a cancellation instruction to the reading processing unit 15C for canceling the suspension instruction.

The relational expression stored in the PER estimation unit 15 is corrected in accordance with the procedures above described.

As have been described above, according to the first embodiment, the transmitter 10 estimates a PER for each PHY rate based on a reception power value, and calculates effective rates respectively corresponding to the PHY rates using the estimated PERs. Accordingly, it is possible to promptly perform data transmission at a PHY rate corresponding to the highest effective rate. Therefore, it is possible to efficiently use the wireless band at all times.

Also, in order to actually measure PERs, a history of the number of retransmissions and the number of errors of a certain number of packets (at least no less than 100 packets). Furthermore, PERs need to be measured for each PHY rate, and accordingly a period in the order of seconds is necessary. According to the first embodiment, PERs are estimated based on a reception power value. Reception power values do not depend on PHY rates, and a reception power value of a packet that has been successfully received is stable. Therefore, approximately several tens of packets are enough for creating the history necessary for PER measurement.

According to the first embodiment in which a PHY rate is determined using PERs estimated based on a reception power value, it is possible to promptly determine a PHY rate that is appropriate to the propagation state, and efficiently use the wireless band. Especially, in a case of real-time data transmission in which a permissible delay period of video and audio data is in the order of some tens ms, when the effective rate continues to lower in the order of seconds, data transmission delays, and interruption or distortion of video and audio is caused. Therefore, the present invention is effective in such a case.

Also, even if the propagation state varies during data transmission, and as a result the reception power value varies, it is possible to estimate PERs based on the varied reception power value to promptly determine a PHY rate in accordance with the variation in the propagation state.

Furthermore, by correcting a relational expression stored in the PER estimation unit 15 during data transmission, it is possible to determine a PHY rate appropriate to the real environment.

Moreover, the relational expression management unit 15B stores, in a Flash ROM, a relational expression that has been corrected once. When a PHY rate needs to be calculated next, the PER estimation unit 15 estimates a PHY rate using the relational expression stored in the Flash ROM. Accordingly, even after the transmitter 10 is powered off, the corrected relational expression remains stored in the Flash ROM. Therefore, when the transmitter 10 is powered on next, it is possible to use the corrected relational expression, and determine a PHY rate appropriate to the propagation environment.

Second Embodiment

The first embodiment has the structure in which a PHY rate corresponding to the highest effective rate is determined. The second embodiment has the structure in which a transmitter secures a band necessary for data transmission in accordance with the propagation state, in addition to the structure according to the first embodiment.

Figure 12:
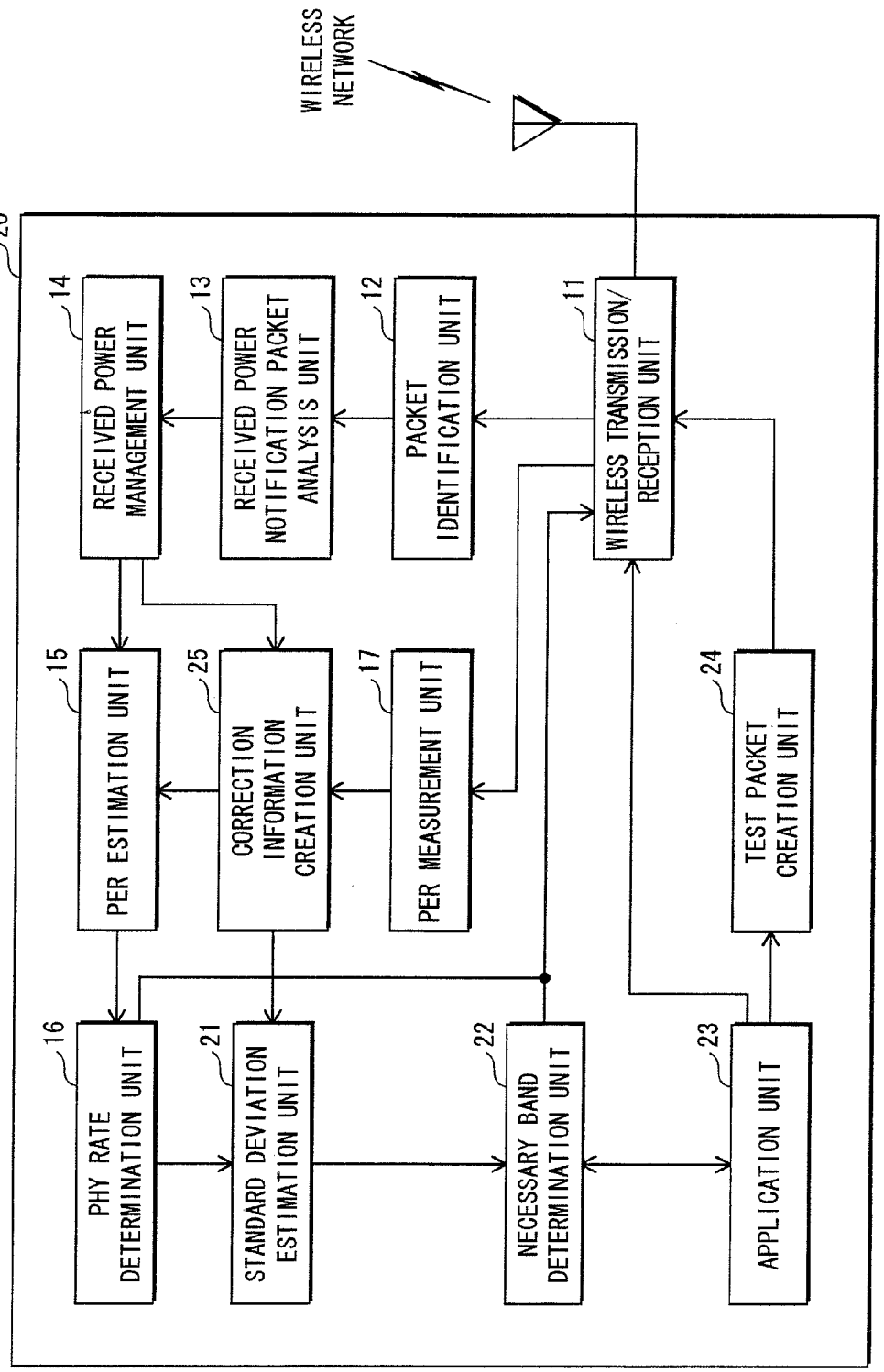
FIG. 12 is a functional block diagram showing a transmitter 20 according to a second embodiment of the present invention.

FIG. 12 is a functional block diagram showing a transmitter 20 according to the second embodiment of the present invention. In FIG. 12, compositional elements that are the same as those shown in FIG. 2 are denoted with the same reference numbers, and accordingly the descriptions thereof are omitted.

As shown in FIG. 12, the transmitter 20 includes a standard deviation estimation unit 21, a necessary band determination unit 22, an application unit 23, and a test packet creation unit 24, in addition to the compositional elements included in transmitter 10 according to the first embodiment. Also, the transmitter 20 includes a correction information creation unit 25, instead of the correction information creation unit 18 included in the transmitter 10.

The standard deviation estimation unit 21 estimates, based on a PER corresponding to a determined PHY rate received from the PHY rate determination unit 16, a PER standard deviation corresponding to the PER, and calculates a maximum PER (MAXPER=PER+standard deviation×2). A method how to estimate a standard deviation is described later. The standard deviation estimation unit 21 transmits the calculated MAXPER to the necessary band determination unit 22.

The necessary band determination unit 22 includes a memory such as a Flash ROM, and calculates a band necessary for data transmission based on the MAXPER transmitted by the standard deviation estimation unit 21. The necessary band determination unit 22 instructs the wireless transmission/reception unit 11 to perform data transmission in the calculated band.

The application unit 23 receives a transmission request from a user, and instructs the test packet creation unit 24 to create a test packet. Also, the application unit 23 receives a content rate input by the user, and transmits the received content rate to the necessary band determination unit 22.

The test packet creation unit 24 creates a test packet for measuring the propagation state in accordance with the instruction by the application unit 23, and transmits the created test packet to the wireless transmission/reception unit 11.

The correction information creation unit 25 has a function of creating information to be used for correcting a relational expression stored in the standard deviation estimation unit 21, in addition to the functions of the correction information creation unit 18 according to the first embodiment.

Note that a receiver according to the second embodiment is the same as the receiver 100 according to the first embodiment.

<Structure of Standard Deviation Estimation Unit 21>

Figure 13:
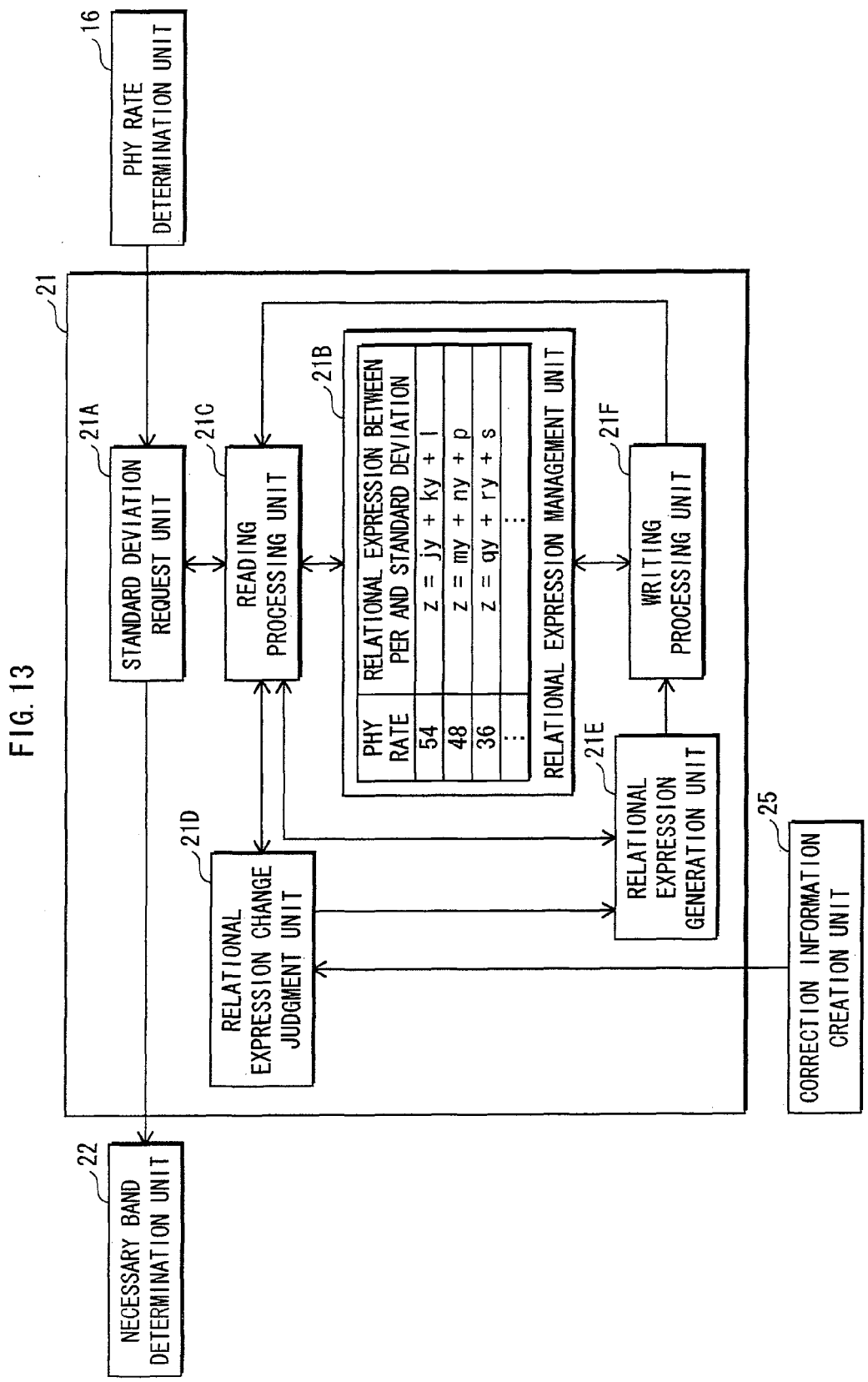
FIG. 13 is a functional block diagram showing a standard deviation estimation unit 21.

The internal functional structure of the standard deviation estimation unit 21 are described in further detail, with reference to FIG. 13. As shown in FIG. 13, the standard deviation estimation unit 21 includes a standard deviation request unit 21A, a relational expression management unit 21B, a reading processing unit 21C, a relational expression change judgment unit 21D, a relational expression generation unit 21E, and a writing processing unit 21F.

Figure 14:
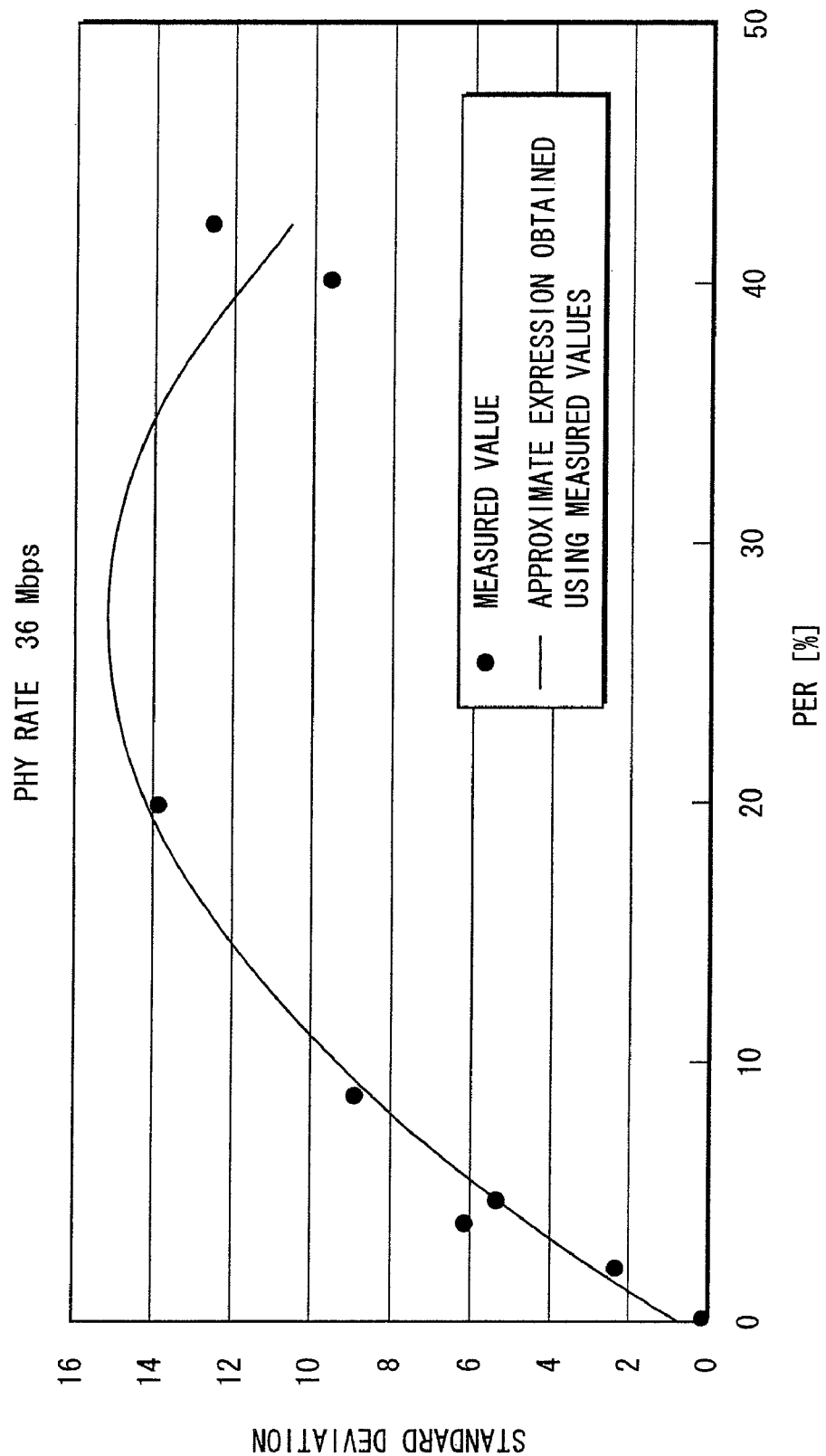
FIG. 14 shows a relational expression between PER and PER standard deviation.

The relational expression management unit 21B includes a memory such as a Flash ROM, and manages a relational expression between PER and PER standard deviation. FIG. 14 shows a solid line obtained from relational expressions. The relational expression management unit 21B manages in advance a relational expression for each PHY rate from which a solid line such as shown in FIG. 14 can be obtained. The following describes FIG. 14 in further detail. FIG. 14 shows a result of content transmission (approximately three hundred thousand packets) for five minutes at 36 Mbps PHY rate in IEEE802.11a and an approximate expression obtained based on this result of the content transmission. In the figure, an abscissa axis represents PER calculated based on the number of packet retransmissions for five minutes, and an ordinate axis represents PER standard deviation calculated based on a plurality of PERs, each of which is calculated for each 1000 packets. In the figure, the approximate expression is obtained based on the result of eight-time content transmission each using a different transmission power (black circles in the figure). The standard deviation request unit 21A can use this approximate expression as a relational expression to calculate a standard deviation of PERs based on a PER.

Upon receiving a determined PHY rate and a PER corresponding thereto from the PHY rate determination unit 16, the standard deviation request unit 21A reads a relational expression corresponding to the PHY rate from the relational expression management unit 21B via the reading processing unit 21C. The standard deviation request unit 21A calculates a standard deviation using the read relational expression and the received PER, and calculates a MAXPER (=PER+standard deviation×2) using the calculated standard deviation as a standard deviation estimated by the standard deviation estimation unit 21. Then, the standard deviation request unit 21A transmits the calculated MAXPER and the PHY rate determined by the PHY rate determination unit 16 to the necessary band determination unit 22.

Note that the above description relates to the case where a necessary band is determined before content transmission is performed. If a necessary band is changed during content transmission, the standard deviation request unit 21A may receive PERs for each PHY rate from the PHY rate determination unit 16, and then sequentially read a relational expression for each PHY rate. The standard deviation request unit 21A may calculate a standard deviation for each PHY rate using a corresponding read relational expression and a corresponding received PER for each PHY rate, and calculate a MAXPER using a corresponding calculated standard deviation, and transmit the calculated MAXPERs to the necessary band determination unit 22.

The reading processing unit 21C reads a relational expression for each PHY rate managed by the relational expression management unit 21B.

The relational expression change judgment unit 21D includes a memory such as a RAM, and judges whether it is necessary to change the relational expressions managed by the relational expression management unit 21B.

The relational expression generation unit 21E generates a relational expression between PER and PER standard deviation with respect to the determined PHY rate, using the relational expression managed by the relational expression management unit 21B and the information received from the relational expression change judgment unit 21D.

The writing processing unit 21F writes the relational expression generated by the relational expression generation unit 21E into the relational expression management unit 21B.

The details of the relational expression change judgment unit 21D, the relational expression generation unit 21E, and the writing processing unit 21F are described later in the <Operations of Correction Method>.

<Functions of Correction Information Creation Unit 25>

Figure 15:
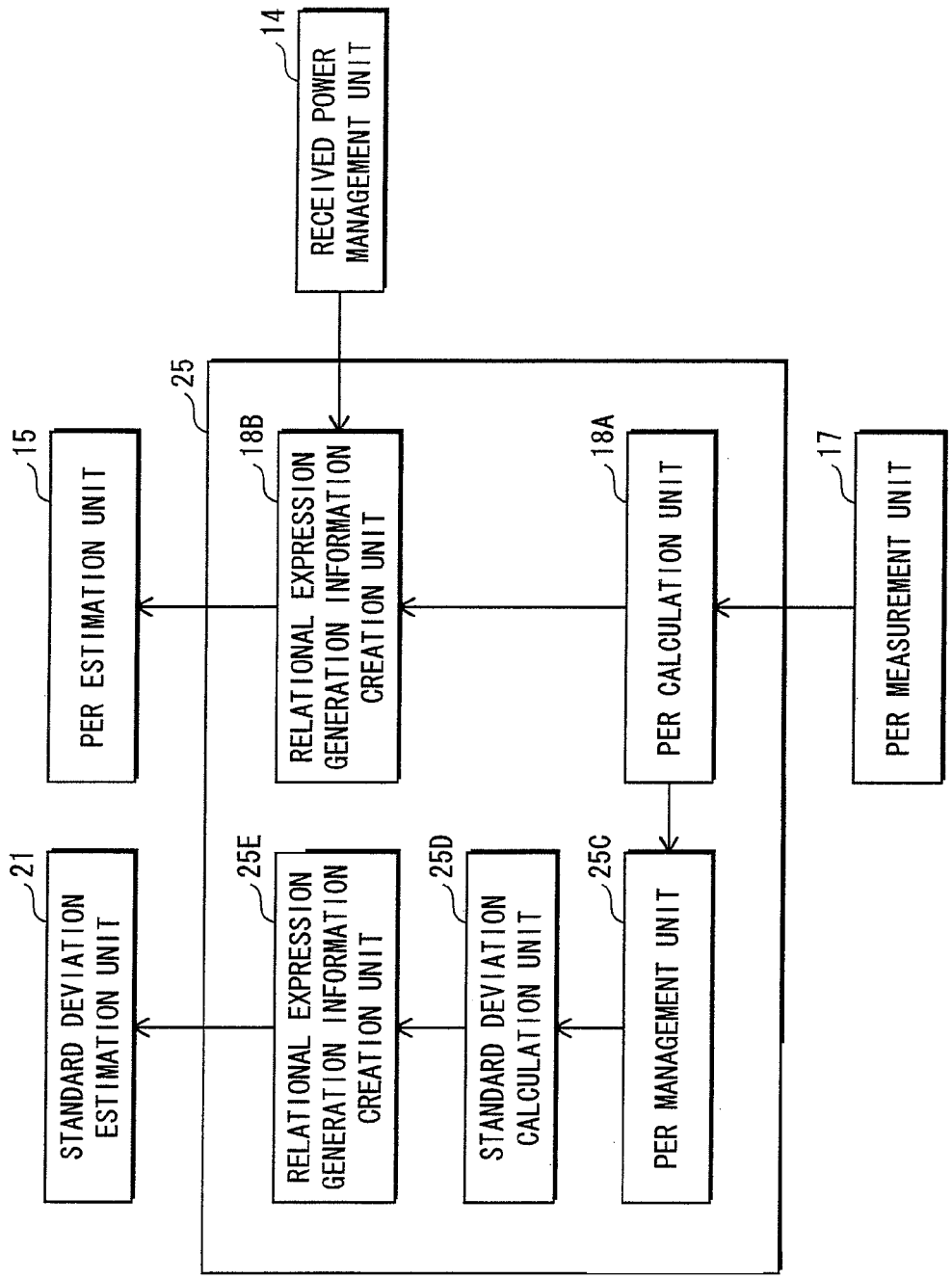
FIG. 15 is a functional block diagram showing a correction information creation unit 25.

Next, the functions of the correction information creation unit 25 are described in further detail with reference to FIG. 15. FIG. 15 is a functional block diagram showing the correction information creation unit 25. The correction information creation unit 25 includes a PER management unit 25C, a standard deviation calculation unit 25D, and a relational expression generation information creation unit 25E, in addition to the compositional elements of the correction information creation unit 18.

The PER management unit 25C includes a memory such as a RAM. The PER management unit 25C receives a PER and a PHY rate used for transmission from the PER calculation unit 18A, and stores therein the received PER. When the number of PERs stored therein reaches a predetermined number, the PER management unit 25C transmits the PERs stored therein and the received PHY rate to the standard deviation calculation unit 25D.

The standard deviation calculation unit 25D calculates a PER standard deviation using the PERs received from the PER management unit 25C, and transmits the calculated standard deviation, the PERs used for calculating the standard deviation, and the PHY rate to the relational expression generation information creation unit 25E.

The relational expression generation information creation unit 25E calculates the mean of the PERs received from the standard deviation calculation unit 25D, and transmits the calculated mean, the standard deviation and the PHY rate received from the standard deviation calculation unit 25D to the standard deviation estimation unit 21.

<PHY Rate Determination and Band Securement at Start of Content Transmission>

Figure 16:
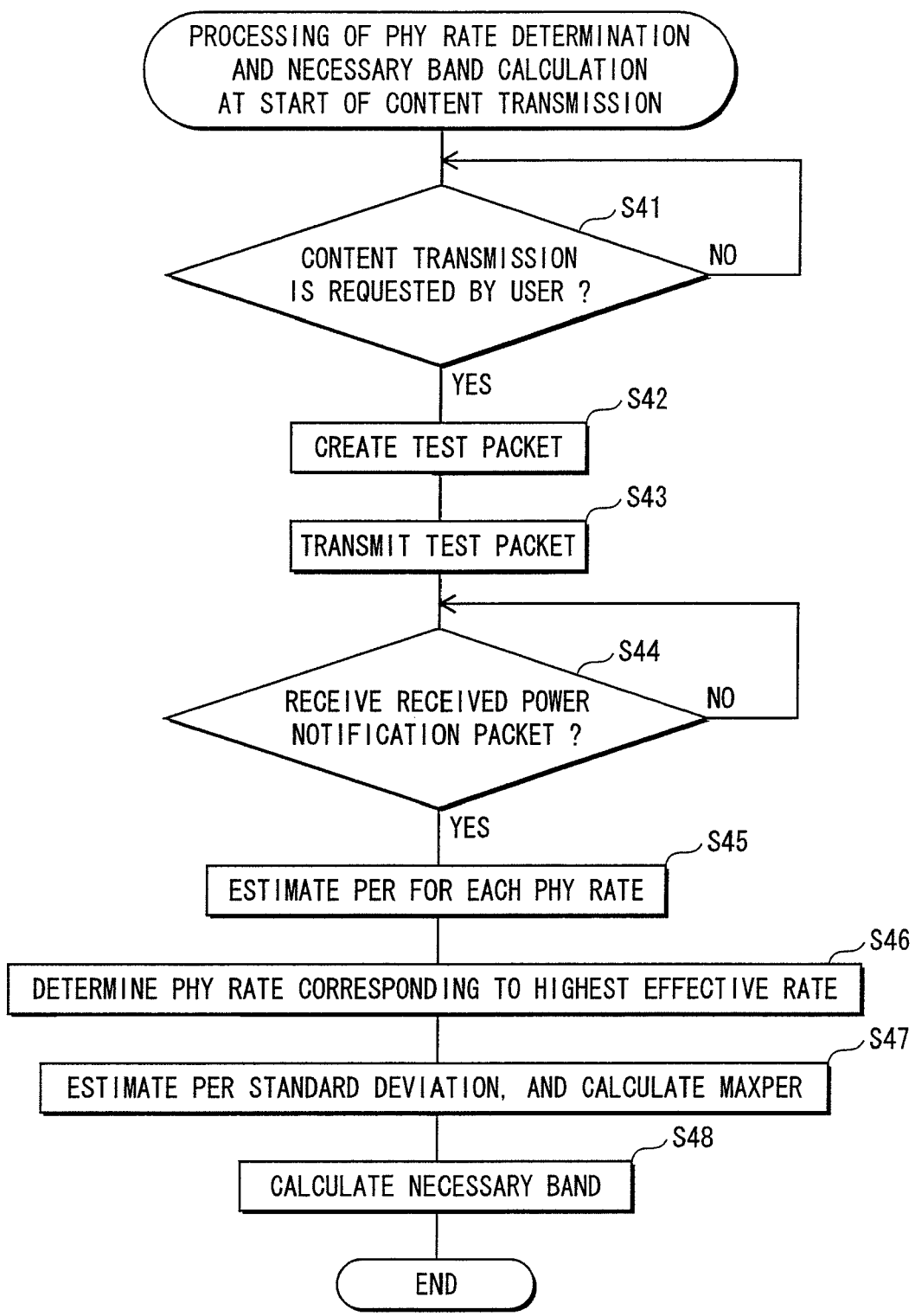
FIG. 16 is a flow chart showing processing of PHY rate determination and band securement at the start of content transmission.

The following describes processing of PHY rate determination and band securement. FIG. 16 is a flow chart showing processing of PHY rate determination and band securement at the start of content transmission according to the second embodiment of the present invention. Firstly, the application unit 23 judges whether content transmission is requested by a user (Step S41). If content transmission is requested (Step S41:YES), the application unit 23 transmits an address of the receiver 100 to the test packet creation unit 24. Upon receiving the address, the test packet creation unit 24 creates a test packet to be transmitted to the receiver 100 having the address (Step S42), and transmits the created packet to the wireless transmission/reception unit 11. Upon receiving the packet transmitted by the test packet creation unit 24, the wireless transmission/reception unit 11 modulates the received test packet, and outputs the modulated test packet to the wireless network via the antenna (Step S43).

Note that operations performed by the transmitter 20 and the receiver 100 from when the transmitter 20 transmits a test packet to when the PHY rate determination unit 16 of the transmitter 20 determines a PHY rate are the same as those according to the first embodiment, and accordingly the descriptions thereof are omitted here.

The PHY rate determination unit 16 determines a PHY rate corresponding to the highest effective rate (Step S46), and transmits the determined PHY rate to the wireless transmission/reception unit 11, and transmits the determined PHY rate and a PER corresponding thereto to the standard deviation estimation unit 21. The standard deviation estimation unit 21 calculates a standard deviation using a relational expression managed by the relational expression management unit 21E and the received PER, and calculates a MAXPER (=PER+ standard deviation×2) using the calculated standard deviation (Step S47).

Upon receiving the MAXPER and the PHY rate determined by the PHY rate determination unit 16 from the standard deviation estimation unit 21, the necessary band determination unit 22 acquires a content rate of a content to be transmitted, from the application unit 23, calculates a retransmission ratio based on the (Formula 1) and the MAXPER, and calculates a band necessary for transmitting the content based on the calculated retransmission ratio and the acquired content rate (Step S48). For example, if the MAXPER is 1.0% and the content rate is 10 Mbps, the necessary band is calculated as 11.1 Mbps (set to $P_{drop}=1.0E-8$). The necessary band determination unit 22 instructs the wireless transmission/reception unit 11 to secure the calculated necessary band, and notifies the application unit 23 of a response to the content transmission request.

Upon receiving the response to the content transmission request, the application unit 23 transmits the content to the wireless transmission/reception unit 11.

Upon receiving the instruction to secure the band from the necessary band determination unit 22, the wireless transmission/reception unit 11 secures the band for the wireless network.

Upon receiving the content, the wireless transmission/reception unit 11 packetizes the content, and transmits the packetized content (hereinafter, "content packet") at the PHY rate determined by the PHY rate determination unit 16. Also, the wireless transmission/reception unit 11 transmits the content packet in the band secured in accordance with the instruction by the necessary band determination unit 22.

<Change of PHY Rate and Band During Content Transmission>

Figure 17:
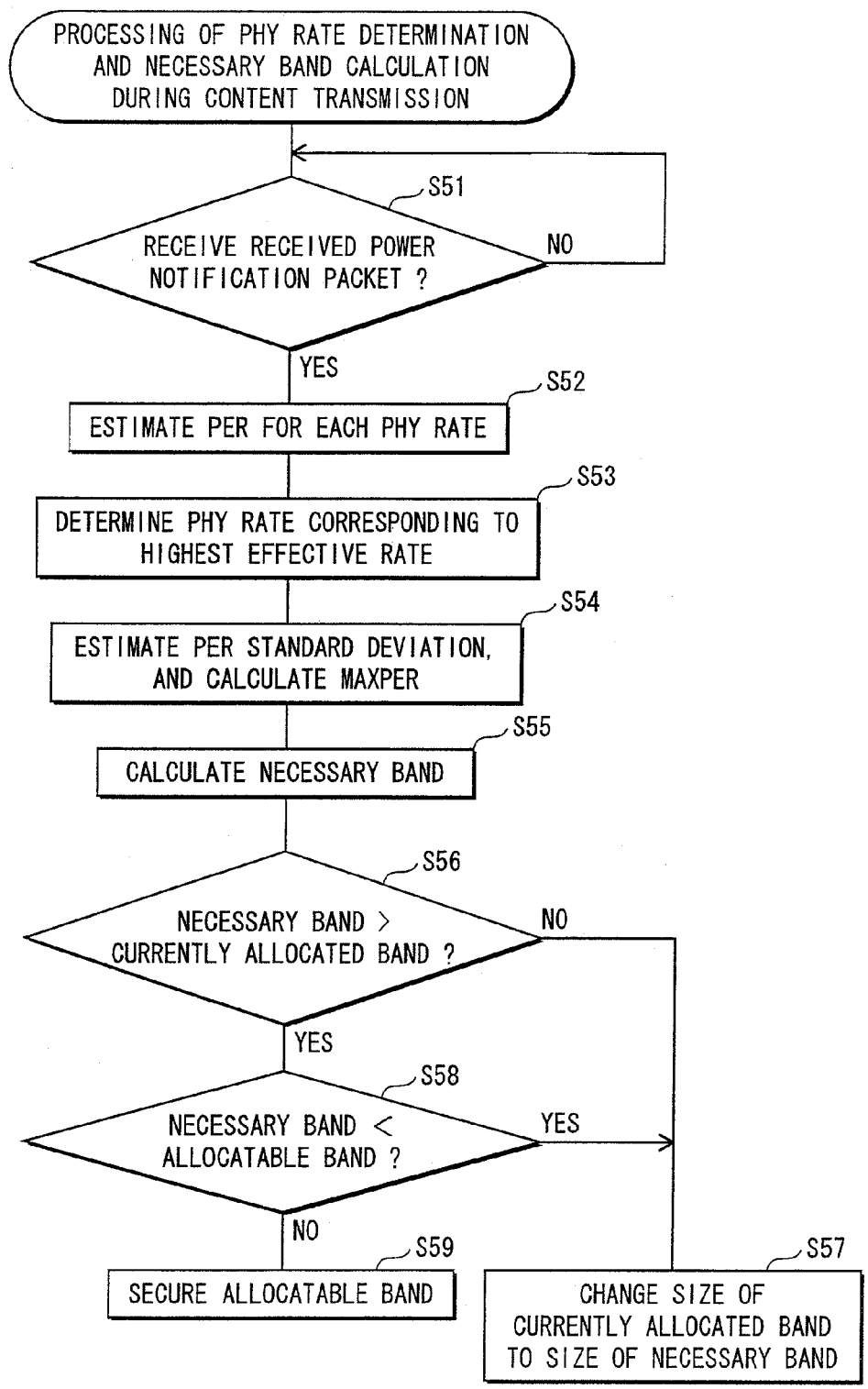
FIG. 17 is a flow chart showing processing of PHY rate determination and band securement during content transmission.

The following describes a method how to determine a PHY rate and a band during content transmission, with reference to a flow chart shown in FIG. 17. Note that Steps S51 to S55 shown in FIG. 17 are the same as Steps S44 to S48 shown in FIG. 16, and accordingly the descriptions thereof are omitted here.

The necessary band determination unit 22 calculates a necessary band, and compares a band currently allocated to a content (hereinafter, "currently allocated band") with the calculated necessary band (Step S56). As a result of the comparison, if the necessary band is smaller than the currently allocated band (Step S56: NO), the necessary band determination unit 22 instructs the wireless transmission/reception unit 11 to change the size of the currently allocated band to the size of the necessary band (Step S57). Upon receiving the instruction to change the band from the necessary band determination unit 22, the wireless transmission/reception unit 11 changes the band for the wireless network.

If the necessary band is larger than the currently allocated band (Step S56: YES), the necessary band determination unit 22 compares a band that can be allocated with the necessary band (Step S58). As a result of the comparison, if the necessary band is smaller than the allocatable band (Step S58: YES), the necessary band determination unit 22 instructs the wireless transmission/reception unit 11 to change the size of the currently allocated band to the size of the necessary band (Step S57). If the necessary band is larger than the allocatable band (Step S58: NO), the necessary band determination unit 22 instructs the wireless transmission/reception unit 11 to secure only the allocatable band (Step S59).

In accordance with the above method, the PHY rate and the band are changed during content transmission.

<Correction of Standard Deviation>

Figure 18:
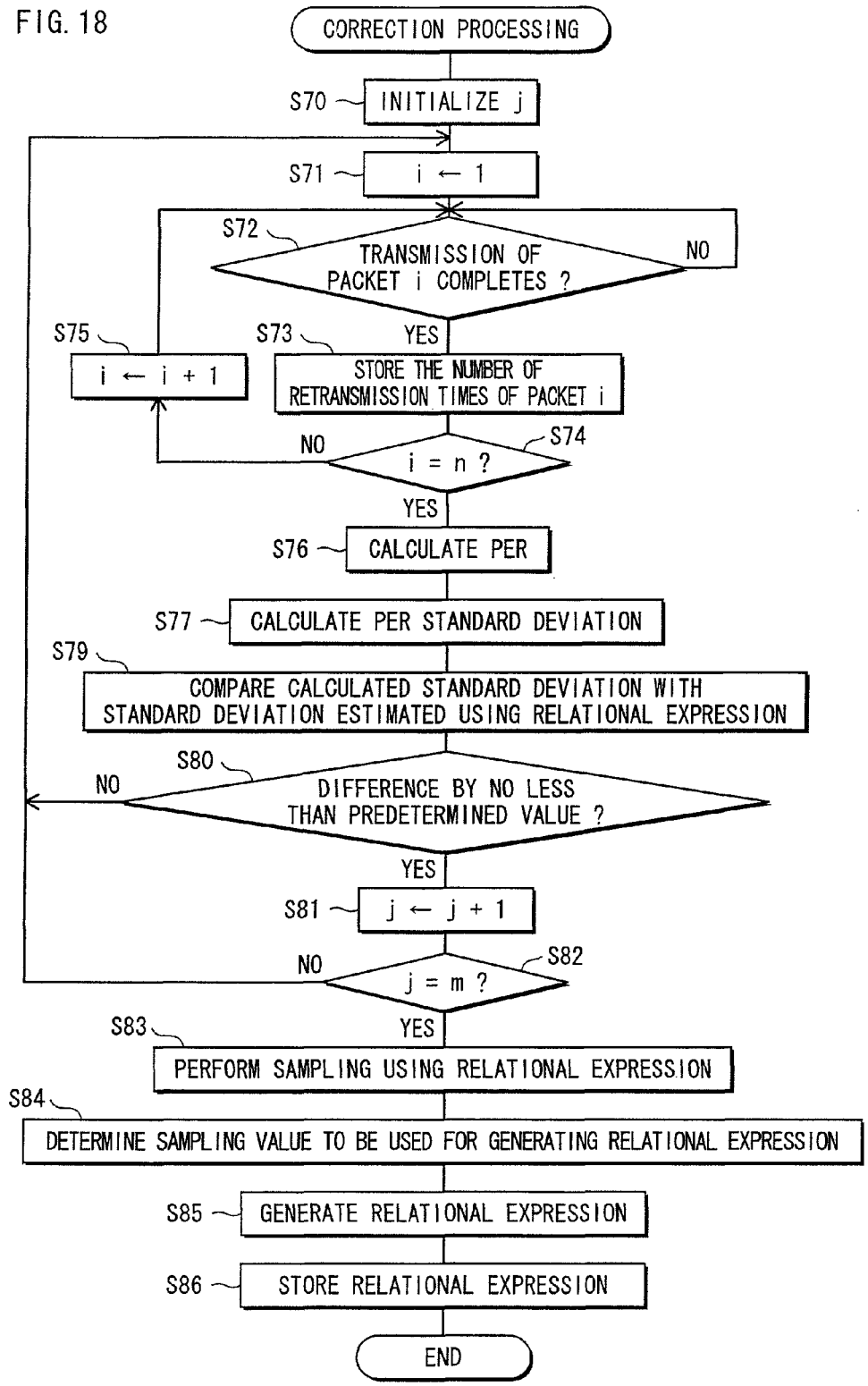
FIG. 18 is a flow chart showing correction processing.

The following describes a correction method of a relational expression (approximate expression shown in FIG. 14) managed by the standard deviation estimation unit 21, with reference to a flow chart shown in FIG. 18. In this flow chart, "i" is a variable number that represents one packet to be transmitted, and "n" represents the predetermined number of packets to be transmitted. Also, "j" is a variable number that represents the number of differences by no less than a predetermined value between a PER standard deviation calculated based on a relational expression and a PER standard deviation calculated by the standard deviation calculation unit 25D. "m" represents the predetermined permissible number of differences by no less than the predetermined value. Steps S70-S75 shown in FIG. 18 are the same as Steps S20-S25 shown in FIG. 10, and accordingly the descriptions thereof are omitted here.

The PER calculation unit 18A calculates a PER (Step S76). Then, when the number of PERs stored in the PER management unit 25C reaches a predetermined number, the PER management unit 25C transmits the stored PERs and a PHY rate corresponding thereto used for transmission to the standard deviation calculation unit 25D.

The standard deviation calculation unit 25D calculates a PER standard deviation using the PERs received from the PER management unit 25C (Step S77), and transmits the calculated PER standard deviation, the PERs used for calculating the PER standard deviation, and the PHY rate to the relational expression generation information creation unit 25E.

The relational expression generation information creation unit 25E calculates a mean of the PERs received from the standard deviation calculation unit 25D, and transmits, to the standard deviation estimation unit 21, the calculated PER mean, and the PER standard deviation and the PHY rate received from the standard deviation calculation unit 25D.

Upon receiving the PER mean, the standard deviation, and the PHY rate from the relational expression generation information creation unit 25E, the relational expression change judgment unit 21D reads a relational expression corresponding to the PHY rate from the relational expression management unit 21B via the reading processing unit 21C. Then, the relational expression change judgment unit 21D calculates a standard deviation using the read relational expression and the received mean, and compares the calculated standard deviation with the standard deviation calculated by the standard deviation calculation unit 25D (Step S79).

As a result of the comparison, the relational expression change judgment unit 21D judges whether there is a difference by no less than a predetermined value between these two standard deviations (Step S80). If the relational expression change judgment unit 21D judges negatively (Step S80: NO), the flow proceeds to Step S71. If judging affirmatively (Step S80: YES), the relational expression change judgment unit 21D increments the number of differences "j" by 1 (Step S81), and then judges whether "j" reaches the permissible number "m" (Step S82). If "j" does not reach "m" (Step S82: NO), the flow proceeds to Step S71. If "j" reaches "m" (Step S82: YES), the relational expression change judgment unit 21D judges that the relational expression needs to be corrected.

Then, the relational expression change judgment unit 21D transmits, to the relational expression generation unit 21E, the PER mean, the standard deviation, and the PHY rate received from the correction information creation unit 25.

Figure 19A:
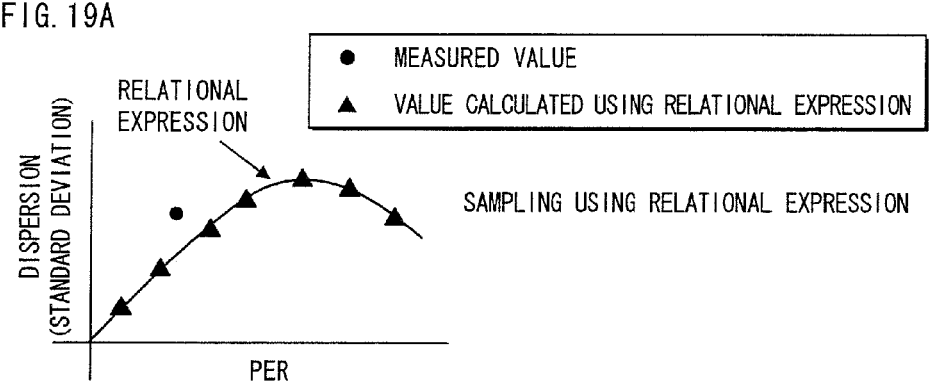
FIGS. 19A-19C show a method of correcting a relational expression.

Upon receiving the PER mean and the standard deviation from the relational expression change judgment unit 21D, the relational expression generation unit 21E determines a value necessary for correcting the relational expression in accordance with the procedures shown in FIGS. 19A and 19E. Firstly, the relational expression generation unit 21E reads a relational expression corresponding to a PHY rate used for transmitting a content from the relational expression management unit 21B via the reading processing unit 21C, and calculates values using the relational expression at predetermined intervals, and performs sampling (values represented by black triangles shown in FIG. 19A) (Step S83).

Figure 19B:
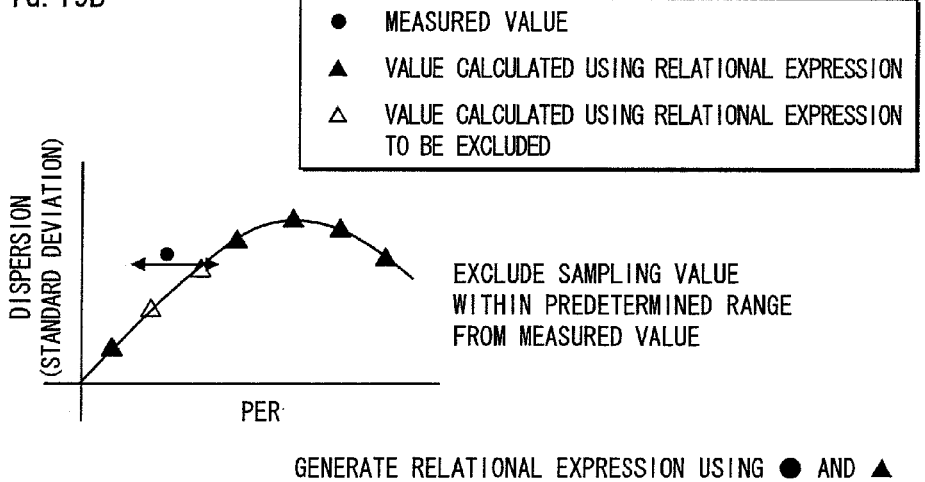

Next, the relational expression generation unit 21E excludes, from targets of the sampling, values calculated using the relational expression (values represented by a white triangles in FIG. 19B) that are within a predetermined range from the value received from the correction information creation unit 25 (a value represented by a black circle in FIG. 19B), and determines the value represented by the black circle and the values represented by the black triangles in FIG. 19B, as values to be used for generating a relational expression (Step S84).

The relational expression generation unit 21E generates a relational expression using the determined values (Step S85). This relational expression is a quadratic approximate expression generated using the least-squares method.

Figure 19C:
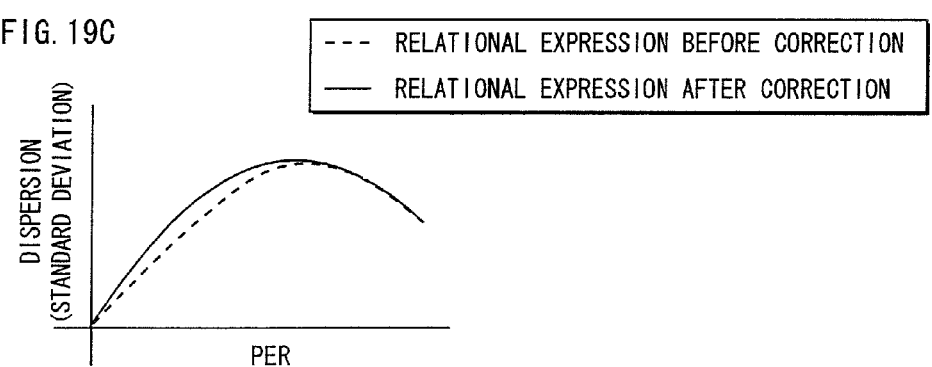

Lastly, the relational expression generation unit 21E changes the relational expression corresponding to the PHY rate to the relational expression shown in FIG. 19C via the writing processing unit 21F (Step S86).

Note that before performing writing processing into the relational expression management unit 21B, the writing processing unit 21F transmits a suspension instruction to the reading processing unit 21C for suspending the reading into the relational expression management unit 21B. After completing the writing processing, the writing processing unit 21F transmits a cancellation instruction to the reading processing unit 21C for canceling the suspension instruction.

The standard deviation estimation unit 21 corrects the relational expression in accordance with the procedures above described.

As have been described above, according to the second embodiment, a PER for each PHY rate is estimated based on a reception power value, and a PER standard deviation is estimated using the estimated PER. Then, a MAXPER (PER+standard deviation×2) is calculated based on the PER and the PER standard deviation, and a band necessary for content transmission at a PHY rate corresponding to the highest effective rate is secured using the calculated MAXPER. Accordingly, it is possible to perform stable content transmission.

Also, in order to actually measure PERs, a history of the number of retransmissions and the number of errors of a certain number of packets (at least no less than 100 packets). Furthermore, PERs need to be measured for each PHY rate, and accordingly a period in the order of seconds is necessary. According to the second embodiment, a PER is estimated based on a reception power value. Reception power values do not depend on PHY rates, and a reception power value of a packet that has been successfully received is stable. Therefore, approximately several tens of packets are enough for creating the history necessary for PER measurement.

Therefore, according to the second embodiment in which the necessary band is determined using the MAXPER calculated based on the reception power value, an effect is exhibited that it is possible to promptly determine a necessary band in accordance with the propagation state, and reduce the waiting period of the user.

Also, even when the propagation state constantly varies during content transmission due to an obstacle or the like and as a result the reception power value varies, a standard deviation is estimated using a PER estimated using the varied reception power value, and a MAXPER is calculated. Accordingly, it is possible to determine PHY rate and a band in accordance with the variation in the propagation state.

Also, a band necessary for content transmission is secured using a MAXPER (PER+PER standard deviation×2), and accordingly it is possible to address over 90% of errors whose occurrence can be predicted, and secure a band in consideration of variation in PER. This realizes stable content transmission.

Furthermore, the relational expressions respectively stored in the PER estimation unit 15 and the standard deviation estimation unit 21 are corrected during content transmission. Accordingly, it is possible to determine a PHY rate and a band that are more appropriate to the real environment.

Moreover, the relational expression management unit 21B stores, in a Flash ROM, a relational expression that has been corrected once. When a standard deviation needs to be calculated next, the relational expression management unit 21B estimates a standard deviation using the relational expression stored in the Flash ROM. Accordingly, even after the transmitter 20 is powered off, the corrected relational expression remains stored in the Flash ROM. Therefore, when the transmitter 20 is powered on next, it is possible to use the corrected relational expression, and determine a PHY rate and a band that are appropriate to the propagation environment.

Third Embodiment

The second embodiment has the structure in which if an allocatable band is smaller than a necessary band, only the allocatable band is secured. The third embodiment has the structure in which a content rate is changed depending on the size of an allocatable band.

Figure 20:
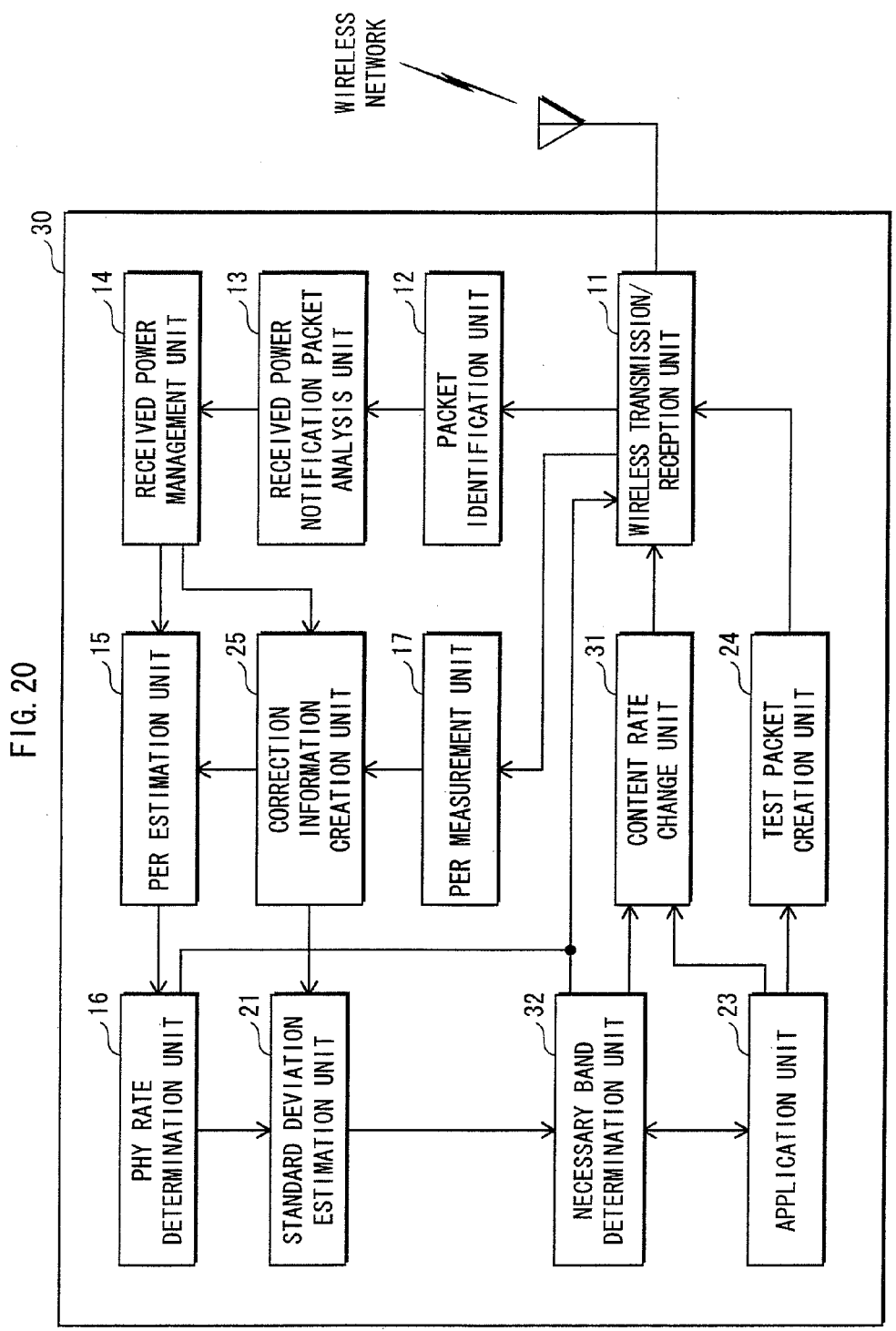
FIG. 20 is a functional block diagram showing a transmitter 30 according to a third embodiment of the present invention.

FIG. 20 is a functional block diagram showing the transmitter 30 according to the third embodiment of the present invention. In FIG. 20, compositional elements that are the same as those shown in FIGS. 2 and 12 are denoted with the same reference numbers, and accordingly the descriptions thereof are omitted.

As shown in FIG. 20, the transmitter 30 includes a content rate change unit 31, in addition to the compositional elements included in the transmitter 20 according to the second embodiment.

Also, the transmitter 30 includes a necessary band determination unit 32, instead of the necessary band determination unit 22 included in the transmitter 20.

The content rate change unit 31 changes a content rate of a content in accordance with an instruction by the necessary band determination unit 32.

The necessary band determination unit 32 has a function of determining a content rate of a content to be transmitted depending on the size of an allocatable band, in addition to the functions of the necessary band determination unit 22.

Note that a receiver according to the third embodiment is the same as the receiver 100 according to the first embodiment.

<Functions of Necessary Band Determination Unit 32>

Figure 21:
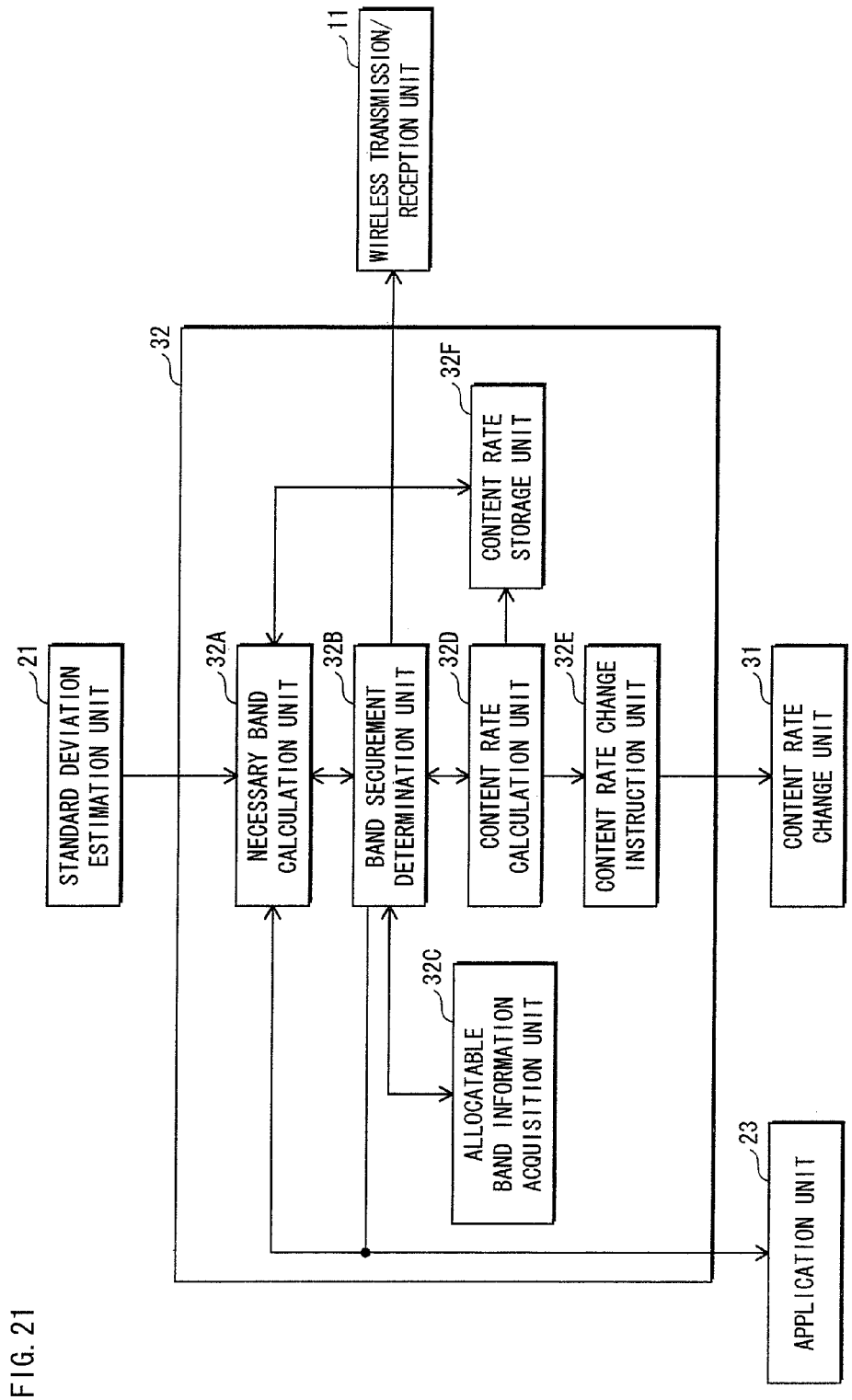
FIG. 21 is a functional block diagram showing a necessary band determination unit 32.

The functions of the necessary band determination unit 32 are described in further detail with reference to FIG. 21. As shown in FIG. 21, the necessary band determination unit 32 includes a necessary band calculation unit 32A, a band securement determination unit 32B, an allocatable band information acquisition unit 32C, a content rate calculation unit 32D, a content rate change instruction unit 32E, and a content rate storage unit 32F.

The necessary band calculation unit 32A calculates a band necessary for transmitting a content at a PHY rate determined by the PHY rate determination unit 16, and transmits the calculated necessary band to the band securement determination unit 32B.

The band securement determination unit 32B determines a band to be secured, based on the necessary band received from the necessary band calculation unit 32A and an allocatable band received from the allocatable band information acquisition unit 32C.

The allocatable band information acquisition unit 32C acquires information of an allocatable band, and transmits the acquired information to the band securement determination unit 32B.

The content rate calculation unit 32D determines a content rate of a content to be transmitted, and transmits the determined content rate to the content rate change instruction unit 32E and the content rate storage unit 32F.

The content rate change instruction unit 32E instructs the content rate change unit 31 to transmit the content at the content rate received from the content rate calculation unit 32D.

The content rate storage unit 32F includes a memory such as a RAM, and stores therein the content rate received from the content rate calculation unit 32D.

<Determination of PHY Rate, Band, and Content Rate at Start of Content Transmission>

Figure 22:
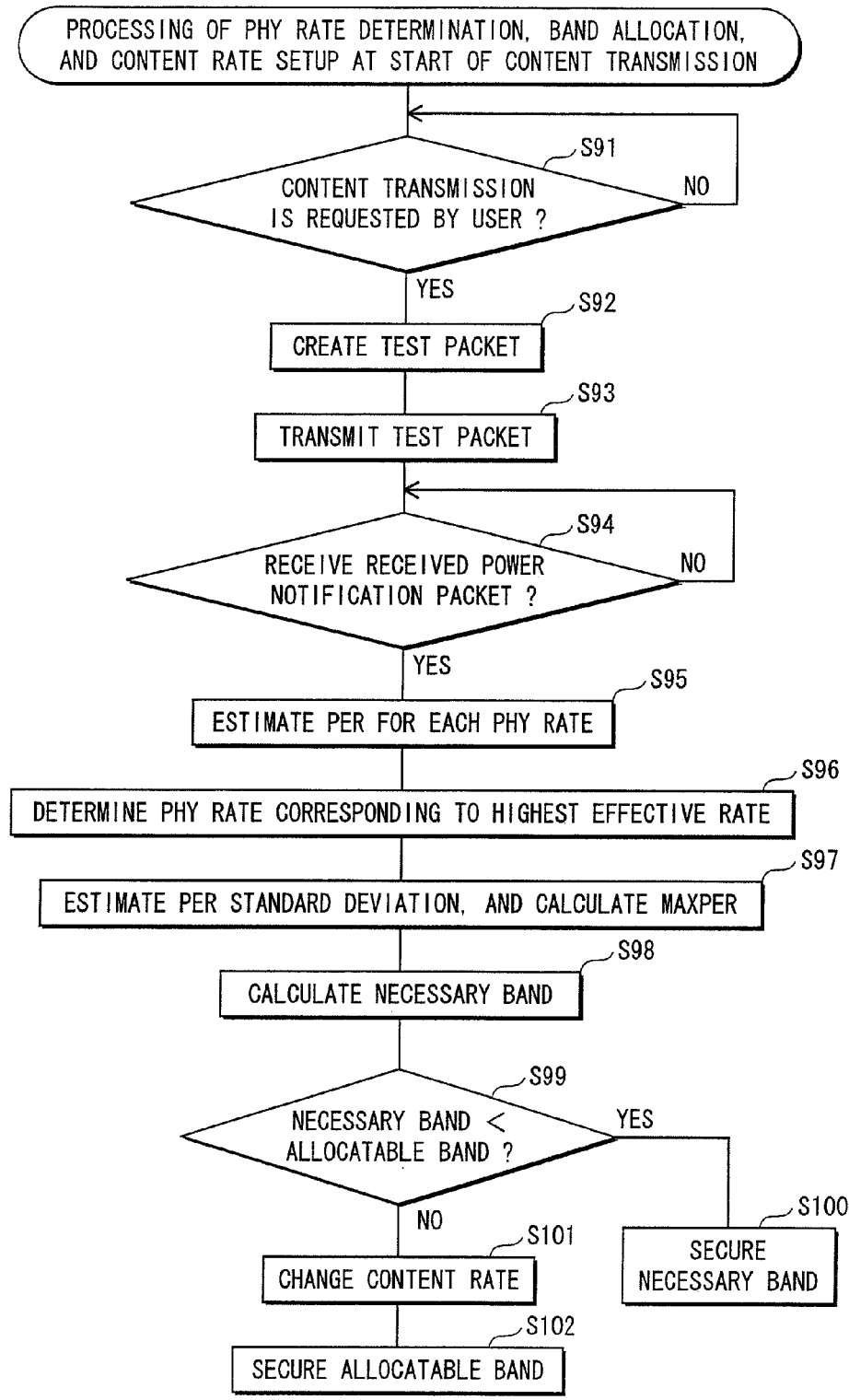
FIG. 22 is a flow chart showing processing of PHY rate determination, band allocation, and content rate determination at the start of content transmission.

Next, the following describes processing of determining a PHY rate, a band, and a content rate at the start of content transmission. FIG. 22 is a flow chart showing processing of determining a PHY rate, a band, and a content rate at the start of content transmission according to the third embodiment of the present invention.

Note that Steps S91-S97 shown in FIG. 22 are the same as Steps S41-S47 shown in FIG. 16 according to the second embodiment, and accordingly the descriptions thereof are omitted.

Upon receiving a PHY rate determined by the PHY rate determination unit 16 and a MAXPER corresponding thereto from the standard deviation estimation unit 21, the necessary band calculation unit 32A acquires a content rate of a content to be transmitted, from the application unit 23. Then, the necessary band calculation unit 32A calculates a band necessary for transmitting the content based on the (Formula 1) and the received MAXPER, and transmits the calculated necessary band and a retransmission ratio calculated based on the (Formula 1), to the band securement determination unit 32B (Step S98).

Upon receiving the necessary band for transmitting the content and the retransmission ratio, the band securement determination unit 32B acquires information of a currently allocatable band for the wireless network from the allocatable band information acquisition unit 32C, and compares the acquired allocatable band with the necessary band (Step S99).

If the necessary band is smaller than the allocatable band (Step S99: YES), the band securement determination unit 32B instructs the wireless transmission/reception unit 11 to secure the necessary band, and notifies the application unit 23 of a response to the content transmission request (Step S100).

If the necessary band is larger than the allocatable band (Step S99: NO), the band securement determination unit 32B transmits the allocatable band and the retransmission ratio to the content rate calculation unit 32D.

Upon receiving the allocatable band and the retransmission ratio from the band securement determination unit 32B, the content rate calculation unit 32D calculates a content rate at which the content can be transmitted over the allocatable band, using the following (Formula 3).

$$\text{content rate at which content can be transmitted} = \text{allocatable band/retransmission ratio} \quad \text{(Formula 3)}$$

For example, an allocatable band is 10 Mbps and a retransmission ratio is 1.4, a content rate at which a content can be transmitted is calculated as follows: $(10\times(10/14))$=approximately 7 Mbps.

Next, the content rate calculation unit 32D transmits the calculated content rate at which the content can be transmitted to the content rate change instruction unit 32E and the content rate storage unit 32F, and requests the band securement determination unit 32B to secure the allocatable band.

The content rate change instruction unit 32E instructs the content rate change unit 31 to change the current content rate to the content rate received from the content rate calculation unit 32D.

Upon receiving the instruction to change the content rate from the necessary band determination unit 32, the content rate change unit 31 changes the current content rate to the instructed content rate (Step S101).

Upon receiving the request to secure the allocatable band from the content rate calculation unit 32D, the band securement determination unit 32B instructs the wireless transmission/reception unit 11 to secure the allocatable band, and notifies the application unit 23 of a response to the content transmission request.

Upon receiving the instruction to secure the allocatable band from the necessary band determination unit 32, the wireless transmission/reception unit 11 secures the allocatable band for the wireless network (Step S102).

Upon receiving the response to the content transmission request, the application unit 23 transmits the content to the content rate change unit 31.

The content rate change unit 31 transmits the received content to the wireless transmission/reception unit 11.

Upon receiving the content, the wireless transmission/reception unit 11 packetizes the received content, and transmits the packetized content (content packet) at the PHY rate determined by the determination unit 16.

Also, the wireless transmission/reception unit 11 transmits the content packet over the band secured in accordance with the instruction by the necessary band determination unit 32.

<Determination of PHY Rate, Band, and Content Rate During Content Transmission>

Figure 23:
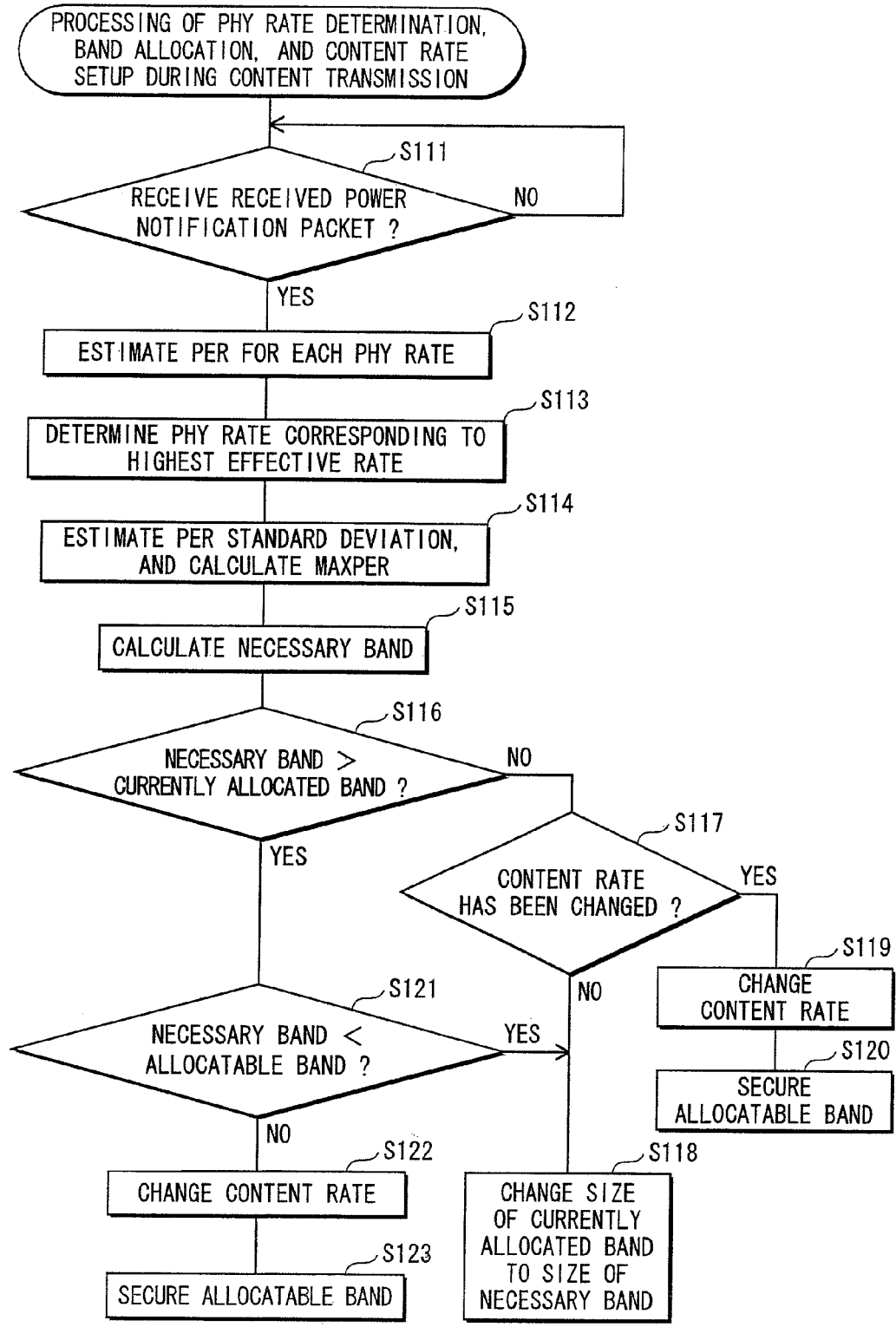
FIG. 23 is a flow chart showing processing of PHY rate determination, band allocation, and content rate determination during content transmission.

Next, the following describes a method of determining a PHY rate, a band, and a content rate during content transmission, with reference to a flow chart shown in FIG. 23.

FIG. 23 is a flow chart showing processing of determining a PHY rate, a band, and a content rate during content transmission. If a necessary band is larger than an allocatable band, processing of changing a content rate is performed in Step S119 in FIG. 23. This is the difference from processing shown in FIG. 17 according to the second embodiment. Note that Steps S111-S114 shown in FIG. 23 are the same as Steps S51-S54 shown in FIG. 17, and accordingly the descriptions thereof are omitted.

The standard deviation estimation unit 21 calculates an MAXPER corresponding to a PHY rate corresponding to the highest effective rate (Step S114), and transmits the calculated MAXPER to the necessary band determination unit 32.

Upon receiving the MAXPER corresponding to PHY rate corresponding to the highest effective rate from the standard deviation estimation unit 21, the necessary band calculation unit 32A acquires a content rate of a content stored in the content rate storage unit 32F, and calculates a retransmission ratio based on the (Formula 1) and the received MAXPER, and calculates a band necessary for transmitting the content based on the calculated retransmission ratio and the acquired content rate (Step S115). Then, the necessary band calculation unit 32A transmits the calculated necessary band and retransmission ratio to the band securement determination unit 32B.

The band securement determination unit 32B compares a band currently allocated to the content (hereinafter, "currently allocated band") with the necessary band (Step S116).

If the necessary band is smaller than the currently allocated band (Step S116: NO), the band securement determination unit 32B judges whether the content rate has been already changed (lowered) (Step S117). If the content rate has not been changed yet (Step S117: NO), the band securement determination unit 32B instructs the wireless transmission/reception unit 11 to change the size of the currently allocated band to the size of the necessary band (Step S118). If the content rate has been already changed (Step S117: YES), the band securement determination unit 32B transmits the currently allocated band and the retransmission ratio to the content rate calculation unit 41D.

The content rate calculation unit 32D calculates a content rate at which a content can be transmitted, using the (Formula 3) and the currently allocated band as an allocatable band, and transmits the calculated content rate to the content rate change instruction unit 32E and the content rate storage unit 1F, and requests the band securement determination unit 32B to secure the allocatable band.

The content rate change instruction unit 32E instructs the content rate change unit 31 to change the content rate to the content rate transmitted from the content rate calculation unit 32D.

Note that the content rate transmitted from the content rate calculation unit 32D is higher than the original content rate (the content rate acquired from the application unit 23), the content rate change instruction unit 32E instructs the content rate change unit 31 to cancel changing the content rate.

Upon receiving an instruction to change the content rate or cancel changing the content rate from the content rate change instruction unit 32E, the content rate change unit 31 changes the content rate or cancels changing the content rate in accordance with the received instruction (Step S119).

The content rate storage unit 32F stores therein the content rate at which the content can be transmitted, which has been received from the content rate calculation unit 32D. If the received content rate is higher than the original content rate, the content rate storage unit 32F stores therein the original content rate.

Upon receiving a request to secure an allocatable band from the content rate calculation unit 32D, the band securement determination unit 32B instructs the wireless transmission/reception unit 11 to secure the allocatable band.

Upon receiving the instruction to secure the allocatable band from the content rate calculation unit 32D, the wireless transmission/reception unit 11 secures the allocatable band for the wireless network (Step S120).

If the necessary band is larger than the currently allocated band (Step S116: YES), the band securement determination unit 32B acquires an allocatable band from the allocatable band information acquisition unit 32C, and compares the allocatable band with the necessary band (Step S121).

If the necessary band is smaller than the allocatable band (Step S121: YES), the band securement determination unit 32B instructs the wireless transmission/reception unit 11 to change the size of the currently allocated band to the size of the necessary band (Step S118).

If the necessary band is larger than the allocatable band (Step S121: NO), the band securement determination unit 32B transmits the allocatable band and the retransmission ratio to the content rate calculation unit 32D.

Upon receiving the allocatable band and the retransmission ratio from the band securement determination unit 32B, the content rate calculation unit 32D calculates a content rate at which the content can be transmitted over the allocatable band, using the (Formula 3). Then, the content rate calculation unit 32D transmits the calculated content rate at which the content can be transmitted, to the content rate change instruction unit 32E and the content rate storage unit 32F, and requests the band securement determination unit 32B to secure the allocatable band.

The content rate change instruction unit 32E instructs the content rate change unit 31 to change the current content rate to the content rate received from the content rate calculation unit 32D.

Upon receiving the instruction to change the content rate from the content rate change instruction unit 32E, the content rate change unit 31 changes the current content rate of the content being transmitted, in accordance with the received instruction (Step S122).

Upon receiving the request to secure the allocatable band from the content rate calculation unit 32D, the band securement determination unit 32B instructs the wireless transmission/reception unit 11 to secure the allocatable band.

Upon receiving the instruction to secure the allocatable band from the content rate calculation unit 32D, the wireless transmission/reception unit 11 secures the allocatable band for the wireless network (Step S123).

In the manner above described, a PHY rate is determined and a band and a content rate are changed during content transmission.

As have been described above, according to the third embodiment, if an allocatable band is smaller than a band necessary for transmitting a content, a current content rate of the content is changed to a content rate at which the content can be transmitted over the allocated band. Accordingly, it is possible to realize stable content transmission.

Fourth Embodiment

Change of Necessary Band: Change of Standard Deviation Permissible Value "N"

According to the second and third embodiments, an MAXPER is calculated as (PER+standard deviation×2). According to the fourth embodiment, an MAXPER is changed depending on the distribution of a plurality of PERs used for calculating a standard deviation.

Figure 24:
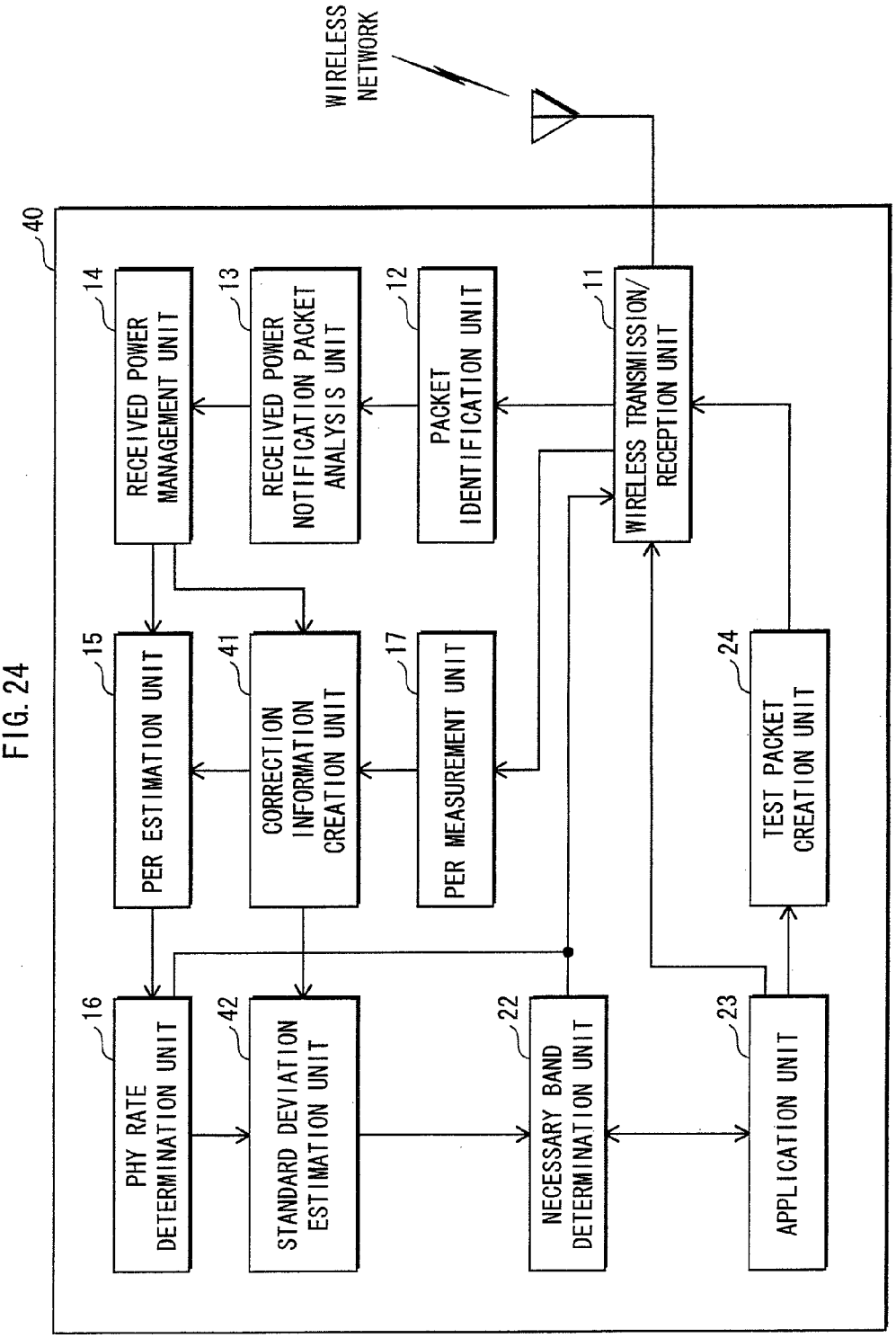
FIG. 24 is a functional block diagram showing a transmitter 40 according to a fourth embodiment of the present invention.

FIG. 24 is a functional block diagram showing the transmitter 40 according to the fourth embodiment of the present invention. In FIG. 24, compositional elements that are the same as those shown in FIG. 12 are denoted with the same reference numbers, and accordingly the descriptions thereof are omitted.

As shown in FIG. 24, the transmitter 40 includes a correction information creation unit 41 instead of the correction information creation unit 18 and a standard deviation estimation unit 42 instead of the standard deviation estimation unit 21. The correction information creation unit 41 has a function of calculating the distribution of a plurality of PERs used for calculating a standard deviation, in addition to the functions of the correction information creation unit 18. The standard deviation estimation unit 42 has a function of changing an MAXPER depending on the variation in a standard deviation, in addition to the functions of the standard deviation estimation unit 21. Other compositional elements of the transmitter 40 are the same as those of the transmitter 20 according to the second embodiment.

Note that a receiver according to the fourth embodiment is the same as the receiver 100 according to the first embodiment.

The following describes processing of changing an MAXPER during content transmission.

Note that, a necessary band is calculated using an MAXPER, which is calculated as (PER+standard deviation×2) at the start of content transmission, and a necessary band is calculated using the calculated MAXPER, and the calculated necessary band id secured.

<Functions of Correction Information Creation Unit 41>

Figure 25:
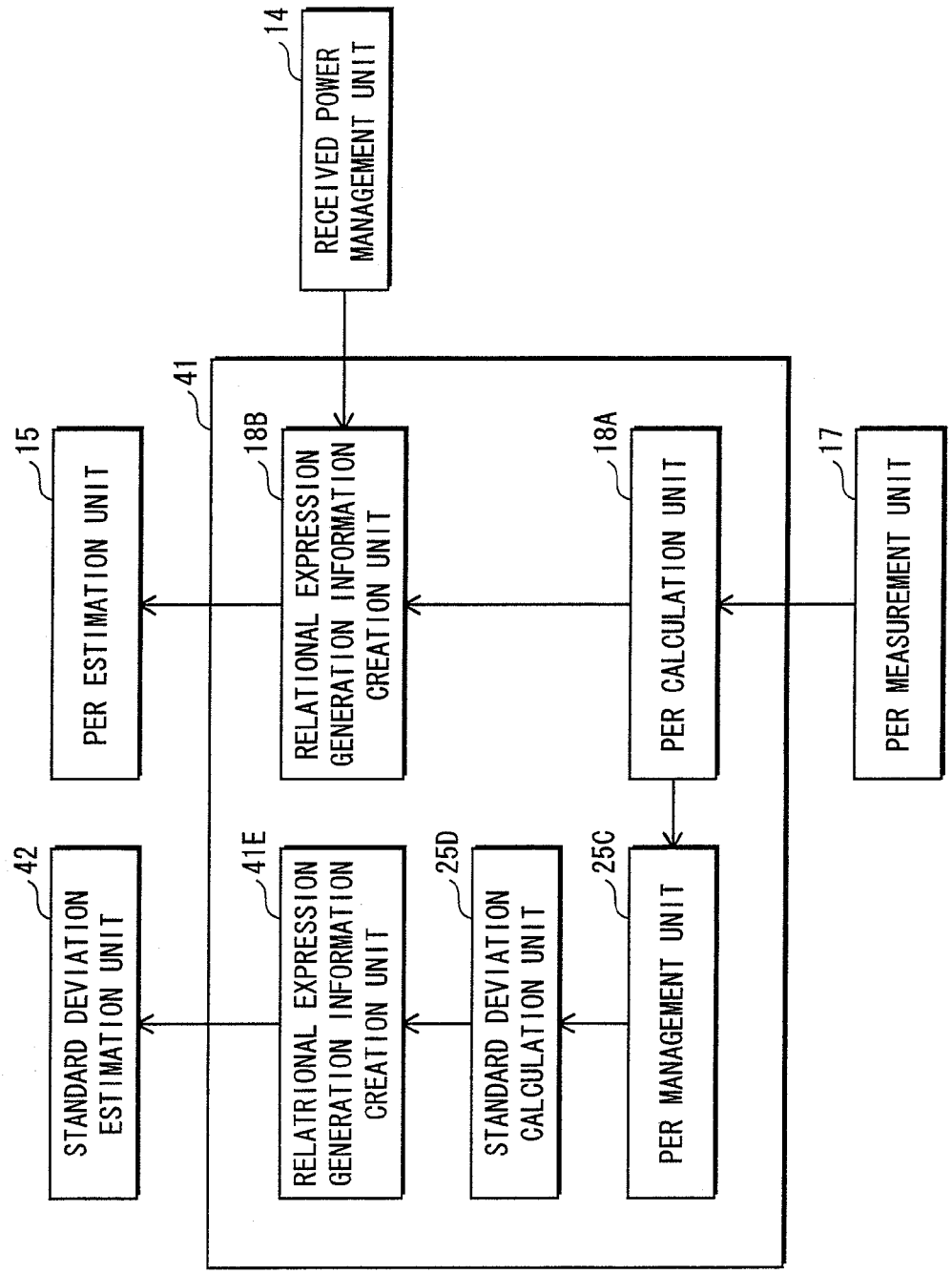
FIG. 25 is a functional block diagram showing a correction information creation unit 41.

The functions of the correction information creation unit 41 are described in further detail with reference to FIG. 25. In FIG. 25, compositional elements that are the same as those shown in FIG. 15 are denoted with the same reference numbers, and accordingly the descriptions thereof are omitted. As shown in FIG. 25, the correction information creation unit 41 includes a relational expression generation information creation unit 41E instead of the relational expression generation information creation unit 25E according to the second embodiment. The relational expression generation information creation unit 41E has a function of calculating a percentage of PERs falling within a range from the mean of PERs minus a standard deviation to the mean of PERs plus the standard deviation among a plurality of PERs used by the standard deviation calculation unit 25D for calculating the standard deviation, in addition to the functions of the relational expression generation information creation unit 25E. Other compositional elements of the correction information creation unit 41 are the same as those of the correction information creation unit 25 according to the second embodiment.

The relational expression generation information creation unit 41E calculates the mean of the plurality of PERs received from the standard deviation calculation unit 25D, and calculates a distribution (percentage) of PERs falling within a range from the mean minus the standard deviation to the mean plus the standard deviation among the PERs. The relational expression generation information creation unit 41E transmits the calculated percentage and the mean of the PERs to the standard deviation estimation unit 42.

<Functions of Standard Deviation Estimation Unit 42>

Figure 26:
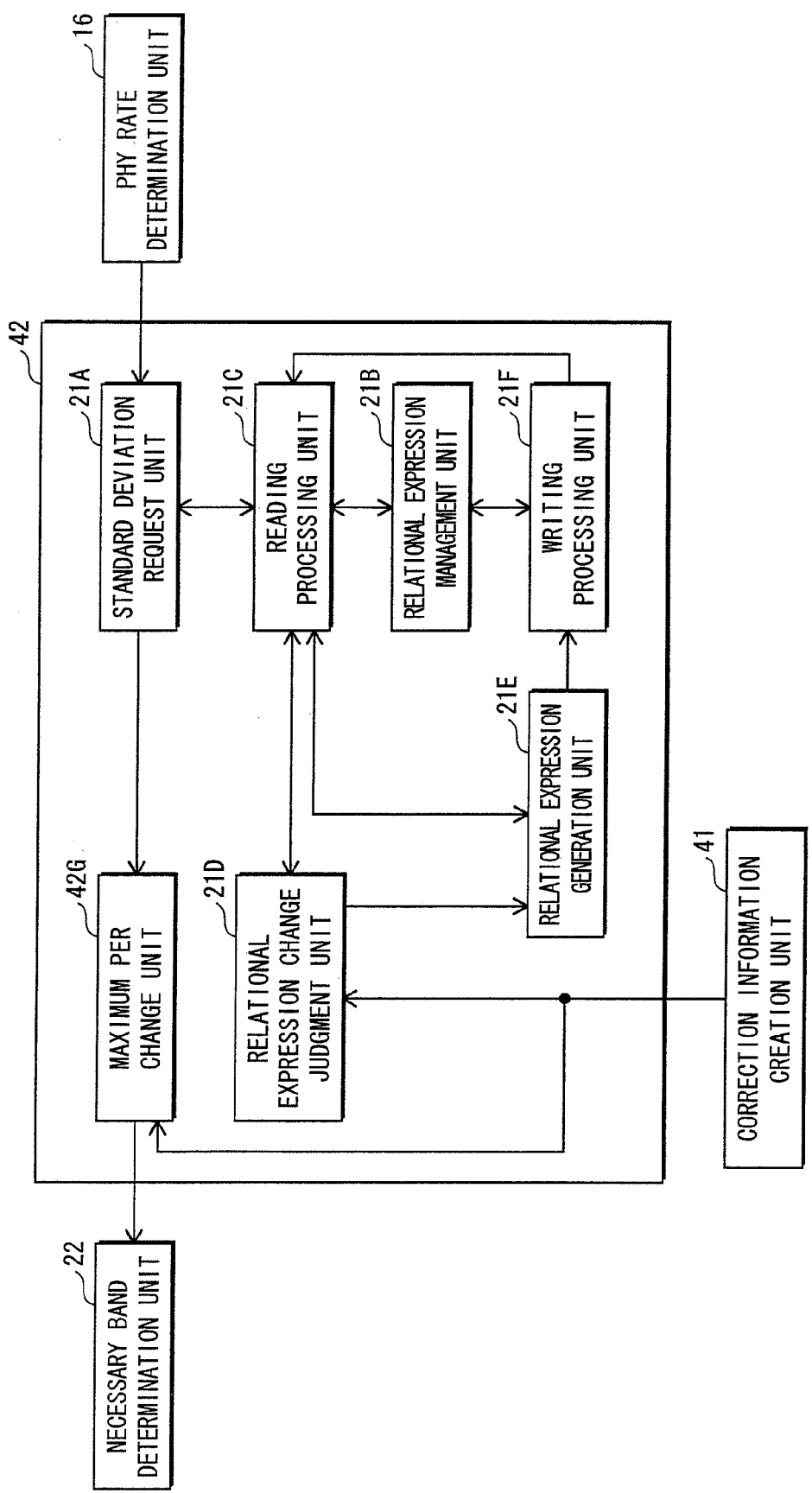
FIG. 26 is a functional block diagram showing a standard deviation estimation unit 42.

Next, the functions of the standard deviation estimation unit 42 are described in further detail with reference to FIG. 26. In FIG. 26, compositional elements that are the same as those shown in FIG. 13 are denoted with the same reference numbers, and accordingly the descriptions thereof are omitted. As shown in FIG. 26, the standard deviation estimation unit 42 includes a MAXPER change unit 42G, in addition to the compositional elements of the standard deviation estimation unit 21 according to the second embodiment.

Upon receiving the percentage and the mean of the PERs from the correction information creation unit 41, the MAXPER change unit 42G changes a multiplier of the standard deviation "N" for calculating a MAXPER, based on the percentage (MAXPER=PER+standard deviation×N), and transmits the MAXPER after the change to the necessary band determination unit 22. For example, when the percentage exceeds a predetermined value, a MAXPER change unit 42G changes a MAXPER received subsequently from the standard deviation request unit 21A to an MAXPER (=PER+standard deviation×1).

As have been described above, according to the fourth embodiment, during content transmission, the percentage of PERs falling within the range from the mean of PERs minus a standard deviation to the mean plus the standard deviation among the PERs used for calculating the standard deviation, and a multiplier "N" of the standard deviation for calculating a MAXPER is determined based on the calculated percentage. Accordingly, it is possible to minimize a band to be allocated to a content.

Fifth Embodiment

Generation of Relational Expression by PER Estimation Unit at Turning on of Power Supply According to the first to fourth embodiments, a relational expression used for estimating a PER and a PER standard deviation is stored in advance. According to the fifth embodiment, a relational expression used for estimating a PER and a PER standard deviation is generated when the power supply is turned on.

The following describes processing of generating a relational expression at the turning on of the power supply.

Note that a PHY rate and a transmission power value, which are set by the wireless transmission/reception unit 11 at the turning on of the power supply, each has the highest settable value.

Figure 27:
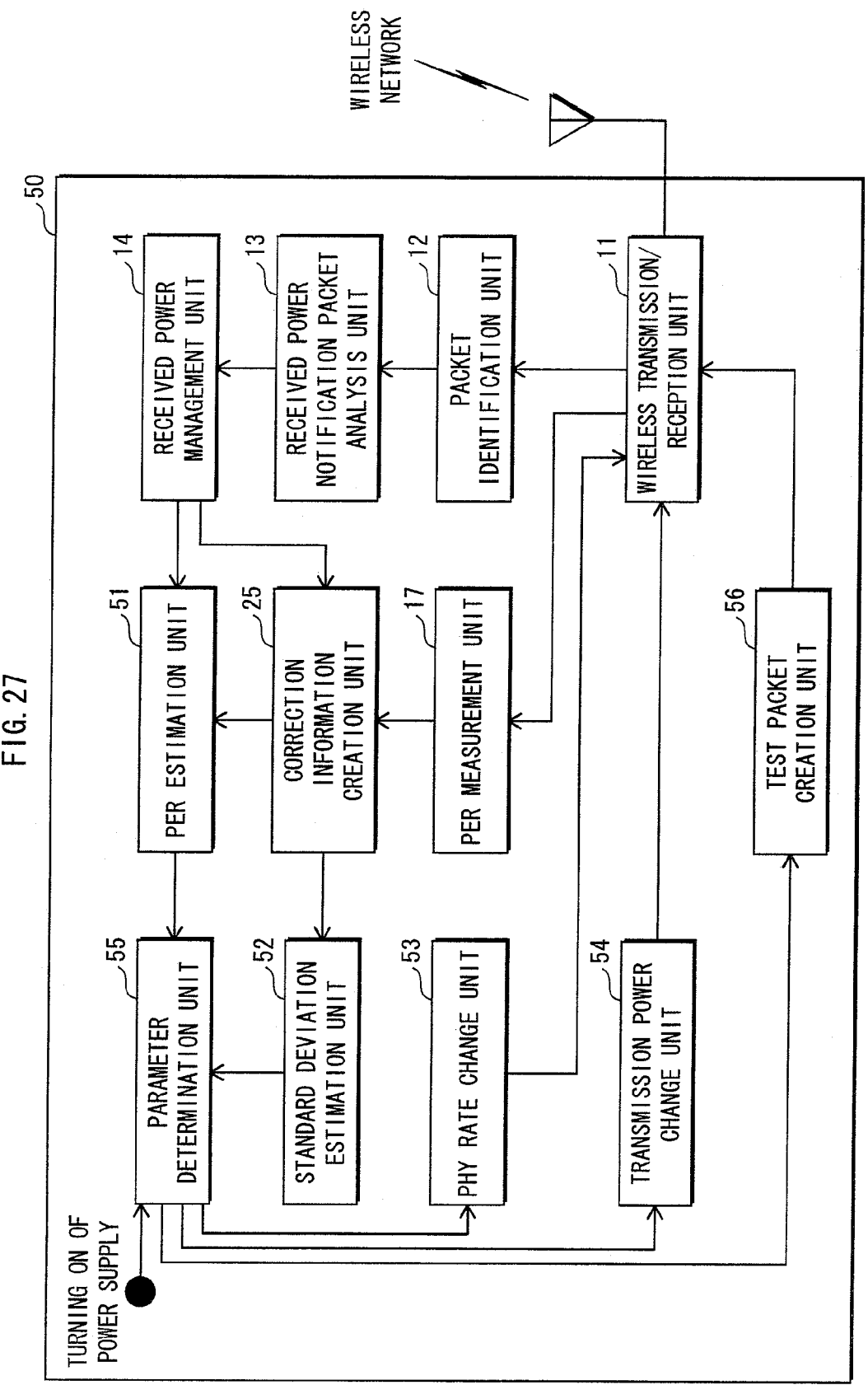
FIG. 27 is a functional block diagram showing a transmitter 50 according to a fifth embodiment of the present invention.

FIG. 27 is a functional block diagram showing a transmitter 50 according to the fifth embodiment of the present invention. In FIG. 27, compositional elements that are the same as those shown in FIG. 12 are denoted with the same reference numbers, and accordingly the descriptions thereof are omitted.

As shown in FIG. 27, the transmitter 50 includes a PER estimation unit 51, a standard deviation estimation unit 52, a PHY rate change unit 53, and a test packet creation unit 56, instead of the PER estimation unit 15, the standard deviation estimation unit 21, the PHY rate determination unit 16, and the test packet creation unit 24 included in the transmitter according to the second embodiment. The transmitter 50 further includes a transmission power change unit 54 and a parameter determination unit 55. The PER estimation unit 51 generates a relational expression between reception power value and PER based on information input by the correction information creation unit 25. The standard deviation estimation unit 52 generates a relational expression between PER and PER standard deviation based on information input by the correction information creation unit 25. The PHY rate change unit 53 instructs the wireless transmission/reception unit 11 to change a PHY rate of a packet to be output to the wireless network. The test packet creation unit 56 generates a test packet for measuring propagation state in accordance with an instruction by the parameter determination unit 55.

Upon receiving a transmission power value from the parameter determination unit 55, the transmission power change unit 54 instructs the wireless transmission/reception unit 11 to change a transmission power value of a packet to be output to the wireless network.

When the power supply is turned on, the parameter determination unit 55 acquires an address of an apparatus (here, the receiver 100) connected with the transmitter 50 via the wireless network, and transmits the address of the receiver 100 to the test packet creation unit 56, in order to measure the propagation state between the transmitter 50 and the receiver 100.

Also, the parameter determination unit 55 determines a PHY rate of a packet to be output to the wireless network and a transmission power value thereof based on information input by the PER estimation unit 51 and the standard deviation estimation unit 52, and transmits the determined PHY rate to the PHY rate change unit 53, and transmits the determined transmission power value to the transmission power change unit 54.

Upon receiving an address from the parameter determination unit 55, the test packet creation unit 56 creates a test packet to be transmitted to the receiver 100, and transmits the generated test packet to the wireless transmission/reception unit 11. Note that the test packet creation unit 56 continues to generate test packets, and transmits the generated test packets to the wireless transmission/reception unit 11, until the parameter determination unit 55 instructs the test packet creation unit 56 to suspend generating test packets, or if the number of packets accumulated in the transmission buffer is within a range of predetermined threshold values.

(Functions of Per Estimation Unit 51)

Figure 28:
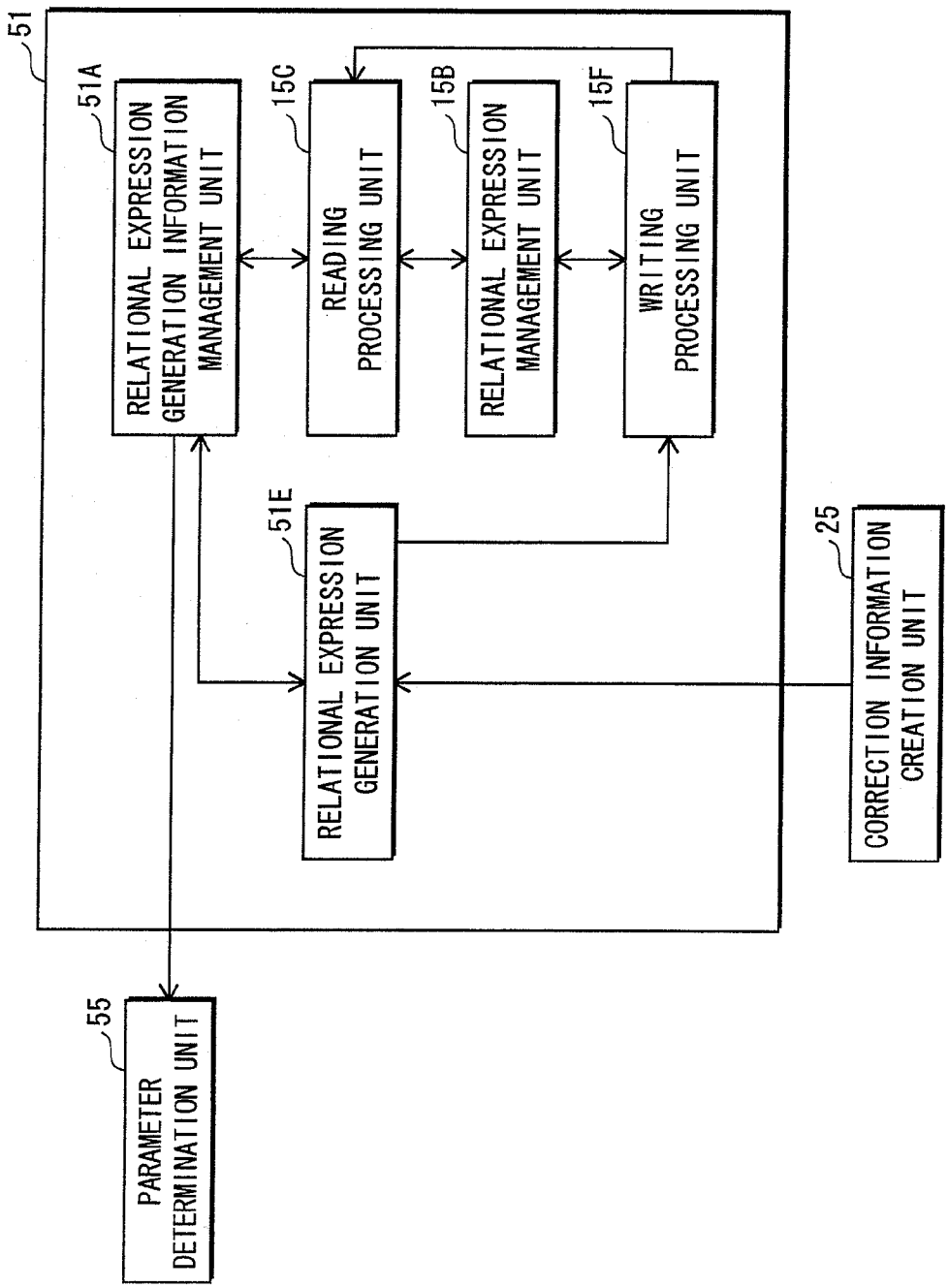
FIG. 28 is a functional block diagram showing a PER estimation unit 51.

Then, the functions of the PER estimation unit 51 are described in further detail with reference to FIG. 28. In FIG. 28, compositional elements that are the same as those shown in FIG. 4 are denoted with the same reference numbers, and accordingly the descriptions thereof are omitted. As shown in FIG. 28, the PER estimation unit 51 includes a relational expression generation information management unit 51A and a relational expression generation unit 51E, instead of the PER request unit 15A and the relational expression change judgment unit 15D included in the PER estimation unit 15. The relational expression generation information management unit 51A manages information used for generating a relational expression managed by the relational expression management unit 15B. The relational expression generation unit 51E generates a relational expression between reception power value and PER, based on information received from the correction information creation unit 25, and reception power values and PERs managed by the relational expression generation information management unit 51A.

Upon receiving a reception power value, a PER, and a PHY rate from the correction information creation unit 25, the relational expression generation unit 51E acquires a plurality of reception power values and a plurality of PERs of packets transmitted at a PHY rate that is the same as that of the received PHY rate from the relational expression generation information management unit 51A, and generates a relational expression using the acquired reception power values and PERs, and the reception power value and the PER received from the correction information creation unit 25. The generated relational expression is a quadratic approximate expression generated using the least-squares method. Then, the relational expression generation unit 51E writes the generated relational expression into the relational expression management unit 15B via the writing processing unit 15F.

Also, the relational expression generation unit 51E transmits, to the relational expression generation information management unit 51A, the reception power value and the PER received from the correction information creation unit 25.

The relational expression generation information management unit 51A includes a memory such as a RAM, and stores therein the reception power value and the PER received from the relational expression generation unit 51E. The relational expression generation information management unit 51A judges whether the number of stored PERs reaches a predetermined threshold value. If judging affirmatively, the relational expression generation information management unit 51A judges the degree of dispersion of the stored PERs. Specifically, the relational expression generation information management unit 51A judges whether an interval between each adjacent two of the PERs is no less than a predetermined interval, and transmits success/failure information showing a result of the judgment to the parameter determination unit 55. For example, if an interval between certain adjacent two PERs among the PERs is less than the predetermined interval, success/failure information indicating "failure" is transmitted. If an interval between every adjacent two PERs is no less than the predetermined interval, success/failure information indicating "success" is transmitted.

(Functions of Standard Deviation Estimation Unit 52)

Figure 29:
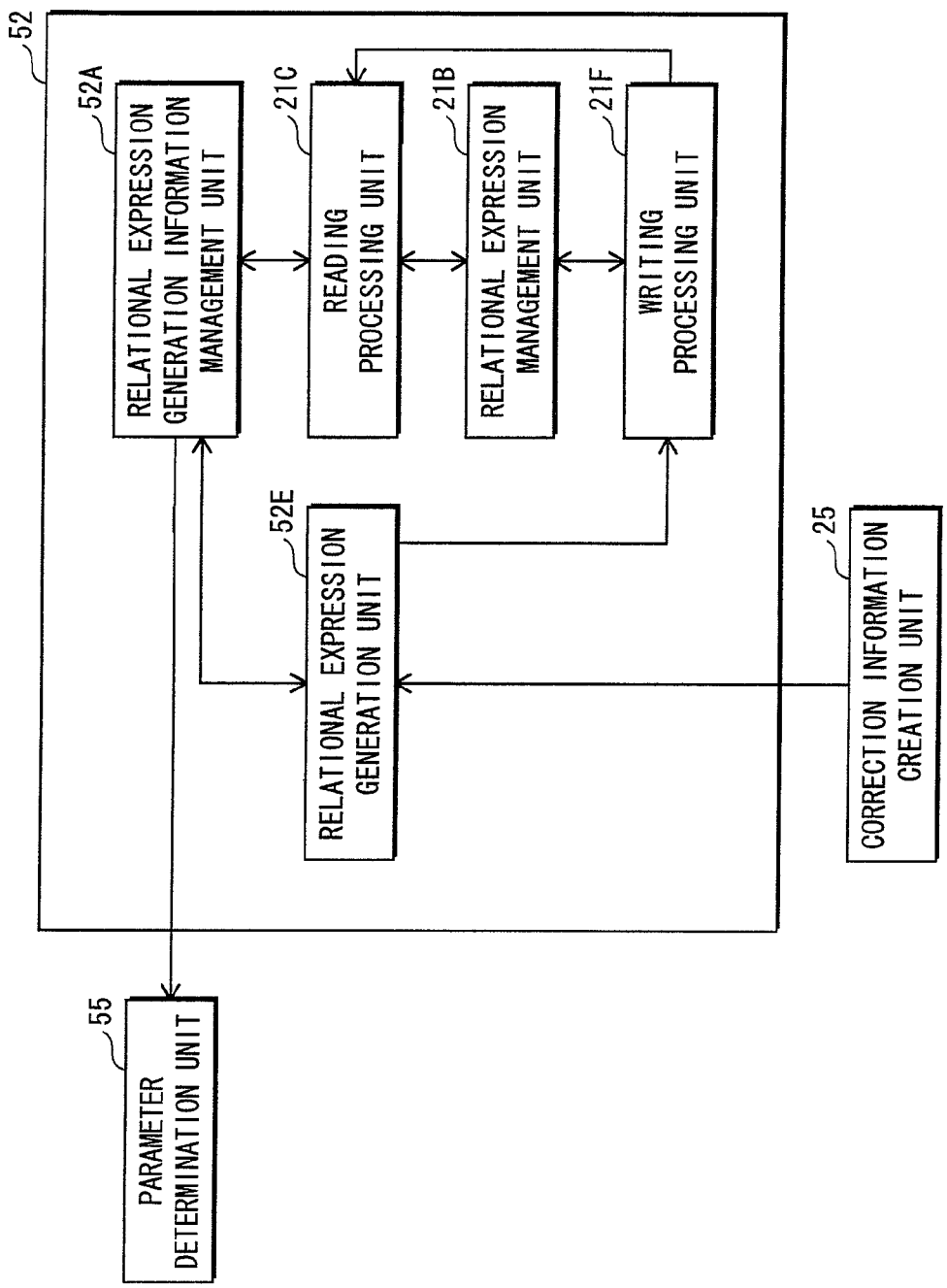
FIG. 29 is a functional block diagram showing a standard deviation estimation unit 52.

Then, the functions of the standard deviation estimation unit 52 are described in further detail with reference to FIG. 29. In FIG. 29, compositional elements that are the same as those shown in FIG. 13 are denoted with the same reference numbers, and accordingly the descriptions thereof are omitted.

As shown FIG. 29, the standard deviation estimation unit 52 includes a relational expression generation information management unit 52A and a relational expression generation unit 52E, instead of the standard deviation request unit 21A and the relational expression generation unit 21E. The relational expression generation information management unit 52A manages information used for generating a relational expression managed by the relational expression management unit 21E. The relational expression generation unit 52E generates a relational expression between PER and PER standard deviation, based on information received from the correction information creation unit 25 and the PER and the standard deviation thereof managed by the relational expression generation information management unit 52.

Upon receiving a standard deviation of PERs, the PERs used for calculating the standard deviation, and a PHY rate from the correction information creation unit 25, the relational expression generation unit 51E acquires a plurality of PERs and a plurality of standard deviations thereof of packets transmitted at a PHY rate that is the same as the received PHY rate from the relational expression generation information management unit 52A. Then, the relational expression generation unit 52E generates a relational expression using the acquired PERs and standard deviations, and a standard deviation of PERs and the PERs received from the correction information creation unit 25. The generated relational expression is a quadratic approximate expression generated using the least-squares method. Then, the relational expression generation unit 52E writes the generated relational expression into the relational expression management unit 21B via the writing processing unit 21F.

Also, the relational expression generation unit 52E transmits PERs and a standard deviation thereof received from the correction information creation unit 25, to the relational expression generation information management unit 52A.

The relational expression generation information management unit 52A includes a memory such as a RAM, stores therein PERs and a standard deviation thereof received from the relational expression generation unit 52E. The relational expression generation information management unit 52A judges whether the number of already stored PERs reaches a predetermined threshold value. If judging affirmatively, the relational expression generation information management unit 52A judges the degree of dispersion of the stored PERs. Specifically, the relational expression generation information management unit 52A judges whether an interval between each adjacent two of the stored PERs is no less than a predetermined value, and transmits success/failure information showing a result of the judgment to the parameter determination unit 55.

(Relational Expression Generation Processing)

Figure 30:
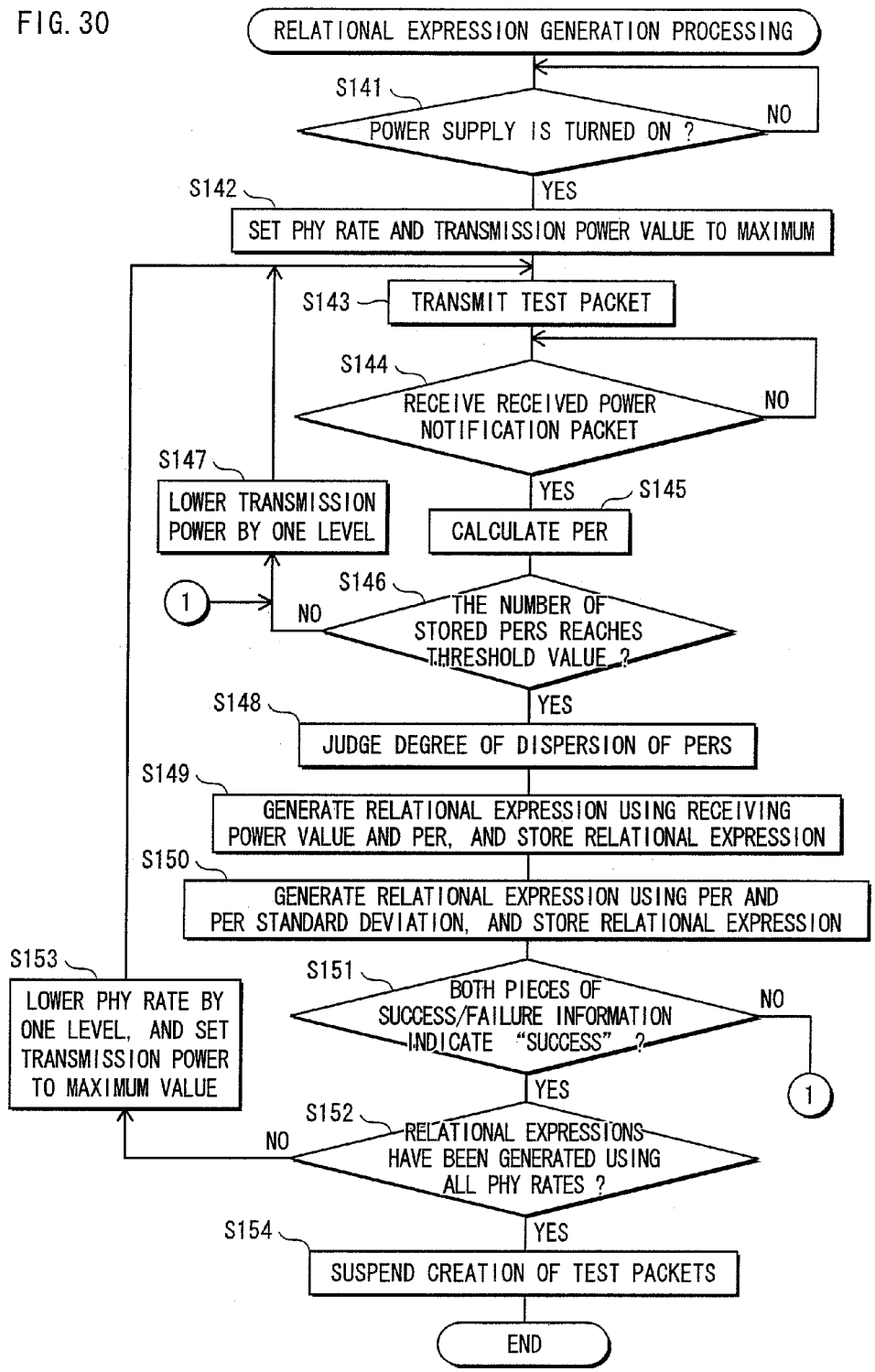
FIG. 30 is a flow chart showing relational expression generation processing.

FIG. 30 is a flow chart showing relational expression generation processing. When the power supply is turned on (Step S141: YES), the PHY rate change unit 53 sets a PHY rate to the maximum value, and the transmission power change unit 54 sets a transmission power value to the maximum value (Step S142). Then, the wireless transmission/reception unit 11 transmits a test packet created by the test packet creation unit 56 to the receiver 100 (Step S143). Then, the wireless transmission/reception unit 11 receives a reception power notification packet from the receiver 100 (Step S144: YES). The PER measurement unit 17 calculates a PER (Step S145). The relational expression generation unit 51E stores the PER in the relational expression generation information management unit 51A, and the relational expression generation information management unit 51A judges whether the number of stored PERs reaches a threshold value (Step S146).

If judging negatively (Step S146: NO), the relational expression generation information management unit 51A requests the parameter determination unit 55 to instruct the wireless transmission/reception unit 11 to lower the transmission power value by one level. Upon receiving the request to lower the transmission power value from the parameter determination unit 55, the transmission power change unit 54 instructs the wireless transmission/reception unit 11 to lower the transmission power value by one level (Step S147), and then the flow proceeds to Step S143.

Upon receiving the instruction to lower the transmission power value from the transmission power change unit 54, the wireless transmission/reception unit 11 lowers the transmission power value to be used for transmitting test packets, and since then transmits test packets at the lowered transmission power value.

If the number of stored PERs reaches the threshold value (Step S146: YES), the relational expression generation information management unit 51A and the relational expression generation information management unit 52A respectively judge the degree of dispersion of the stored PERs, and transmit results of the judgments to the parameter determination unit 55 (Step S148). The relational expression generation unit 51E generates a relational expression using reception power values and PERs, and stores therein the generated relational expression (Step S149). The relational expression generation unit 52E generates a relational expression using the PERs and standard deviations thereof, and stores therein the generated relational expression (Step S150).

The parameter determination unit 55 judges pieces of success/failure information respectively corresponding to the relational expressions received from the PER estimation unit 51 and the standard deviation estimation unit 52 (Step S151). If at least one of the pieces of success/failure information indicates "failure" (Step S151: NO), the parameter determination unit 55 requests the transmission power change unit 54 to lower the transmission power value by one level, and then the flow proceeds to Step S147.

If both of the pieces of success/failure information indicate "success" (Step S151: YES), the parameter determination unit 55 judges whether generation of relational expressions using all settable PHY rates is complete (Step S152).

If the generation is not complete (Step S152: NO), the parameter determination unit 55 requests the PHY rate change unit 53 to lower the PHY rate by one level, and requests the transmission power change unit 54 to heighten the transmission power value to the maximum settable value (Step S153).

Upon receiving the request to lower the PHY rate from the parameter determination unit 55, the PHY rate change unit 53 instructs the wireless transmission/reception unit 11 to change the PHY rate to the requested PHY rate.

Upon receiving the information of the PHY rate from the PHY rate change unit 53, the wireless transmission/reception unit 11 lowers the PHY rate to be used for transmitting test packets, and since then transmits the test packets at the changed PHY rate.

If the generation of relational expressions using all settable PHY rates is complete (Step S152: YES), the parameter determination unit 55 instructs the test packet creation unit 56 to suspend creating test packets (Step S154).

Note that the receiver according to the fifth embodiment is the same as the receiver 100 according to the first embodiment.

As have been described above, according to the fifth embodiment, when the power supply is turned on, the parameter determination unit 55 adjusts a transmission power and a PHY rate. Then, relational expressions to be respectively managed by the relational expression management unit 15B and the relational expression management unit 21B are generated. Therefore, it is unnecessary to store relational expressions in advance.

Sixth Embodiment

Measurement of Reception Power by Transmitter

According to the above embodiments, the receiver measures a reception power value of a packet. According to the sixth embodiment, a transmitter measures a reception power value of a packet, and estimates a PER based on the measured reception power value.

Figure 31:
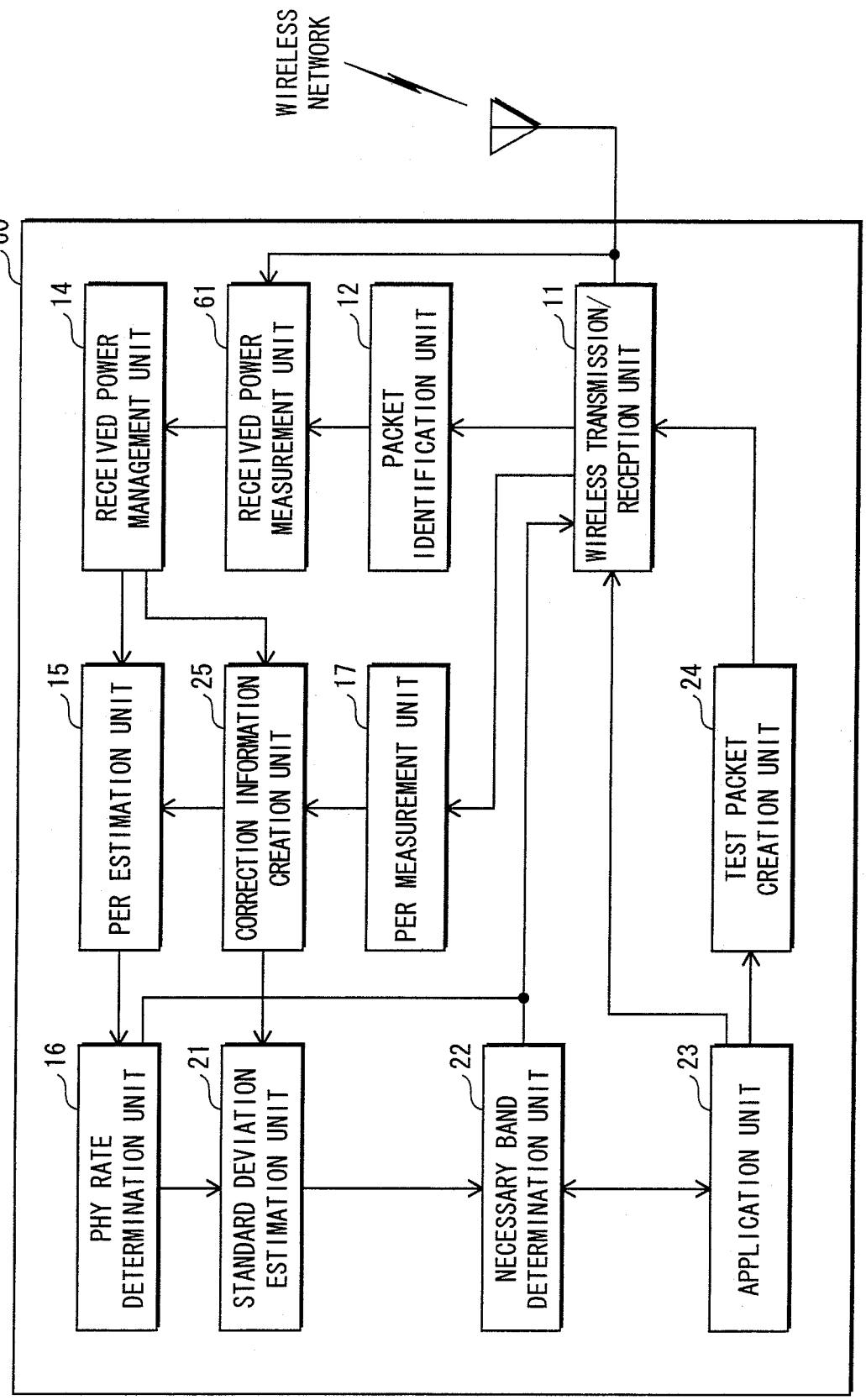
FIG. 31 is a functional block diagram showing a transmitter 60 according to a sixth embodiment of the present invention.

FIG. 31 is a functional block diagram showing a transmitter 60 according to the sixth embodiment of the present invention. In FIG. 31, compositional elements that are the same as those shown in FIG. 12 are denoted with the same reference numbers, and accordingly the descriptions thereof are omitted.

The transmitter 60 includes a reception power measurement unit 61, instead of the reception power notification packet analysis unit 13 of the transmitter 20 according to the second embodiment. The reception power measurement unit 61 measures a reception power value of a packet received from the wireless network. Other compositional elements of the transmitter 60 are the same as those of the transmitter 20 according to the second embodiment.

Note that a method of correcting relational expressions (approximate expressions shown in FIGS. 5 and 14) respectively stored in the PER estimation unit 15 and the standard deviation estimation unit 21 during content transmission is the same as that according to the first and second embodiments. Accordingly, the descriptions thereof are omitted.

The processing to be performed by the wireless transmission/reception unit 11 for transmitting a test packet to the receiver 100 is the same as that according to the second embodiment.

The wireless transmission/reception unit 11 demodulates an ACK in response to a test packet received from the wireless network via the antenna, and transmits the demodulated ACK to the packet identification unit 12.

Upon receiving the demodulated ACK in response to the test packet, the packet identification unit 12 transmits a notification of reception of the ACK to the reception power measurement unit 61.

Upon receiving the notification of reception of the ACK in response to the test packet, the reception power measurement unit 61 measures a reception power value of the ACK, and transmits the measured reception power value to the reception power management unit 14.

The reception power management unit 14 stores therein the reception power value, and transmits the reception power value to the PER estimation unit 15.

As have been described above, according to the sixth embodiment, the transmitter 60 is capable of measuring a reception power value of an ACK in response to a test packet, and estimating a PER using the measured reception power value.

Also, while a content is being transmitted, the PER estimation unit 15 of the transmitter 60 is capable of measuring a reception power value of an ACK in response to a content packet, and estimating a PER using the measured reception power value of the ACK.

Therefore, it is unnecessary for a receiver to measure a reception power value and notify a transmitter of the measured reception power value.

Note that it may be possible to combine the sixth embodiment with any of other embodiments. For example, if the transmitter cannot receive a reception power notification packet from the receiver in any other embodiments, it may be possible to switch the functions of the transmitter to the functions according to the sixth embodiment.

Seventh Embodiment

Measurement of PER by Receiver

According to the seventh embodiment, a receiver not only measures a reception power value of a packet, but also calculates a PER. Also, the receiver estimates a PER based on the measured reception power value, and determines a PHY rate and a necessary band based on the estimated PER. Furthermore, the receiver generates information to be used for correcting relational expressions based on the calculated PER, and corrects relational expressions respectively stored in the PER estimation unit 150 and the standard deviation estimation unit 210.

Figure 32:
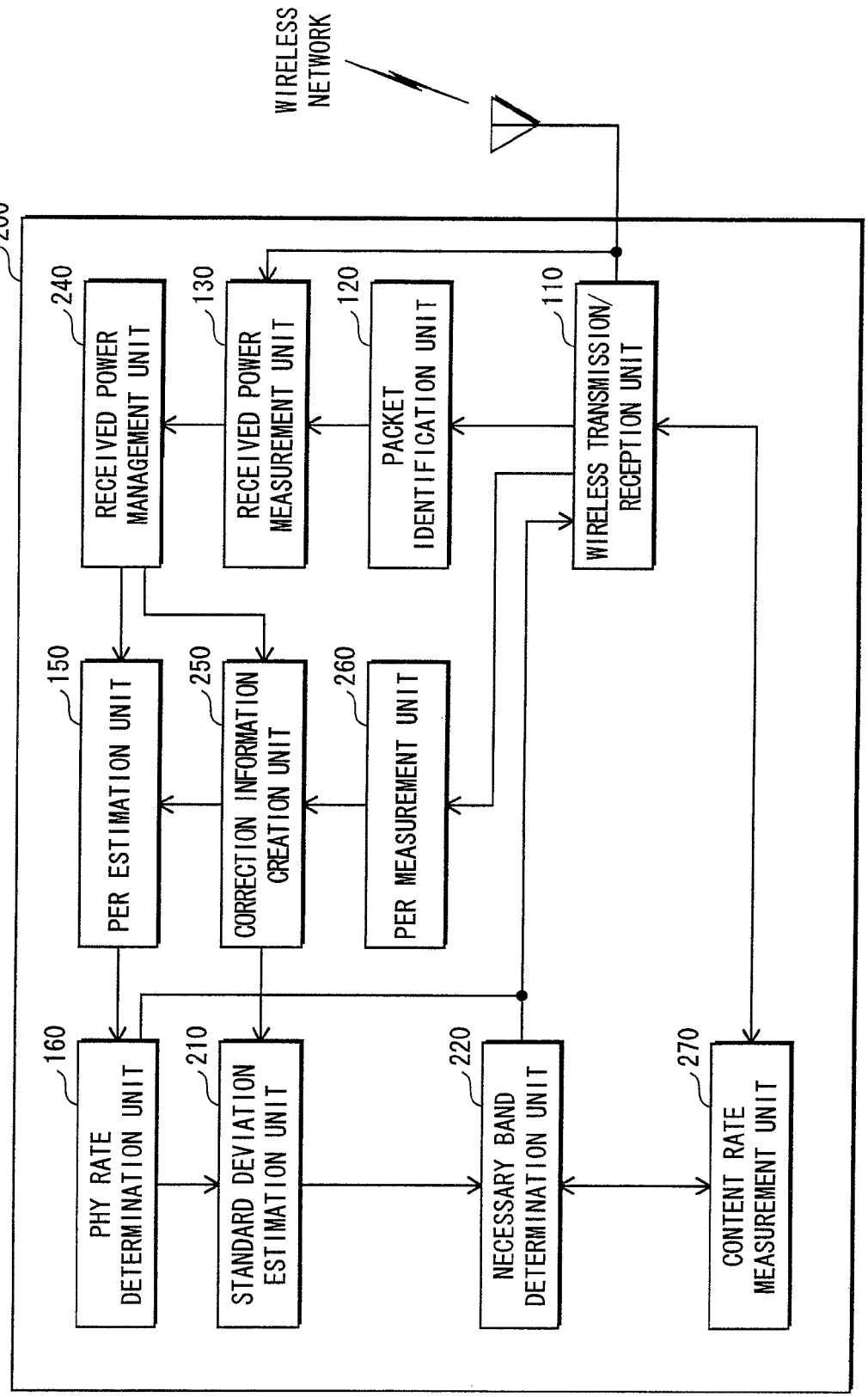
FIG. 32 is a functional block diagram showing a receiver 200 according to a seventh embodiment of the present invention.

FIG. 32 is a functional block diagram showing the receiver 200 according to the seventh embodiment of the present invention. In FIG. 32, compositional elements that are the same as those shown in FIG. 3 are denoted with the same reference numbers, and accordingly the descriptions thereof are omitted.

The receiver 200 includes a reception power management unit 240 instead of the reception power notification packet creation unit 140 of the receiver 100. Furthermore, the receiver 200 includes a PER estimation unit 150, a PHY rate determination unit 160, a standard deviation estimation unit 210, a necessary band determination unit 220, a correction information creation unit 250, a PER measurement unit 260, and a content rate measurement unit 270 for measuring a content rate of a content based on a reception time of packets.

The PER measurement unit 260 has a function of measuring the number of retransmissions of received packets. Other compositional elements of the receiver 200 shown in FIG. 32 have functions that are the same as those of the transmitter 60 according to the sixth embodiment.

The following describes the operations of the receiver 200 having the above structure.

Note that a method of correcting relational expressions (approximate expressions shown in FIGS. 5 and 14) respectively stored in the PER estimation unit 150 and the standard deviation estimation unit 210 is the same as that according to the first and second embodiments. Accordingly, the descriptions thereof are omitted.

The wireless transmission/reception unit 110 of the receiver 200 modulates a received content packet, and transmits the modulated content packet to the packet identification unit 120 and the content rate measurement unit 270.

The packet identification unit 120 identifies a received packet. If the packet is an ACK in response to a test packet, the packet identification unit 120 notifies the reception power measurement unit 130 of reception of the packet.

Upon receiving the reception notification from the packet identification unit 120, the reception power measurement unit 130 measures a reception power value of the packet, and transmits the measured reception power value to the reception power management unit 240.

The reception power management unit 240 stores therein the reception power value received from the reception power measurement unit 130, and transmits the reception power value to the PER estimation unit 150.

Upon receiving a content packet from the wireless transmission/reception unit 110, the content rate measurement unit 270 stores therein a reception time of the content packet, and calculates a content rate at predetermined time intervals, and stores therein the calculated content rates.

Upon receiving a MAXPER for each PHY rate and a PHY rate determined by the PHY rate determination unit 160 from the standard deviation estimation unit 210, the necessary band determination unit 220 acquires a content rate of a content to be transmitted, from the content rate measurement unit 270, and calculates a retransmission ratio based on the (Formula 1) and the MAXPER. Then, the necessary band determination unit 220 calculates a band necessary for transmitting the content based on the calculated retransmission ratio and the acquired content rate, and instructs the wireless transmission/reception unit 110 to secure the calculated necessary band.

Upon receiving the instruction to secure the necessary band from the necessary band determination unit 220, the wireless transmission/reception unit 110 secures the band for the wireless network.

The PER measurement unit 260 stores therein, for content packet, the number of retransmissions caused by reception error (for example, error is detected by the CRC (Cyclic Redundancy Check)). When reception of the predetermined number of packets is complete, the PER measurement unit 260 transmits, to the correction information creation unit 250, the total of the number of retransmissions, the number of packets that have been completely received, and the PHY rate used for transmitting the packets.

The correction information creation unit 250 calculates a PER based on the total of the number of retransmissions and the number of completely received packets that are received from the PER measurement unit 260.

Note that other structures according to the seventh embodiment are the same as those according to the sixth embodiment.

As have been described above, according to the seventh embodiment, a PER is estimated based on a measured reception power value, and a PHY rate and a necessary band are determined based on the estimated PER. Also, by calculating a PER based on reception error of content packets, relational expressions respectively stored in the PER estimation unit 150 and the standard deviation estimation unit 210 are corrected. Accordingly, only processing performed by the receiver realizes determination of a PHY rate and a necessary band that are the most appropriate to content transmission, and as a result, the transmitter has no need to perform processing.

(Supplementary Descriptions)

Although the wireless transmission apparatuses according to the present invention have been described based on the above embodiments, the present invention is of course not limited to the above embodiments.

In the above embodiments, as shown in FIG. 9, if effective rates calculated with respect to PHY rates are the same, one of the PHY rates that corresponds to the higher one of the effective rates is selected. Alternatively, if effective rates calculated with respect to PHY rates are the same, one of the PHY rates that corresponds to a lower one of the effective rates may be selected. This is because a PER of the lower PHY rate is lower than that of the higher PHY rate, and the lower PHY rate realizes transmission more stable than the higher PHY rate.

In the above embodiments, effective rate are calculated with all PHY rates, and one of the PHY rates that corresponds to the highest one of the calculated effective rates is determined. However, a method how to determine a PHY rate is not limited to this. For example, the following may be possible. An effective rate with respect to one PHY rate is calculated. Then, the calculated effective rate is compared with a threshold value (20 Mbps for example) stored in advance in the transmitter. As a result of the comparison, if the calculated effective rate is higher than the threshold value, the one PHY rate corresponding to the calculated effective rate is selected without calculating effective rates with respect to other PHY rates. Accordingly, it is possible to assure an effective rate higher than the threshold value, and reduce load of processing of calculating effective rates.

The number of packets used in the above (Formula 1) is 100. Alternatively, the number of packets to be used for performing calculation using the (Formula 1) may be changed depending on the capacity of the transmission buffer of the transmitter 10 or the capacity of the reception buffer of the receiver 100.

In the above first embodiment, the PHY rate determination unit 16 calculates a retransmission ratio using the (Formula 1). Alternatively, the PHY rate determination unit 16 may store therein an approximate expression of a quadratic function (Formula 2) calculated using values represented by black circles shown in FIG. 7, and determine a retransmission ratio using the stored approximate expression. Further alternatively, the PHY rate determination unit 16 may manage, as a table, values calculated using the (Formula 1) or the (Formula 2). The following (Formula 2) is a quadratic function representing the solid line shown in FIG. 7.

$$y = -14.023x^2 + 4.3821x + 1.0566 \quad \text{(Formula 2)}$$

"x" represents PER, and "y" represents retransmission ratio. Calculation using the approximate expression of quadratic function (Formula 2) needs less processing compared with calculation using the (Formula 1).

In the above embodiments, "$P_{drop}$" in the (Formula 1) is set to 1.0E−8. However, "$P_{drop}$" is not limited to this value.

In the above embodiments, operation processing is disclosed, such as calculation of a retransmission ratio using the (Formula 1) and calculation of an effective rate by multiplying an ideal rate by an inverse number of a retransmission ratio. Such operation processing can be implemented on the computer, as software or hardware.

In a case of implementation of operation processing as software, it may be possible to create a system call (API) or a library function in which an operand is received as an argument, predetermined operation processing is performed, and a result of the operation processing is returned as a return value.

In a case of implementation of operation processing as hardware, it may be possible to create a single operation circuit that receives an operand as an input, performs predetermined processing, and outputs a result of the operation processing.

The above formulas each merely define a causal relation between a value as an input and a value as an output so as to implement the above operation processing as software or hardware. Accordingly, if the above formulas to which modifications have been added can cause a change equivalent to such a causal relation by performing some operation on an input to formulas, i.e., an operand, it is of course possible to perform operation processing using the above modified formulas.

Such "modified formulas" include the following formulas, for example: a formula in which the division operator "/" or the subtraction operator "−" has been replaced with some monotonically decreasing function; a formula in which the multiplication operator "×" or the addition operator "+" has been replaced with some monotonically increasing function; a formula in which a constant value has been increased or decreased; a formula in which part of operations has been omitted; and a formula in which some weighting operation has been adopted.

Also, the above formulas do not represent mathematical concepts, but represent numeric operations to be executed on the computer. Accordingly, needless to say, it may be possible to add modification necessary for causing the computer to the above formulas. For example, it may be possible, of course, to perform a saturation operation or an operation for making a value to be a positive value in order to handle a value as an integer type value or a floating point type value.

Furthermore, it is possible to realize multiplication of a constant included in the operation processing according to the above embodiments with use of a ROM multiplier using a constant ROM. A product of a multiplicand and a constant is in advance calculated and stored in the constant ROM. For example, if a multiplicand has 16-bit length, this multiplicand is separated every four bit. Then, a product of each 4-bit separated piece and the constant, that is, a multiple number of the constant of 0-15 is stored in the constant ROM.

A product of each four bit and a constant having 16-bit length is a value having 20-bit length. The above four constants are stored at the same address. Accordingly, the 20×4=80-bit lengths is treated as one value.

As described above, since multiplication of a constant can be realized using a ROM multiplier, the "operation processing" described in the present Specification does not mean only mere arithmetic operations, but also includes reading processing of reading operation results stored in a recording medium such as a ROM depending on an operand.

Note that a function for calculating an effective rate depends on the implementation. For example, an effective rate may be calculated based on a function between ideal rate and PER or based on other functions.

In the above embodiments, upon receiving a PHY rate from the PHY rate determination unit 16, the wireless transmission/reception unit 11 performs setup for transmitting subsequent data at the received PHY rate. Alternatively, it may be possible to determine a PHY rate in units of packets each time when packets are to be transmitted. Further alternatively, it may be possible to set a PHY rate periodically.

In the above embodiments, although a content to be transmitted is a content such as video and audio, a content to be transmitted is not limited to this.

In the above embodiments, the reception power notification packet creation unit 140 included in the receiver 100 generates a reception power notification packet for each packet. Alternatively, the following may be possible. The reception power notification packet creation unit 140 includes a memory such as a RAM, and stores reception power values in the memory. When newly measuring a reception power value of a packet next, the reception power notification packet creation unit 140 compares the newly measured reception power value with an immediately previously measured reception power value that has been stored in the memory. If a difference between these reception power values is no less than a predetermined value, the reception power notification packet creation unit 140 generates a reception power notification packet including the newly measured reception power value.

Also, the following may be possible. When the number of stored reception power values reaches a predetermined number, the reception power notification packet creation unit 140 calculates the average of the stored reception power values, and generate a reception power notification packet including the average. Alternatively, the following may be possible. The reception power notification packet creation unit 140 stores therein the average of the reception power values. When newly calculating the average of reception power values next, the reception power notification packet creation unit 140 compares the newly calculated average with the immediately previously calculated average that has been stored. If a difference between these averages is no less than a predetermined value, the reception power notification packet creation unit 140 generates a reception power notification packet including the newly calculated average.

In the above embodiments, when the number of packets stored in the PER measurement unit 17 reaches a predetermined number, the PER measurement unit 17 transmits information to the correction information creation unit 18. Alternatively, the information may be transmitted at a predetermined time set in advance.

In the above embodiments, the relational expression change judgment unit 15D stores therein the number of differences between PERs by no less than the predetermined value. Alternatively, during transmission of packets used for calculating the PER, the relational expression change judgment unit 15D may store therein the maximum number of packets accumulated in the transmission buffer, and store therein the number of times the maximum number of packets reaches no more than a predetermined value.

In the above embodiments, the relational expression management unit 15B and the relational expression management unit 21B respectively manage relational expressions in advance. Alternatively, values calculated in advance using the relational expressions may be managed as a table, or relational expressions may be managed in combination with such a table.

Also, the relational expression management unit 15B and the relational expression management unit 21B respectively store therein one relational expression for each PHY rate. Alternatively, a plurality of relational expressions for each PHY rate may be stored. For example, if a PER is no less than 5%, a function expression A may be used. If a PER is less than 5%, a function expression B may be used.

Also, the relational expression management unit 15B and the relational expression management unit 21B respectively may manage relational expressions different for each receiver or relational expressions different for length of a packet to be transmitted, in order to compensate the interindividual differences between wireless RF module characteristics. Further alternatively, it may be possible to separately manage relational expressions to be used for long distance transmission and relational expressions to be used for short distance transmission, and cause a user to select any of the relational expressions.

Moreover, the relational expression management unit 15B and the relational expression management unit 21B respectively manage relational expressions as quadratic functions. Alternatively, it may be possible to manage relational expressions as other approximate expressions such as direct functions and exponent functions.

In the above embodiments, relational expressions respectively generated by the relational expression generation unit 15E and the relational expression generation unit 21E are quadratic approximate expressions generated using the least-squares method. Alternatively, the relational expressions may be linear relational expressions, or may be generated using the Lagrange interpolation, for example.

Also, the relational expression generation unit 15E and the relational expression generation unit 21E correct relational expressions respectively in accordance with the procedures shown in FIGS. 11 and 19. Alternatively, it may be possible, for example, to use a sampled value to which a random number has been added in order to correct relational expressions. In this case, it may be possible to determine the size of the random number, using a difference between a value received from the correction information creation unit 18 and a value calculated based on a relational expression, and a difference between a value received from the correction information creation unit 25 and a value calculated based on a relational expression, respectively.

In the above embodiments, IEEE802.11a is used as the wireless LAN standard for the descriptions. However, the wireless LAN standard is not limited to this. For example, IEEE802.11b or IEEE802.11g may be used. Alternatively, it may be possible to include a plurality of wireless LAN standards, and select a PHY rate corresponding to the highest effective rate from among a plurality of PHY rates defined in the plurality of wireless LAN standards.

In the above first embodiment, the receiver 100 measures a reception power value of a data packet transmitted by the transmitter 10. Alternatively, the receiver 100 may measure a reception power value of other packet transmitted by the transmitter 10. For example, if the transmitter 10 is a wireless master unit (access point) that manages a band for the wireless network, the receiver 10 may measure a reception power value of a beacon (synchronization Signal) intermittently received from the transmitter 10. Further alternatively, the receiver 100 may receive a test packet or other packet (content packet, for example) for measuring a reception power value during content transmission.

In the above first embodiment, the transmitter 10 includes the PER estimation unit 15. Alternatively, the receiver 100 may include the PER estimation unit 15, and notify the transmitter 10 of a PER for each PHY rate.

In the above embodiments, a medium for transmitting data is a wireless. Alternatively, any medium may be employed that selects one from among a plurality of PHY rates and performs content transmission/reception. For example, this is applicable to power line communication control by detecting household appliance noise.

In the above second embodiment, a PHY rate and a band for packet transmission are controlled in accordance with the propagation state. Alternatively, the maximum number of packet retransmissions may be controlled in accordance with the propagation state.

In the above first embodiment, only a relational expression corresponding to a PHY rate used for measuring a PER is corrected. Alternatively, other relational expression may be also corrected. For example, it may be possible to calculate a difference between a relational expression before correction and the relational expression after the correction, and correct a relational expression corresponding to other PHY rate by the calculated difference.

In the above second embodiment, the application unit 23 receives a request for content transmission from a user. Alternatively, a user may make a request for content transmission with use of an external apparatus connected via a wired network of the transmitter 20 or a wired network of the receiver 100 (not shown in the figure). Further alternatively, the user may make a request for content transmission with use of an application unit of the receiver 100 (not shown in the figure).

In the above second embodiment, the transmitter 20 has the structure in which a content rate is input by a user. Alternatively, when starting a content whose transmission band has not been determined, the transmitter 20 may calculate a content rate of the content based on an output interval of content packets for example, and determine a band for transmitting the content. Further alternatively, when receiving content packets whose band has not been determined that are to be transmitted to the receiver 100 via a wire network not shown in the figure, the transmitter 20 may calculate a content rate based on an input interval of the input content packets, and determine a band for transmitting the content packets.

The relational expression change judgment unit 15D may use, as a predetermined value to be used for judgment, a MAXPER calculated using a reception power value received from the correction information creation unit 18 and relational expressions respectively managed by the relational expression management unit 15B and the relational expression management unit 21B. For example, the following may be possible. If a measured PER is less than a MAXPER once, a relational expression is corrected. If a case where a measured PER is no less than a MAXPER continues to occur five times, a relational expression is corrected.

The relational expression change judgment unit 15D stores therein the number of differences by no less than the predetermined value between a PER calculated using a relational expression and a PER received from the correction information creation unit 18. Alternatively, the relational expression change judgment unit 15D may store therein the maximum number of packets used for calculating a PER that have been stored in the transmission buffer while the used packets are being transmitted, and stores therein the number of times the stored maximum number of packets reaches no more than a predetermined value.

The relational expression change judgment unit 21D stores therein the number of times a difference between a standard deviation calculated using a relational expression and a standard deviation received from the correction information creation unit 18 reaches a predetermined value. If the stored number of times reaches a predetermined number of times, the relational expression change judgment unit 21D judges that the relational expression needs to be corrected, and transmits a PER, a standard deviation, and a PHY rate received from the correction information creation unit 18, to the relational expression generation unit 21E. Alternatively, the following may be possible. The relational expression change judgment unit 21D acquires a plurality of PERs used for calculating a standard deviation from the correction information creation unit 18, and calculates a percentage of PERs falling within the range from the mean of PERs minus a standard deviation to the mean plus the standard deviation among the PERs used for calculating the standard deviation. If the calculated percentage is no less than a predetermined value, the relational expression change judgment unit 21D transmits the PER, the standard deviation, and the PHY rate received from the correction information creation unit 18, to the relational expression generation unit 21E.

In the above second embodiment, the transmitter 20 includes the standard deviation estimation unit 21. Alternatively, the receiver 100 may include the standard deviation estimation unit 21, and the receiver 100 may notify the transmitter 20 of a MAXPER for each PHY rate.

Also, the wireless transmission/reception unit 11 may make a negotiation with other apparatus for securing a band necessary for content transmission. For example, the following may be possible. The transmitter 20, the receiver 100, and a wireless master unit (access point) that manages bands for the wireless network each have IEEE802.11e HCCA functions. If the transmitter 20 is a wireless slave unit (station) belonging to a wireless master unit, the transmitter 20 transmits ADD TS request in wireless management frame that is a request for band allocation, to the wireless master unit. Also, if the transmitter 20 is a wireless master unit, the transmitter 20 transmits a request for transmission of ADD TS request to the receiver that is a wireless slave unit, and the receiver 100 transmits ADD TS request to the transmitter 20 (wireless master unit). In these cases, Mean Data Rate of TSPEC parameter of ADD TS request may include a content rate. Surplus Bandwidth Allowance may include a necessary band obtained by the necessary band determination unit 22. Minimum PHY rate may include a PHY rate determined by the PHY rate determination unit 16.

Figure 33:
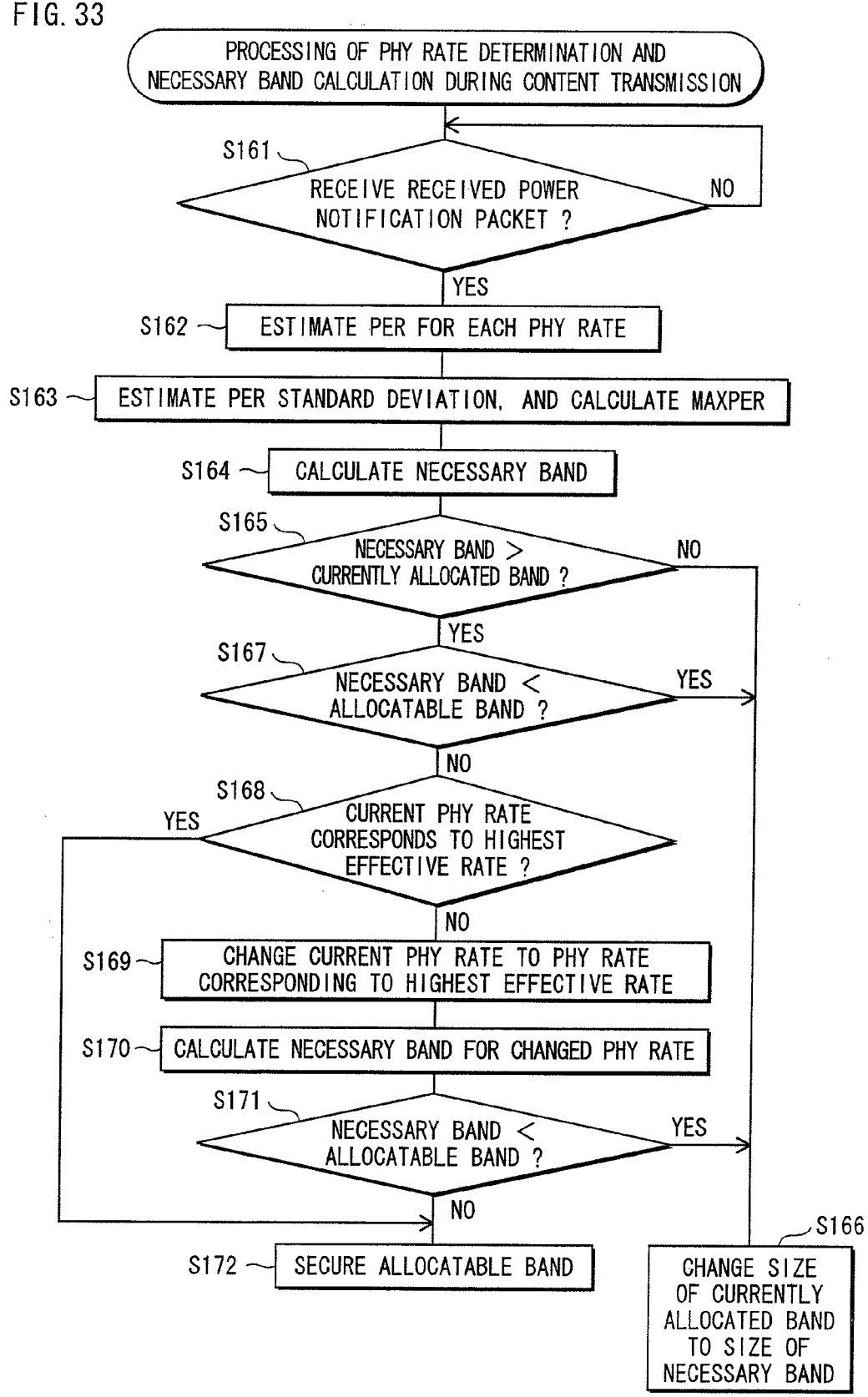
FIG. 33 is a flow chart showing processing of PHY rate determination and band allocation during content transmission.

In the above second embodiment, in order to determine a PHY rate and a band during data transmission, a PHY rate corresponding to the highest effective rate is firstly determined. Alternatively, the following may be possible. Even if a PHY rate being used for content transmission does not correspond to the highest effective rate, and if a necessary band can be secured, the size of a currently allocated band is changed to the size of the necessary band without changing the currently used PHY rate. FIG. 33 is a flow chart showing processing for determining a PHY rate and calculating a necessary band during content transmission in the above case. Steps S161 and S162 are the same as Steps S51 and S52 shown in FIG. 17, and accordingly the descriptions thereof are omitted here. According to the flow chart shown in FIG. 33, after Step S162 is performed, a PHY rate corresponding to the highest effective rate is not determined. The standard deviation request unit 21A receives all PHY rates, PERs with respect to the all PHY rates, and a currently used PHY rate from the PHY rate determination unit 16, and reads a relational expression stored in advance in the relational expression management unit 21B via the reading processing unit 21C. Then, the standard deviation request unit 21A calculates a PER standard deviation for each PHY rate, and further calculates a MAXPER (=PER+standard deviation×2) for each PHY rate using the calculated PER standard deviation as an estimated PER standard deviation, and transmits the calculated MAXPERs to the necessary band determination unit 22 (Step S163).

Upon receiving the current PHY rate and the MAXPERs from the standard deviation estimation unit 21, the necessary band determination unit 22 calculates a band necessary for transmitting a content, using a content rate acquired from the application unit 23 and a MAXPER corresponding to a current PHY rate used for transmitting the content (Step S164). Steps S165 to S167 are the same as Steps S56 to S58 shown in FIG. 17, and accordingly the descriptions thereof are omitted here.

If the necessary band is larger than the allocatable band (Step S167: NO), the necessary band determination unit 22 judges whether the current PHY rate corresponds to the highest effective rate (Step S168).

If the current PHY rate corresponds to the highest effective rate (Step S168: YES), the necessary band determination unit 22 secures the allocatable band (Step S172). If another PHY rate corresponds to the high effective rate (Step S168: NO), the necessary band determination unit 22 changes the current PHY rate to the another PHY rate corresponding to the highest effective rate (Step S169), and calculates a necessary band based on the changed PHY rate (Step S170).

Then, the necessary band determination unit 22 compares the allocatable band with the necessary band (Step S171). As a result of the comparison, if the necessary band is smaller than the allocatable band (Step S171: YES), the necessary band determination unit 22 instructs the wireless transmission/reception unit 11 to change the size of a currently allocated band to the size of the necessary band (Step S166). If the necessary band is larger than the allocatable band (Step S171: NO), the necessary band determination unit 22 instructs the wireless transmission/reception unit 11 to secure only the allocatable band (Step S172).

Note that relational expressions respectively managed by the relational expression management unit 15B and the relational expression management unit 21B may be generated in advance based on a PER indicating necessity of securement of a band.

Also, if a PER acquired from the correction information creation unit 18 is equal to a predetermined PER indicating necessity of securement of a band and is different from a PER calculated using a relational expression, the relational expression change judgment unit 15D and the relational expression change judgment unit 21D may respectively judge that the relational expression needs to be changed.

The test packet creation unit 24 according to the above embodiments may determine a length of each test packet as the same as a length of each content packet.

In the above second embodiment, the standard deviation estimation unit 21 calculates a MAXPER as (PER+standard deviation×2). Alternatively, it may be possible to calculate a MAXPER as (PER+standard deviation×3) or (PER+standard deviation×2.5), for example.

In the above second embodiment, a standard deviation of PERs is calculated. Alternatively, it may be possible, for example, to calculate a standard deviation of reception power values, calculate a maximum reception power value (=average reception power value+standard deviation of reception power values×2), and estimate a PER using this MAX reception power value. Further alternatively, it may be possible to combine the above second embodiment with any of other embodiments. For example, a necessary band is calculated using a PER estimated by the PER estimation unit 15, instead of securing a band using based on a MAXPER.

In the above third embodiment, when the size of an allocatable band increases during content transmission due to the end of transmission of a content by other user for example, the necessary band determination unit 32 may change a content rate or the size of a currently allocatable band in response to necessity.

In the above third embodiment, if the transmitter 30, the receiver 100, and a wireless master unit (access point) that manages bands for the wireless network each have IEEE802.11e EDCA functions, the necessary band determination unit 32 calculates an ideal rate within an allocatable band based on the AC (Access Category) of a content to be transmitted. If the ideal rate is lower than the content rate, the necessary band determination unit 32 may instruct the content rate change unit 31 to change the content rate to the ideal rate.

In the above third embodiment, the content rate change unit 31 is provided inside the transmitter 30. Alternatively, if a content is input to the transmitter 30 via a wired network (not shown in the figure) for example, the content rate change unit 31 may be provided anywhere on a network between the transmitter 30 and an external apparatus that outputs the content.

In the above third embodiment, in order to determine a PHY rate, a band, and a content rate during data transmission, a PHY rate corresponding to the highest effective rate is firstly determined. Alternatively, even if a PHY rate being used does not correspond to the highest effective rate, and if a necessary band can be secured, the size of a currently allocated band may be changed to the size of the necessary band without changing the PHY rate. FIG. 34 is a flow chart showing processing for determining a PHY rate, a band, and a content rate during data transmission.

In the flow chart shown in FIG. 34, after Step S182 is performed, a PHY rate corresponding the highest effective rate is not determined. Instead, if a band necessary for transmitting a content at a currently used PHY rate is larger than an allocatable band in Step S186, it is judged whether the currently used PHY rate corresponds to the highest effective rate (Step S188).

If the current PHY rate corresponds to the highest effective rate (Step S188: YES), the band securement determination unit 32B transmits the allocatable band and a retransmission ratio to the content rate calculation unit 32D. The content rate calculation unit 32D calculates a content rate at which content transmission can be performed over the allocatable band (Step S192).

If the current PHY rate does not correspond to the highest effective rate (Step S188: NO), the band securement determination unit 32B instructs the wireless transmission/reception unit 11 to change the current PHY rate to a PHY rate corresponding to the highest effective rate (Step S189). The necessary band calculation unit 32A calculates a necessary band for the changed PHY rate (Step S190). Other Steps shown in FIG. 34 are the same as those shown in FIGS. 22 and 23, and accordingly the descriptions thereof are omitted here.

In the above fourth embodiment, a multiplier "N" of a standard deviation of PERs in order to calculate a MAXPER is determined during content transmission in accordance with a percentage of PERs falling within the range from the mean of PERs minus a standard deviation to the mean plus the standard deviation among the PERs used for calculating the standard deviation. Alternatively, the following may be possible. The standard deviation estimation unit 42 associates in advance PERs received from the PER estimation unit 51 with values as the multiplier "N". Then, when receiving one of the PERs from the PER estimation unit 51, the standard deviation estimation unit 42 calculates an MAXPER using a value as the multiplier "N" corresponding to the received PER.

In the above fifth embodiment, the PER estimation unit 51 and the standard deviation estimation unit 52 respectively manage generated relational expressions. Alternatively, the following may be possible. The PER estimation unit 51 and the standard deviation estimation unit 52 respectively store therein in advance a plurality of relational expressions different for each PHY rate, and select one from among the relational expressions that is most approximate to a measurement result. Then, the relational expression management unit 15B and the relational expression management unit 21B respectively manage the selected relational expressions.

The relational expressions generated in the above fifth embodiment are quadratic approximate expression generated using the least-squares method. Alternatively, the relational expressions may be approximate expressions of direct functions, or may be generated using the Lagrange's interpolation, for example.

Also, when the power supply is turned on, a relational expression is generated. Alternatively, it may be possible, for example, to generate a relational expression in accordance with a user's instruction, or, generate a relational expression while data transmission is not performed.

In the above seventh embodiment, the wireless transmission/reception unit 110 may make a negotiation with other apparatus in order to secure a band necessary for content transmission. For example, if the receiver 200, a wireless master unit (access point) that manages a band for the wireless network, and a transmitter that transmits a content each have IEEE802.11e HCCA functions, and further if the receiver 200 is a wireless slave unit (station) belonging to the wireless master unit, the receiver 200 may transmit ADD TS request of the wireless management frame that is a request for band allocation to the wireless master unit. In this case, Mean Data Rate of TSPEC parameter of ADD TS request may include a content rate. Surplus Bandwidth Allowance may include a necessary band obtained by the necessary band determination unit 220. Minimum PHY rate may include a PHY rate determined by the PHY rate determination unit 160.

In the above seventh embodiment, when the number of stored packets reaches a predetermined number, the PER measurement unit 260 transmits information to the correction information creation unit 250. Alternatively, the information may be transmitted at a predetermined time.

In the above embodiments, the descriptions are based on wireless transmission apparatuses. The present invention may be a method including the Steps shown in the above flow chart, a program including a program code that causes the computer to execute the Steps shown in the above flow chart, or a recording medium having stored therein the program.

Furthermore, the structures of the above embodiments may be realized typically as LSIs (Large Scale Integrations) that are integrated circuits. These circuits may be realized as separate chips. Alternatively, these circuits may be integrated onto a single chip so as to include all or part of the structures. Note that although the term LSIs is used here, the circuits may be variously described as ICs (Integrated Circuits), system LSIs, super LSIs, or ultra LSIs, depending on the level of integration. Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor that can reconfigure the connection and settings of the circuit cells inside the LSI.

Moreover, if, due to the progress in the field of semiconductor technology or the derivation of another technology, a technology to replace the current semiconductor technology emerges, that technology may, as a matter of course, be used to integrate the functional block. The use of biotechnology and the like is considered to be a possibility. Also, the LSIs may be embedded in the server apparatus 1, the client apparatus 2, or a mobile terminal.

Any of the above embodiments and any of the above the above Supplementary Descriptions may be combined. For example, suppose that the above seventh embodiment and any of other embodiments are combined. If a test packet is not received from a transmitter, it may be possible to switch to the functions according to the seventh embodiment. Also, in a case where the transmitter does not transmit in advance information showing the functions according to the above first embodiment are supported other than test packets, it may be possible to switch to the functions according to any of the above embodiments.

Also, by combining the above fifth embodiment and any of other embodiments, it may be possible to estimate a PER using a relational expression generated in the fifth embodiment for determining a PHY rate and a band at the start of content transmission.

INDUSTRIAL APPLICABILITY

The present invention is useful in a case where a PER varies due to an obstacle located between transmission apparatuses for example.

The invention claimed is:

1. A transmission apparatus that performs transmission to a reception apparatus, the transmission apparatus comprising:
   a control unit operable to select one transmission rate of a physical layer (PHY rate) from among a plurality of PHY rates of a protocol stack;
   a communication unit operable to perform transmission at the PHY rate selected by the control unit; and
   a storage unit that stores therein first information and second information for each of the plurality of PHY rates, the first information showing a plurality of possible reception power values respectively corresponding to packet error rates (PERs), the second information showing a plurality of possible PERs respectively corresponding to retransmission ratios, wherein
   the control unit includes a retransmission ratio acquisition subunit operable to acquire a retransmission ratio that corresponds to a reception power value for each of the PHY rates, based on the first information and the second information,
   the control unit performs the selection by calculating one or more effective values of transmission rates of an upper layer of the protocol stack with respect to one or more PHY rates of the plurality of PHY rates respectively, and making a comparison with use of the calculated one or more effective values,
   the communication unit performs transmission in units of packets,
   the control unit further includes:
   a PER calculation subunit operable to calculate a PER that corresponds to a PHY rate used for the transmission, using a number of retransmissions for each transmitted packet and a number of packets that have been completely transmitted;
   a comparison subunit operable to compare the PER calculated by the PER calculation subunit with a PER that corresponds to the used PHY rate shown by the first information; and
   a correction subunit operable to correct the first information if the calculated PER differs from the PER shown by the first information by no less than a predetermined value, and
   each of the one or more effective values is calculated based on (i) an ideal value of corresponding one of the transmission rates and (ii) a retransmission ratio via the physical layer that corresponds to a reception power value detected in the reception apparatus, said transmission apparatus further comprising;
an accumulation unit operable to acquire a reception power value, and accumulate therein the acquired reception power value, wherein
the correction subunit includes:
a generation subunit operable to generate corrected first information showing a plurality of possible reception power values respectively corresponding to PERs, based on the PER calculated by the PER calculation subunit, the PER shown by the first information, and a reception power value accumulated in the accumulation unit that corresponds to the calculated PER; and
an update subunit operable to update the first information stored in the storage unit with the corrected first information generated by the generation unit.

2. The transmission apparatus of claim 1, wherein
the control unit calculates effective values of transmission rates of the upper layer with respect to any two of the plurality of PHY rates respectively, compares the calculated two effective values with each other, and selects one of the two PHY rates that corresponds to a higher one of the two effective values.

3. The transmission apparatus of claim 1, wherein
the control unit calculates an effective value of a transmission rate of the upper layer with respect to any one of the plurality of PHY rates, and compares the calculated effective value with a predetermined threshold value,
if the calculated effective value is greater than the threshold value, the control unit selects the any one PHY rate that corresponds to the calculated effective value, and
if the calculated effective value is no more than the threshold value, the control unit calculates an effective value of a transmission rate of the upper layer with respect to any another one of the plurality of PHY rates other than the any one PHY rate, and compares the calculated effective value with the threshold value.

4. The transmission apparatus of claim 1, wherein
the control unit calculates effective values of transmission rates of the upper layer with respect to all of the plurality of PHY rates respectively, sequentially compares the calculated effective values with one another, and selects one of the plurality of PHY rates that corresponds to a highest one of the calculated effective values.

5. The transmission apparatus of claim 1, further comprising
a measurement unit operable to measure a reception power value.

6. The transmission apparatus of claim 1, wherein
the communication unit performs transmission in units of packets,
the retransmission ratio is calculated based on a combination of a probability of packet error for each transmitted packet, a probability of normal transmission of the packet, and a pattern of packet errors.

7. The transmission apparatus of claim 1, wherein
the storage unit is a nonvolatile memory.

8. A transmission apparatus that performs transmission to a reception apparatus, the transmission apparatus comprising:
a control unit operable to select one transmission rate of a physical layer (PHY rate) from among a plurality of PHY rates of a protocol stack;
a communication unit operable to perform transmission at the PHY rate selected by the control unit; and
a storage unit that stores therein first information and second information for each of the plurality of PHY rates, the first information showing a plurality of possible reception power values respectively corresponding to packet error rates (PERs), the second information showing a plurality of possible PERs respectively corresponding to retransmission ratios, wherein
the control unit includes a retransmission ratio acquisition subunit operable to acquire a retransmission ratio that corresponds to a reception power value for each of the PHY rates, based on the first information and the second information,
the control unit performs the selection by calculating one or more effective values of transmission rates of an upper layer of the protocol stack with respect to one or more PHY rates of the plurality of PHY rates respectively, and making a comparison with use of the calculated one or more effective values,
each of the one or more effective values is calculated based on (i) an ideal value of corresponding one of the transmission rates and (ii) a retransmission ratio via the physical layer that corresponds to a reception power value detected in the reception apparatus,
the storage unit further stores therein third information showing a plurality of possible PERs respectively corresponding to standard deviations thereof,
the control unit further includes:
a standard deviation acquisition subunit operable to, based on the first information and the third information, acquire a standard deviation corresponding to a PER that correspond to reception power values, and add a value calculated as a result of multiplying the acquired standard deviation by N times (where N is a positive value) to the PER; and
a band calculation subunit operable to calculate a band necessary for performing transmission using the PER to which the calculated value has been added and a packet rate of packets to be transmitted, and
the communication unit performs the transmission over the calculated band.

9. The transmission apparatus of claim 8, wherein
the communication unit performs transmission in units of packets,
the control unit further includes:
a PER calculation subunit operable to calculate a predetermined number of PERs using a number of retransmissions for each transmitted packet and a number of packets that have been completely transmitted;
a comparison subunit operable to compare a standard deviation of the predetermined number of PERs calculated by the PER calculation subunit with a standard deviation calculated using the predetermined number of PERs and the third information; and
a correction subunit operable to correct the third information if the standard deviations differ from each other by no less than a predetermined value as a result of the comparison by the comparison subunit.

10. The transmission apparatus of claim 9, further comprising:
an accumulation unit operable to acquire a reception power value, and accumulate therein the acquired reception power value, wherein
the correction subunit includes:
a generation subunit operable to generate corrected third information showing a plurality of possible PERs respectively corresponding to standard deviations thereof, based on the plurality of possible PERs, the standard deviation of the predetermined number of PERs, and the standard deviation calculated using the predetermined number of PERs and the third information; and an update subunit operable to update the third information stored in the storage unit with the corrected third information generated by the generation unit.

11. The transmission apparatus of claim 8, wherein the band calculation unit includes:
a packet rate change subunit operable to compare the calculated band with an allocatable band, and change the packet rate if the calculated band is larger than the allocatable band; and
a securement band calculation subunit operable to calculate a band to be secured based on the changed packet rate.

12. The transmission apparatus of claim 8, wherein the standard deviation acquisition unit includes:
a percentage calculation subunit operable to calculate a percentage of PERs falling within a range from the mean of the acquired PERs minus the standard deviation to the mean plus the standard deviation among the PERs used for acquiring the standard deviation; and
a determination subunit operable to determine the value N by which the standard deviation is to be multiplied, based on whether the calculated percentage is greater than a predetermined threshold value.

13. A transmission apparatus A transmission apparatus that performs transmission to a reception apparatus, the transmission apparatus comprising:
a control unit operable to select one transmission rate of a physical layer (PHY rate) from among a plurality of PHY rates of a protocol stack; and
a communication unit operable to perform transmission at the PHY rate selected by the control unit, wherein
the control unit performs the selection by calculating one or more effective values of transmission rates of an upper layer of the protocol stack with respect to one or more PHY rates of the plurality of PHY rates respectively, and making a comparison with use of the calculated one or more effective values, and
each of the one or more effective values is calculated based on (i) an ideal value of corresponding one of the transmission rates and (ii) a retransmission ratio via the physical layer that corresponds to a reception power value detected in the reception apparatus,
the communication unit performs transmission in units of packets,
the control unit further includes:
a reception power value acquisition subunit operable to acquire reception power values;
a PER calculation subunit operable to calculate a predetermined number of PERs using a number of retransmissions for each transmitted packet and a number of packets that have been completely transmitted;
a dispersion judgment subunit operable to judge whether an interval between each adjacent two of the calculated predetermined number of PERs is no less than a predetermined value; and
a generation subunit operable to generate first information for each of the plurality of PHY rates showing a plurality of possible reception power values respectively corresponding to PERs, based on the predetermined number of PERs and the reception power values acquired by the reception power value acquisition subunit.

14. The transmission apparatus of claim 13, wherein the control unit further includes:
a standard deviation calculation subunit operable to calculate a standard deviation of the predetermined number of PERs; and a generation subunit operable to generate third information showing a plurality of possible PERs respectively corresponding to standard deviations thereof, based on the predetermined number of PERs and the standard deviation calculated by the standard deviation calculation subunit.

15. A transmission method that performs transmission from a transmission apparatus to a reception apparatus, the transmission method comprising:
selecting one transmission rate of a physical layer (PHY rate) from among a plurality of PHY rates of a protocol stack;
performing transmission in units of packets, with the transmission apparatus, at the selected PHY rate; and
storing, in a memory, first information and second information for each of the plurality of PHY rates, the first information showing a plurality of possible reception power values respectively corresponding to packet error rates (PERs), the second information showing a plurality of possible PERs respectively corresponding to retransmission ratios;
acquiring a retransmission ratio that corresponds to a reception power value for each of the PHY rates, based on the first information and the second information,
wherein said selecting comprises: calculating one or more effective values of transmission rates of an upper layer of the protocol stack with respect to one or more PHY rates of the plurality of PHY rates respectively; and making a comparison with use of the calculated one or more effective values,
calculating a PER that corresponds to a PHY rate used for the transmission, using a number of retransmissions for each transmitted packet and a number of packets that have been completely transmitted;
comparing the calculated PER with a PER that corresponds to the used PHY rate shown by the first information; and
correcting the first information if the calculated PER differs from the PER shown by the first information by no less than a predetermined value,
wherein each of the one or more effective values is calculated based on (i) an ideal value of corresponding one of the transmission rates and (ii) a retransmission ratio via the physical layer that corresponds to a reception power value detected by the receiving apparatus,
acquiring a reception power value, and accumulating the acquired reception power value,
generating corrected first information showing a plurality of possible reception power values respectively corresponding to PERs, based on the calculated PER, the PER shown by the first information, and an accumulated reception power value that corresponds to the calculated PER; and
updating the first information stored in the storage unit with the generated corrected first information.

16. A non-transitory computer readable storage medium storing a program that causes a computer to implement a transmission method that performs transmission from a transmission apparatus to a reception apparatus, the transmission method comprising:
selecting one transmission rate of a physical layer (PHY rate) from among a plurality of PHY rates of a protocol stack;
performing transmission in units of packets, with the transmission apparatus, at the selected PHY rate; and
storing, in a memory, first information and second information for each of the plurality of PHY rates, the first information showing a plurality of possible reception power values respectively corresponding to packet error rates (PERs), the second information showing a plurality of possible PERs respectively corresponding to retransmission ratios;

acquiring a retransmission ratio that corresponds to a reception power value for each of the PHY rates, based on the first information and the second information, wherein said selecting comprises: calculating one or more effective values of transmission rates of an upper layer of the protocol stack with respect to one or more PHY rates of the plurality of PHY rates respectively; and making a comparison with use of the calculated one or more effective values, calculating a PER that corresponds to a PHY rate used for the transmission, using a number of retransmissions for each transmitted packet and a number of packets that have been completely transmitted;

comparing the calculated PER with a PER that corresponds to the used PHY rate shown by the first information; and correcting the first information if the calculated PER differs from the PER shown by the first information by no less than a predetermined value, wherein each of the one or more effective values is calculated based on (i) an ideal value of corresponding one of the transmission rates and (ii) a retransmission ratio via the physical layer that corresponds to a reception power value detected by the receiving apparatus, acquiring a reception power value, and accumulating the acquired reception power value, generating corrected first information showing a plurality of possible reception power values respectively corresponding to PERs, based on the calculated PER, the PER shown by the first information, and an accumulated reception power value that corresponds to the calculated PER; and updating the first information stored in the storage unit with the generated corrected first information.

17. A transmission method that performs transmission from a transmission apparatus to a reception apparatus, the transmission method comprising:

selecting one transmission rate of a physical layer (PHY rate) from among a plurality of PHY rates of a protocol stack;

performing transmission, with the transmission apparatus, at the selected PHY rate; and storing, in a memory, first information and second information for each of the plurality of PHY rates, the first information showing a plurality of possible reception power values respectively corresponding to packet error rates (PERs), the second information showing a plurality of possible PERs respectively corresponding to retransmission ratios, acquiring a retransmission ratio that corresponds to a reception power value for each of the PHY rates, based on the first information and the second information, wherein said selecting comprises: calculating one or more effective values of transmission rates of an upper layer of the protocol stack with respect to one or more PHY rates of the plurality of PHY rates respectively; and making a comparison with use of the calculated one or more effective values, wherein each of the one or more effective values is calculated based on (i) an ideal value of corresponding one of the transmission rates and (ii) a retransmission ratio via the physical layer that corresponds to a reception power value detected by the receiving apparatus, storing, in the memory, third information showing a plurality of possible PERs respectively corresponding to standard deviations thereof, acquiring, based on the first information and the third information, a standard deviation corresponding to a PER that correspond to reception power values, and adding a value calculated as a result of multiplying the acquired standard deviation by N times (where N is a positive value) to the PER; and calculating a band necessary for performing transmission using the PER to which the calculated value has been added and a packet rate of packets to be transmitted, wherein the transmission is performed over the calculated band.

18. A non-transitory computer readable storage medium storing a program that causes a computer to implement a transmission method that performs transmission from a transmission apparatus to a reception apparatus, the transmission method comprising:

selecting one transmission rate of a physical layer (PHY rate) from among a plurality of PHY rates of a protocol stack;

performing transmission, with the transmission apparatus, at the selected PHY rate; and storing, in a memory, first information and second information for each of the plurality of PHY rates, the first information showing a plurality of possible reception power values respectively corresponding to packet error rates (PERs), the second information showing a plurality of possible PERs respectively corresponding to retransmission ratios, acquiring a retransmission ratio that corresponds to a reception power value for each of the PHY rates, based on the first information and the second information, wherein said selecting comprises: calculating one or more effective values of transmission rates of an upper layer of the protocol stack with respect to one or more PHY rates of the plurality of PHY rates respectively; and making a comparison with use of the calculated one or more effective values, wherein each of the one or more effective values is calculated based on (i) an ideal value of corresponding one of the transmission rates and (ii) a retransmission ratio via the physical layer that corresponds to a reception power value detected by the receiving apparatus, storing, in the memory, third information showing a plurality of possible PERs respectively corresponding to standard deviations thereof, acquiring, based on the first information and the third information, a standard deviation corresponding to a PER that correspond to reception power values, and adding a value calculated as a result of multiplying the acquired standard deviation by N times (where N is a positive value) to the PER; and calculating a band necessary for performing transmission using the PER to which the calculated value has been added and a packet rate of packets to be transmitted, wherein the transmission is performed over the calculated band.

19. A transmission method that performs transmission from a transmission apparatus to a reception apparatus, the transmission method comprising:

selecting one transmission rate of a physical layer (PHY rate) from among a plurality of PHY rates of a protocol stack; and performing transmission in units of packets, with the transmission apparatus, at the selected PHY rate, wherein wherein said selecting comprises: calculating one or more effective values of transmission rates of an upper layer of the protocol stack with respect to one or more PHY rates of the plurality of PHY rates respectively; and making a comparison with use of the calculated one or more effective values, wherein each of the one or more effective values is calculated based on (i) an ideal value of corresponding one of the transmission rates and (ii) a retransmission ratio via the physical layer that corresponds to a reception power value detected in the reception apparatus, acquiring reception power values;

calculating a predetermined number of PERs using a number of retransmissions for each transmitted packet and a number of packets that have been completely transmitted;

judging whether an interval between each adjacent two of the calculated predetermined number of PERs is no less than a predetermined value; and generating first information for each of the plurality of PHY rates showing a plurality of possible reception power values respectively corresponding to PERs, based on the predetermined number of PERs and the acquired reception power values.

20. A non-transitory computer readable storage medium storing a program that causes a computer to implement a transmission method that performs transmission from a transmission apparatus to a reception apparatus, the transmission method comprising:

selecting one transmission rate of a physical layer (PHY rate) from among a plurality of PHY rates of a protocol stack; and performing transmission in units of packets, with the transmission apparatus, at the selected PHY rate, wherein wherein said selecting comprises: calculating one or more effective values of transmission rates of an upper layer of the protocol stack with respect to one or more PHY rates of the plurality of PHY rates respectively; and making a comparison with use of the calculated one or more effective values, wherein each of the one or more effective values is calculated based on (i) an ideal value of corresponding one of the transmission rates and (ii) a retransmission ratio via the physical layer that corresponds to a reception power value detected in the reception apparatus, acquiring reception power values;

calculating a predetermined number of PERs using a number of retransmissions for each transmitted packet and a number of packets that have been completely transmitted;

judging whether an interval between each adjacent two of the calculated predetermined number of PERs is no less than a predetermined value; and generating first information for each of the plurality of PHY rates showing a plurality of possible reception power values respectively corresponding to PERs, based on the predetermined number of PERs and the acquired reception power values.

* * * * *